(12) United States Patent
Kapczynski et al.

(10) Patent No.: US 10,325,314 B1
(45) Date of Patent: *Jun. 18, 2019

(54) PAYMENT REPORTING SYSTEMS

(71) Applicant: ConsumerInfo.com, Inc., Costa Mesa, CA (US)

(72) Inventors: Mark Joseph Kapczynski, Santa Monica, CA (US); Michael John Dean, Torrance, CA (US)

(73) Assignee: CONSUMERINFO.COM, INC., Costa Mesa, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/252,701

(22) Filed: Apr. 14, 2014

Related U.S. Application Data

(63) Continuation-in-part of application No. 14/164,561, filed on Jan. 27, 2014, now Pat. No. 9,443,268.

(60) Provisional application No. 61/919,618, filed on Dec. 20, 2013, provisional application No. 61/905,112, filed on Nov. 15, 2013.

(51) Int. Cl.
*G06Q 40/02* (2012.01)

(52) U.S. Cl.
CPC .................. *G06Q 40/025* (2013.01)

(58) Field of Classification Search
CPC .............................. G06Q 40/02; G06Q 40/025
USPC ........................................ 705/35, 39, 40, 42
See application file for complete search history.

(56) References Cited

U.S. PATENT DOCUMENTS

| | | |
|---|---|---|
| 1,372,397 A | 3/1921 | Boschen |
| 3,405,457 A | 10/1968 | Bitzer |
| 3,762,316 A | 10/1973 | Spradlin |
| 4,346,442 A | 8/1982 | Musmanno |
| 4,718,009 A | 1/1988 | Cuervo |
| 4,734,858 A | 3/1988 | Schlafly |
| 4,755,940 A | 7/1988 | Brachtl et al. |
| 4,774,664 A | 9/1988 | Campbell et al. |
| 4,827,508 A | 5/1989 | Shear |
| 4,869,500 A | 9/1989 | Williams |
| 4,891,503 A | 1/1990 | Jewell |

(Continued)

FOREIGN PATENT DOCUMENTS

| | | |
|---|---|---|
| CA | 2509842 | 12/2005 |
| EP | 0 542 298 | 5/1993 |

(Continued)

OTHER PUBLICATIONS

"Equifax: Debt Wise Credit Monitoring Service", Feb. 2010. (Year: 2010).*

(Continued)

*Primary Examiner* — Eric T Wong

(74) *Attorney, Agent, or Firm* — Knobbe, Martens, Olson & Bear, LLP

(57) ABSTRACT

A system is disclosed for reporting payments to one or more credit bureaus according to instructions provided by a consumer. The system may provide the consumer with one or more user interfaces from which the consumer can select one or more options to report payments made to billers. In some embodiments, the reporting options are included as part of a biller's website or a bill payment center website. The system may enable faster reporting of payments made to some billers and may report payments made to billers who would not otherwise report payments.

15 Claims, 15 Drawing Sheets

(56) References Cited

U.S. PATENT DOCUMENTS

| | | |
|---|---|---|
| 4,900,903 A | 2/1990 | Wright et al. |
| 4,977,595 A | 12/1990 | Ohta et al. |
| 4,989,141 A | 1/1991 | Lyons et al. |
| 5,077,582 A | 12/1991 | Kravette et al. |
| 5,126,936 A | 6/1992 | Champion et al. |
| 5,148,365 A | 9/1992 | Dembo |
| 5,173,935 A | 12/1992 | Meschi |
| 5,197,094 A | 3/1993 | Tillery et al. |
| 5,218,632 A | 6/1993 | Cool |
| 5,220,501 A | 6/1993 | Lawlor et al. |
| 5,262,941 A | 11/1993 | Saladin |
| 5,274,547 A | 12/1993 | Zoffel et al. |
| 5,326,959 A | 7/1994 | Perazza |
| 5,336,870 A | 8/1994 | Hughes et al. |
| 5,351,186 A | 9/1994 | Bullock et al. |
| 5,383,113 A | 1/1995 | Kight et al. |
| 5,404,518 A | 4/1995 | Gilbertson et al. |
| 5,420,405 A | 5/1995 | Chasek |
| 5,457,305 A | 10/1995 | Akel et al. |
| 5,500,513 A | 3/1996 | Langhans et al. |
| 5,537,464 A | 7/1996 | Lewis et al. |
| 5,561,706 A | 10/1996 | Fenner |
| 5,563,783 A | 10/1996 | Stolfo et al. |
| 5,590,038 A | 12/1996 | Pitroda |
| 5,592,560 A | 1/1997 | Deaton et al. |
| 5,616,902 A | 4/1997 | Cooley et al. |
| 5,621,201 A | 4/1997 | Langhans et al. |
| 5,640,577 A | 6/1997 | Scharmer |
| 5,655,008 A | 8/1997 | Futch et al. |
| 5,659,725 A | 8/1997 | Levy et al. |
| 5,659,731 A | 8/1997 | Gustafson |
| 5,684,965 A | 11/1997 | Pickering |
| 5,689,651 A | 11/1997 | Lozman |
| 5,699,528 A | 12/1997 | Hogan |
| 5,719,941 A | 2/1998 | Swift et al. |
| 5,729,735 A | 3/1998 | Meyering |
| 5,739,512 A | 4/1998 | Tognazzini |
| 5,754,632 A | 5/1998 | Smith |
| 5,774,533 A | 6/1998 | Patel |
| 5,774,885 A | 6/1998 | Delfer, III |
| 5,794,221 A | 8/1998 | Egendorf |
| 5,802,498 A | 9/1998 | Comesanas |
| 5,809,143 A | 9/1998 | Hughes |
| 5,815,665 A | 9/1998 | Teper et al. |
| 5,819,234 A | 10/1998 | Slavin et al. |
| 5,832,068 A | 11/1998 | Smith |
| 5,832,460 A | 11/1998 | Bednar et al. |
| 5,838,314 A | 11/1998 | Neel et al. |
| 5,842,211 A | 11/1998 | Horadan et al. |
| 5,844,218 A | 12/1998 | Kawan et al. |
| 5,850,446 A | 12/1998 | Berger et al. |
| 5,864,620 A | 1/1999 | Pettitt |
| 5,870,721 A | 2/1999 | Norris |
| 5,873,072 A | 2/1999 | Kight et al. |
| 5,878,403 A | 3/1999 | DeFrancesco |
| 5,881,131 A | 3/1999 | Farris et al. |
| 5,884,288 A | 3/1999 | Chang et al. |
| 5,884,302 A | 3/1999 | Ho |
| 5,893,077 A | 4/1999 | Griffin |
| 5,903,830 A | 5/1999 | Joao et al. |
| 5,903,881 A | 5/1999 | Schrader et al. |
| 5,920,848 A | 7/1999 | Schutzer et al. |
| 5,926,754 A | 7/1999 | Cirelli et al. |
| 5,930,776 A | 7/1999 | Dykstra et al. |
| 5,953,710 A | 9/1999 | Fleming |
| 5,956,690 A | 9/1999 | Haggerson et al. |
| 5,956,693 A | 9/1999 | Geerlings |
| 5,956,698 A | 9/1999 | Lacheze et al. |
| 5,963,939 A | 10/1999 | McCann et al. |
| 5,966,695 A | 10/1999 | Melchione et al. |
| 5,978,780 A | 11/1999 | Watson |
| 5,995,947 A | 11/1999 | Fraser et al. |
| 5,999,596 A | 12/1999 | Walker et al. |
| 6,006,333 A | 12/1999 | Nielsen |
| 6,009,415 A | 12/1999 | Shurling et al. |
| 6,014,645 A | 1/2000 | Cunningham |
| 6,021,397 A | 2/2000 | Jones et al. |
| 6,021,943 A | 2/2000 | Chastain |
| 6,026,440 A | 2/2000 | Shrader et al. |
| 6,029,149 A | 2/2000 | Dykstra et al. |
| 6,032,132 A | 2/2000 | Nelson |
| 6,038,551 A | 3/2000 | Barlow et al. |
| 6,041,319 A | 3/2000 | Bass et al. |
| 6,044,362 A | 3/2000 | Neely |
| 6,049,786 A | 4/2000 | Smorodinsky |
| 6,052,671 A | 4/2000 | Crooks et al. |
| 6,055,570 A | 4/2000 | Nielsen |
| 6,061,668 A | 5/2000 | Sharrow |
| 6,064,990 A | 5/2000 | Goldsmith |
| 6,072,894 A | 6/2000 | Payne |
| 6,073,140 A | 6/2000 | Morgan et al. |
| 6,078,907 A | 6/2000 | Lamm |
| 6,085,242 A | 7/2000 | Chandra |
| 6,088,686 A | 7/2000 | Walker et al. |
| 6,112,190 A | 8/2000 | Fletcher et al. |
| 6,119,103 A | 9/2000 | Basch et al. |
| 6,128,602 A | 10/2000 | Northington et al. |
| 6,144,726 A | 11/2000 | Cross |
| 6,149,441 A | 11/2000 | Pellegrino et al. |
| 6,157,707 A | 12/2000 | Baulier et al. |
| 6,161,139 A | 12/2000 | Win et al. |
| 6,173,272 B1 | 1/2001 | Thomas et al. |
| 6,178,420 B1 | 1/2001 | Sassano |
| 6,182,068 B1 | 1/2001 | Culliss |
| 6,182,229 B1 | 1/2001 | Nielsen |
| 6,202,053 B1 | 3/2001 | Christiansen et al. |
| 6,202,067 B1 | 3/2001 | Blood et al. |
| 6,233,566 B1 | 5/2001 | Levine et al. |
| 6,233,588 B1 | 5/2001 | Marchoili et al. |
| 6,247,000 B1 | 6/2001 | Hawkins et al. |
| 6,254,000 B1 | 7/2001 | Degen et al. |
| 6,263,447 B1 | 7/2001 | French et al. |
| 6,278,993 B1 | 8/2001 | Kumar et al. |
| 6,282,658 B2 | 8/2001 | French et al. |
| 6,289,323 B1 | 9/2001 | Gordon et al. |
| 6,289,452 B1 | 9/2001 | Arnold et al. |
| 6,292,789 B1 | 9/2001 | Schutzer |
| 6,295,541 B1 | 9/2001 | Bodnar et al. |
| 6,304,860 B1 | 10/2001 | Martin et al. |
| 6,311,169 B2 | 10/2001 | Duhon |
| 6,321,339 B1 | 11/2001 | French et al. |
| 6,324,516 B1 | 11/2001 | Shults et al. |
| 6,327,578 B1 | 12/2001 | Linehan |
| 6,330,551 B1 | 12/2001 | Burchetta et al. |
| 6,334,116 B1 | 12/2001 | Ganesan et al. |
| 6,337,901 B1 | 1/2002 | Rome et al. |
| 6,341,272 B1 | 1/2002 | Randle |
| 6,343,279 B1 | 1/2002 | Bissonette et al. |
| 6,343,284 B1 | 1/2002 | Ishikawa et al. |
| 6,353,778 B1 | 3/2002 | Brown |
| 6,356,937 B1 | 3/2002 | Montville et al. |
| 6,374,262 B1 | 4/2002 | Kodama |
| 6,384,844 B1 | 5/2002 | Stewart et al. |
| 6,385,595 B1 | 5/2002 | Kolling et al. |
| 6,386,444 B1 | 5/2002 | Sullivan |
| 6,397,197 B1 | 5/2002 | Gindlesperger |
| 6,397,212 B1 | 5/2002 | Biffar |
| 6,405,181 B2 | 6/2002 | Lent et al. |
| 6,408,282 B1 | 6/2002 | Buist |
| 6,412,073 B1 | 6/2002 | Rangan |
| 6,421,675 B1 | 7/2002 | Ryan et al. |
| 6,421,729 B1 | 7/2002 | Paltenghe et al. |
| 6,421,768 B1 | 7/2002 | Purpura |
| 6,422,462 B1 | 7/2002 | Cohen |
| 6,424,840 B1 | 7/2002 | Fitch et al. |
| 6,431,439 B1 | 8/2002 | Suer et al. |
| 6,438,527 B1 | 8/2002 | Powar |
| 6,438,601 B1 | 8/2002 | Hardy |
| 6,453,353 B1 | 9/2002 | Win et al. |
| 6,457,012 B1 | 9/2002 | Jatkowski |
| 6,473,740 B2 | 10/2002 | Cockril et al. |
| 6,496,936 B1 | 12/2002 | French et al. |
| 5,870,721 C1 | 1/2003 | Norris |
| 6,505,168 B1 | 1/2003 | Rothman et al. |

(56) References Cited

U.S. PATENT DOCUMENTS

| | | |
|---|---|---|
| 6,510,451 B2 | 1/2003 | Wu et al. |
| 6,516,190 B1 | 2/2003 | Linkola |
| 6,523,021 B1 | 2/2003 | Monberg et al. |
| 6,523,041 B1 | 2/2003 | Morgan et al. |
| 6,539,377 B1 | 3/2003 | Culliss |
| 6,539,392 B1 | 3/2003 | Rebane |
| 6,543,683 B2 | 4/2003 | Hoffman |
| 6,546,413 B1 | 4/2003 | Northrup |
| 6,549,770 B1 | 4/2003 | Marran |
| 6,549,904 B1 | 4/2003 | Ortega et al. |
| 6,564,210 B1 | 5/2003 | Korda et al. |
| 6,567,791 B2 | 5/2003 | Lent et al. |
| 6,571,236 B1 | 5/2003 | Ruppelt |
| 6,574,736 B1 | 6/2003 | Andrews |
| 6,574,798 B1 | 6/2003 | Bradley et al. |
| 6,581,025 B2 | 6/2003 | Lehman |
| 6,587,841 B1 | 7/2003 | DeFrancesco |
| 6,594,766 B2 | 7/2003 | Rangan et al. |
| 6,611,816 B2 | 8/2003 | Lebda et al. |
| 6,615,193 B1 | 9/2003 | Kingdon et al. |
| 6,622,131 B1 | 9/2003 | Brown et al. |
| 6,629,245 B1 | 9/2003 | Stone et al. |
| 6,647,383 B1 | 11/2003 | August et al. |
| 6,655,583 B2 | 12/2003 | Walsh et al. |
| 6,658,393 B1 | 12/2003 | Basch et al. |
| 6,665,715 B1 | 12/2003 | Houri |
| 6,678,694 B1 | 1/2004 | Zimmermann et al. |
| 6,684,197 B1 | 1/2004 | Kolls |
| 6,703,930 B2 | 3/2004 | Skinner |
| 6,704,039 B2 | 3/2004 | Pena |
| 6,714,944 B1 | 3/2004 | Shapiro et al. |
| 6,718,313 B1 | 4/2004 | Lent et al. |
| 6,721,716 B1 | 4/2004 | Gross |
| 6,725,381 B1 | 4/2004 | Smith et al. |
| 6,738,804 B1 | 5/2004 | Lo |
| 6,745,938 B2 | 6/2004 | Sullivan |
| 6,748,367 B1 | 6/2004 | Lee et al. |
| 6,748,426 B1 | 6/2004 | Shaffer et al. |
| 6,750,985 B2 | 6/2004 | Rhoads |
| 6,754,564 B2 | 6/2004 | Newport |
| 6,766,304 B2 | 7/2004 | Kemp et al. |
| 6,766,327 B2 | 7/2004 | Morgan, Jr. et al. |
| 6,772,132 B1 | 8/2004 | Kemp et al. |
| 6,775,519 B1 | 8/2004 | Wiedman et al. |
| 6,781,608 B1 | 8/2004 | Crawford |
| 6,782,379 B2 | 8/2004 | Lee |
| 6,792,088 B2 | 9/2004 | Takeuchi |
| 6,792,263 B1 | 9/2004 | Kite |
| 6,795,812 B1 | 9/2004 | Lent et al. |
| 6,796,497 B2 | 9/2004 | Benkert et al. |
| 6,804,346 B1 | 10/2004 | Mewhinney |
| 6,804,720 B1 | 10/2004 | Vilander et al. |
| 6,805,287 B2 | 10/2004 | Bishop et al. |
| 6,807,533 B1 | 10/2004 | Land et al. |
| 6,810,323 B1 | 10/2004 | Bullock et al. |
| 6,816,850 B2 | 11/2004 | Culliss |
| 6,816,871 B2 | 11/2004 | Lee |
| 6,823,319 B1 | 11/2004 | Lynch et al. |
| 6,829,639 B1 | 12/2004 | Lawson et al. |
| 6,832,212 B1 | 12/2004 | Zenner et al. |
| 6,842,740 B1 | 1/2005 | Jeran et al. |
| 6,842,782 B1 | 1/2005 | Malik et al. |
| 6,845,448 B1 | 1/2005 | Chaganti et al. |
| 6,856,974 B2 | 2/2005 | Ganesan et al. |
| 6,857,073 B2 | 2/2005 | French et al. |
| 6,859,212 B2 | 2/2005 | Kumar et al. |
| 6,871,287 B1 | 3/2005 | Ellingson |
| 6,880,751 B1 | 4/2005 | Okamura et al. |
| 6,882,986 B1 | 4/2005 | Heinemann et al. |
| 6,892,307 B1 | 5/2005 | Wood et al. |
| 6,898,279 B1 | 5/2005 | Baker et al. |
| 6,898,574 B1 | 5/2005 | Regan |
| 6,900,731 B2 | 5/2005 | Kreiner et al. |
| 6,910,624 B1 | 6/2005 | Natsuno |
| 6,928,487 B2 | 8/2005 | Eggebraaten et al. |
| 6,932,268 B1 | 8/2005 | McCoy et al. |
| 6,934,691 B1 | 8/2005 | Simpson |
| 6,934,714 B2 | 8/2005 | Meinig |
| 6,938,011 B1 | 8/2005 | Kemp et al. |
| 6,938,821 B2 | 9/2005 | Gangi |
| 6,941,323 B1 | 9/2005 | Galperin |
| 6,947,989 B2 | 9/2005 | Gullotta et al. |
| 6,950,807 B2 | 9/2005 | Brock |
| 6,954,630 B2 | 10/2005 | Offer |
| 6,954,757 B2 | 10/2005 | Zargham et al. |
| 6,957,336 B2 | 10/2005 | Wheeler et al. |
| 6,962,336 B2 | 11/2005 | Glass |
| 6,963,857 B1 | 11/2005 | Johnson |
| 6,965,881 B1 | 11/2005 | Brickell et al. |
| 6,968,319 B1 | 11/2005 | Remington et al. |
| 6,973,462 B2 | 12/2005 | Dattero et al. |
| 6,985,887 B1 | 1/2006 | Sunstein et al. |
| 6,988,082 B1 | 1/2006 | Williams et al. |
| 6,988,085 B2 | 1/2006 | Hedy |
| 6,990,591 B1 | 1/2006 | Pearson |
| 6,993,504 B1 | 1/2006 | Friesen et al. |
| 6,993,572 B2 | 1/2006 | Ross, Jr. et al. |
| 6,993,596 B2 | 1/2006 | Hinton et al. |
| 6,996,542 B1 | 2/2006 | Landry |
| 6,999,941 B1 | 2/2006 | Agarwal |
| 7,013,315 B1 | 3/2006 | Boothby |
| 7,016,907 B2 | 3/2006 | Boreham et al. |
| 7,024,174 B2 | 4/2006 | Nagy et al. |
| 7,024,548 B1 | 4/2006 | O'Toole, Jr. |
| 7,028,013 B2 | 4/2006 | Saeki |
| 7,028,052 B2 | 4/2006 | Chapman et al. |
| 7,039,607 B2 | 5/2006 | Watarai et al. |
| 7,043,476 B2 | 5/2006 | Robson |
| 7,046,139 B2 | 5/2006 | Kuhn et al. |
| 7,050,989 B1 | 5/2006 | Hurt et al. |
| 7,058,386 B2 | 6/2006 | McGregor et al. |
| 7,058,817 B1 | 6/2006 | Ellmore |
| 7,062,475 B1 | 6/2006 | Szabo et al. |
| 7,065,566 B2 | 6/2006 | Menard et al. |
| 7,069,240 B2 | 6/2006 | Spero et al. |
| 7,072,856 B1 | 7/2006 | Nachom |
| 7,072,909 B2 | 7/2006 | Polk |
| 7,076,462 B1 | 7/2006 | Nelson et al. |
| 7,083,087 B1 | 8/2006 | Gangi |
| 7,085,727 B2 | 8/2006 | VanOrman |
| 7,089,594 B2 | 8/2006 | Lal et al. |
| 7,092,905 B2 | 8/2006 | Behrenbrinker et al. |
| 7,107,241 B1 | 9/2006 | Pinto |
| 7,107,243 B1 | 9/2006 | McDonald et al. |
| 7,107,244 B2 | 9/2006 | Kight et al. |
| 7,107,285 B2 | 9/2006 | Von Kaenel et al. |
| 7,110,978 B1 | 9/2006 | Chin |
| 7,117,172 B1 | 10/2006 | Black |
| 7,124,144 B2 | 10/2006 | Christianson et al. |
| 7,127,424 B2 | 10/2006 | Kemp et al. |
| 7,131,144 B2 | 10/2006 | Rabin et al. |
| RE39,376 E | 11/2006 | Biggs, Jr. et al. |
| 7,133,852 B2 | 11/2006 | Kurokawa et al. |
| 7,139,734 B2 | 11/2006 | Nathans et al. |
| 7,143,063 B2 | 11/2006 | Lent |
| 7,155,203 B2 | 12/2006 | Brewer et al. |
| 7,155,725 B1 | 12/2006 | Kister et al. |
| 7,155,739 B2 | 12/2006 | Bari et al. |
| 7,174,455 B1 | 2/2007 | Arnold et al. |
| 7,177,830 B2 | 2/2007 | Shields et al. |
| 7,181,418 B1 | 2/2007 | Zucker et al. |
| 7,181,427 B1 | 2/2007 | DeFrancesco |
| 7,194,416 B1 | 3/2007 | Provost et al. |
| 7,200,551 B1 | 4/2007 | Senez |
| 7,200,602 B2 | 4/2007 | Jonas |
| 7,200,804 B1 | 4/2007 | Khavari et al. |
| 7,203,315 B1 | 4/2007 | Livesay |
| 7,206,768 B1 | 4/2007 | deGroeve et al. |
| 7,209,895 B2 | 4/2007 | Kundtz et al. |
| 7,209,911 B2 | 4/2007 | Boothby et al. |
| 7,212,995 B2 | 5/2007 | Schulkins |
| 7,212,999 B2 | 5/2007 | Friesen et al. |
| 7,213,003 B1 | 5/2007 | Kight et al. |
| 7,216,104 B2 | 5/2007 | Mason |

(56) References Cited

U.S. PATENT DOCUMENTS

| | | |
|---|---|---|
| 7,218,912 B2 | 5/2007 | Erskine et al. |
| 7,219,107 B2 | 5/2007 | Beringer |
| 7,222,369 B2 | 5/2007 | Vering et al. |
| 7,227,935 B2 | 6/2007 | Creamer et al. |
| 7,228,289 B2 | 6/2007 | Brumfield et al. |
| 7,234,156 B2 | 6/2007 | French et al. |
| 7,236,950 B2 | 6/2007 | Savage et al. |
| 7,240,031 B1 | 7/2007 | Kight et al. |
| 7,243,369 B2 | 7/2007 | Bhat et al. |
| 7,246,740 B2 | 7/2007 | Swift et al. |
| 7,249,076 B1 | 7/2007 | Pendleton et al. |
| 7,249,113 B1 | 7/2007 | Continelli et al. |
| 7,263,497 B1 | 8/2007 | Wiser et al. |
| 7,281,652 B2 | 10/2007 | Foss |
| 7,289,971 B1 | 10/2007 | O'Neil et al. |
| 7,292,840 B2 | 11/2007 | Kissner et al. |
| 7,296,004 B1 | 11/2007 | Garrison et al. |
| 7,296,734 B2 | 11/2007 | Pliha |
| 7,302,272 B2 | 11/2007 | Ackley |
| 7,302,411 B2 | 11/2007 | Ganesan et al. |
| 7,310,611 B2 | 12/2007 | Shibuya et al. |
| 7,310,617 B1 | 12/2007 | Cunningham |
| 7,310,618 B2 | 12/2007 | Libman |
| 7,313,813 B2 | 12/2007 | Rangan et al. |
| 7,314,167 B1 | 1/2008 | Kiliccote |
| 7,315,837 B2 | 1/2008 | Sloan et al. |
| 7,328,233 B2 | 2/2008 | Salim et al. |
| 7,328,435 B2 | 2/2008 | Trifon |
| 7,330,717 B2 | 2/2008 | Gidron et al. |
| 7,330,835 B2 | 2/2008 | Deggendorf |
| 7,331,518 B2 | 2/2008 | Rable |
| 7,333,635 B2 | 2/2008 | Tsantes et al. |
| 7,340,679 B2 | 3/2008 | Botscheck et al. |
| 7,343,149 B2 | 3/2008 | Benco |
| 7,343,295 B2 | 3/2008 | Pomerance |
| 7,346,576 B2 | 3/2008 | Lent et al. |
| 7,349,885 B2 | 3/2008 | Gangi |
| 7,353,203 B1 | 4/2008 | Kriplani et al. |
| 7,356,503 B1 | 4/2008 | Johnson et al. |
| 7,356,516 B2 | 4/2008 | Richey et al. |
| 7,357,305 B2 | 4/2008 | Ahn et al. |
| 7,363,257 B2 | 4/2008 | Kunz et al. |
| 7,366,694 B2 | 4/2008 | Lazerson |
| 7,366,696 B1 | 4/2008 | Ganesan et al. |
| 7,366,759 B2 | 4/2008 | Trevithick |
| 7,370,014 B1 | 5/2008 | Vasavada et al. |
| 7,370,044 B2 | 5/2008 | Mulhern et al. |
| 7,370,794 B2 | 5/2008 | Trane |
| 7,373,324 B1 | 5/2008 | Engin et al. |
| 7,383,225 B2 | 6/2008 | Hallihan |
| 7,383,226 B2 | 6/2008 | Kight et al. |
| 7,383,988 B2 | 6/2008 | Slonecker, Jr. |
| 7,386,511 B2 | 6/2008 | Buchanan et al. |
| 7,386,597 B2 | 6/2008 | Takeuchi et al. |
| 7,386,786 B2 | 6/2008 | Davis et al. |
| 7,389,913 B2 | 6/2008 | Starrs |
| 7,392,223 B1 | 6/2008 | Ganesan et al. |
| 7,395,241 B1 | 7/2008 | Cook et al. |
| 7,395,243 B1 | 7/2008 | Zielke et al. |
| 7,395,273 B2 | 7/2008 | Khan et al. |
| 7,403,602 B2 | 7/2008 | Khan |
| 7,403,923 B2 | 7/2008 | Elliott et al. |
| 7,403,942 B1 | 7/2008 | Bayliss |
| 7,409,369 B1 | 8/2008 | Homuth et al. |
| 7,412,228 B2 | 8/2008 | Barclay et al. |
| 7,433,836 B1 | 10/2008 | August et al. |
| 7,433,864 B2 | 10/2008 | Malik |
| 7,437,324 B1 | 10/2008 | Goodwin, III et al. |
| 7,437,679 B2 | 10/2008 | Uemura et al. |
| 7,444,518 B1 | 10/2008 | Dharmarajan et al. |
| 7,447,663 B1 | 11/2008 | Barker et al. |
| 7,451,095 B1 | 11/2008 | Bradley et al. |
| 7,451,113 B1 | 11/2008 | Kasower |
| 7,458,508 B1 | 12/2008 | Shao et al. |
| 7,467,401 B2 | 12/2008 | Cicchitto |
| 7,475,032 B1 | 1/2009 | Patnode et al. |
| 7,479,949 B2 | 1/2009 | Jobs et al. |
| 7,480,631 B1 | 1/2009 | Merced et al. |
| 7,486,784 B2 | 2/2009 | Creamer et al. |
| 7,490,356 B2 | 2/2009 | Lieblich et al. |
| RE40,692 E | 3/2009 | Rose, Jr. |
| 7,499,875 B1 | 3/2009 | May et al. |
| 7,503,489 B2 | 3/2009 | Heffez |
| 7,505,931 B2 | 3/2009 | Silva |
| 7,509,117 B2 | 3/2009 | Yum |
| 7,509,278 B2 | 3/2009 | Jones |
| 7,512,221 B2 | 3/2009 | Toms |
| 7,516,101 B2 | 4/2009 | Remington et al. |
| 7,526,448 B2 | 4/2009 | Zielke et al. |
| 7,529,698 B2 | 5/2009 | Joao |
| 7,530,097 B2 | 5/2009 | Casco-Arias et al. |
| 7,536,329 B2 | 5/2009 | Goldberg et al. |
| 7,536,348 B2 | 5/2009 | Shao et al. |
| 7,537,152 B2 | 5/2009 | Chakiris et al. |
| 7,537,153 B2 | 5/2009 | Hurwitz et al. |
| 7,542,922 B2 | 6/2009 | Bennett et al. |
| 7,542,993 B2 | 6/2009 | Satterfield et al. |
| 7,543,739 B2 | 6/2009 | Brown et al. |
| 7,546,271 B1 | 6/2009 | Chmielewski et al. |
| 7,548,886 B2 | 6/2009 | Kirkland et al. |
| 7,552,080 B1 | 6/2009 | Willard et al. |
| 7,552,086 B1 | 6/2009 | Rajasekar et al. |
| 7,552,089 B2 | 6/2009 | Bruer et al. |
| 7,552,467 B2 | 6/2009 | Lindsay |
| 7,555,459 B2 | 6/2009 | Dhar et al. |
| 7,556,192 B2 | 7/2009 | Wokaty, Jr. |
| 7,558,748 B2 | 7/2009 | Ehring et al. |
| 7,558,795 B2 | 7/2009 | Malik et al. |
| 7,559,217 B2 | 7/2009 | Bass |
| 7,562,184 B2 | 7/2009 | Henmi et al. |
| 7,562,382 B2 | 7/2009 | Hinton et al. |
| 7,562,814 B1 | 7/2009 | Shao et al. |
| 7,571,138 B2 | 8/2009 | Miri et al. |
| 7,571,143 B2 | 8/2009 | Circenis et al. |
| 7,571,322 B2 | 8/2009 | Karoubi |
| 7,571,473 B1 | 8/2009 | Boydstun et al. |
| 7,575,152 B2 | 8/2009 | Graves et al. |
| 7,575,157 B2 | 8/2009 | Barnhardt et al. |
| 7,577,665 B2 | 8/2009 | Ramer et al. |
| 7,577,934 B2 | 8/2009 | Anonsen et al. |
| 7,580,884 B2 | 8/2009 | Cook |
| 7,581,112 B2 | 8/2009 | Brown et al. |
| 7,584,126 B1 | 9/2009 | White |
| 7,584,127 B2 | 9/2009 | Byrne et al. |
| 7,584,146 B1 | 9/2009 | Duhon |
| 7,587,363 B2 | 9/2009 | Cataline et al. |
| 7,587,368 B2 | 9/2009 | Felsher |
| 7,593,891 B2 | 9/2009 | Kornegay et al. |
| 7,594,019 B2 | 9/2009 | Clapper |
| 7,596,716 B2 | 9/2009 | Frost et al. |
| 7,603,314 B2 | 10/2009 | Siksa |
| 7,606,355 B2 | 10/2009 | Hutchison et al. |
| 7,606,752 B2 | 10/2009 | Hazlehurst et al. |
| 7,610,216 B1 | 10/2009 | May et al. |
| 7,610,229 B1 | 10/2009 | Kornegay |
| 7,613,600 B2 | 11/2009 | Krane |
| 7,613,656 B2 | 11/2009 | Stanley et al. |
| 7,620,383 B2 | 11/2009 | Taglienti et al. |
| 7,620,596 B2 | 11/2009 | Knudson et al. |
| 7,620,602 B2 | 11/2009 | Jakstadt et al. |
| 7,620,653 B1 | 11/2009 | Swartz |
| 7,623,844 B2 | 11/2009 | Herrmann et al. |
| 7,627,524 B2 | 12/2009 | Bennett et al. |
| 7,627,527 B1 | 12/2009 | Hildebrand |
| 7,630,903 B1 | 12/2009 | Vaidyanathan |
| 7,630,932 B2 | 12/2009 | Danaher et al. |
| 7,630,933 B2 | 12/2009 | Peterson et al. |
| 7,634,737 B2 | 12/2009 | Beringer et al. |
| 7,636,689 B2 | 12/2009 | Dent et al. |
| 7,640,200 B2 | 12/2009 | Gardner et al. |
| 7,640,209 B1 | 12/2009 | Brooks et al. |
| 7,644,023 B2 | 1/2010 | Kumar et al. |
| 7,644,035 B1 | 1/2010 | Biffle et al. |
| 7,644,036 B2 | 1/2010 | McCoy et al. |

(56) References Cited

U.S. PATENT DOCUMENTS

| | | |
|---|---|---|
| 7,647,274 B2 | 1/2010 | Peterson et al. |
| 7,647,344 B2 | 1/2010 | Skurtovich, Jr. et al. |
| 7,653,187 B2 | 1/2010 | Clark et al. |
| 7,653,591 B1 | 1/2010 | Dabney |
| 7,653,592 B1 | 1/2010 | Flaxman et al. |
| 7,653,600 B2 | 1/2010 | Gustin |
| 7,653,688 B2 | 1/2010 | Bittner |
| 7,657,484 B2 | 2/2010 | Ganesan et al. |
| 7,660,771 B2 | 2/2010 | Orcutt |
| 7,665,657 B2 | 2/2010 | Huh |
| 7,668,738 B2 | 2/2010 | Wiggins |
| 7,668,766 B1 | 2/2010 | Goodwin, III et al. |
| 7,672,833 B2 | 3/2010 | Blume et al. |
| 7,676,410 B2 | 3/2010 | Petralia |
| 7,685,209 B1 | 3/2010 | Norton et al. |
| 7,685,525 B2 | 3/2010 | Kumar et al. |
| 7,686,214 B1 | 3/2010 | Shao et al. |
| 7,688,813 B2 | 3/2010 | Shin et al. |
| 7,689,487 B1 | 3/2010 | Britto et al. |
| 7,689,505 B2 | 3/2010 | Kasower |
| 7,689,563 B1 | 3/2010 | Jacobson |
| 7,689,716 B2 | 3/2010 | Short et al. |
| 7,690,032 B1 | 3/2010 | Peirce |
| 7,693,787 B2 | 4/2010 | Provinse |
| 7,693,790 B2 | 4/2010 | Lawlor et al. |
| 7,698,214 B1 | 4/2010 | Lindgren |
| 7,698,217 B1 | 4/2010 | Phillips et al. |
| 7,702,579 B2 | 4/2010 | Neely |
| 7,707,109 B2 | 4/2010 | Odijk et al. |
| 7,707,117 B1 | 4/2010 | Jimenez et al. |
| 7,707,122 B2 | 4/2010 | Hull et al. |
| 7,707,271 B2 | 4/2010 | Rudkin et al. |
| 7,708,190 B2 | 5/2010 | Brandt et al. |
| 7,708,191 B2 | 5/2010 | Vega |
| 7,711,635 B2 | 5/2010 | Steele et al. |
| 7,711,645 B2 | 5/2010 | Morello |
| 7,711,690 B1 | 5/2010 | Garrison et al. |
| 7,711,707 B2 | 5/2010 | Kelley |
| 7,715,832 B2 | 5/2010 | Zhou |
| 7,716,132 B1 | 5/2010 | Spies et al. |
| 7,720,705 B2 | 5/2010 | Stein |
| 7,720,760 B1 | 5/2010 | Cook et al. |
| 7,720,846 B1 | 5/2010 | Bayliss |
| 7,725,330 B2 | 5/2010 | Rao et al. |
| 7,725,385 B2 | 5/2010 | Royer et al. |
| 7,729,283 B2 | 6/2010 | Ferguson et al. |
| 7,729,959 B1 | 6/2010 | Wells et al. |
| 7,730,078 B2 | 6/2010 | Schwabe et al. |
| 7,734,522 B2 | 6/2010 | Johnson et al. |
| 7,734,541 B2 | 6/2010 | Kumar et al. |
| 7,734,543 B2 | 6/2010 | Braco |
| 7,734,637 B2 | 6/2010 | Greifeneder et al. |
| 7,739,193 B2 | 6/2010 | Zimmer et al. |
| 7,739,707 B2 | 6/2010 | Sie et al. |
| 7,746,496 B2 | 6/2010 | Henry et al. |
| 7,747,520 B2 | 6/2010 | Livermore et al. |
| 7,747,521 B2 | 6/2010 | Serio |
| 7,752,095 B1 | 7/2010 | Laracey et al. |
| 7,752,130 B2 | 7/2010 | Byrd et al. |
| 7,752,132 B2 | 7/2010 | Stewart et al. |
| 7,756,787 B1 | 7/2010 | Hilton |
| 7,756,789 B2 | 7/2010 | Welker et al. |
| 7,761,373 B2 | 7/2010 | Metz |
| 7,761,384 B2 | 7/2010 | Madhogarhia |
| 7,765,148 B2 | 7/2010 | German et al. |
| 7,765,166 B2 | 7/2010 | Beringer et al. |
| 7,769,651 B2 | 8/2010 | Fine et al. |
| 7,769,697 B2 | 8/2010 | Fieschi et al. |
| 7,769,998 B2 | 8/2010 | Lynch et al. |
| 7,774,257 B2 | 8/2010 | Maggioncalda et al. |
| 7,774,270 B1 | 8/2010 | MacCloskey |
| 7,778,901 B2 | 8/2010 | Ganesan et al. |
| 7,780,075 B2 | 8/2010 | Cooper et al. |
| 7,783,515 B1 | 8/2010 | Kumar et al. |
| 7,787,869 B2 | 8/2010 | Rice et al. |
| 7,788,040 B2 | 8/2010 | Haskell et al. |
| 7,788,172 B2 | 8/2010 | Kight et al. |
| 7,792,715 B1 | 9/2010 | Kasower |
| 7,792,725 B2 | 9/2010 | Booraem et al. |
| 7,792,743 B2 | 9/2010 | Koningstein et al. |
| 7,792,747 B2 | 9/2010 | Chin |
| 7,792,749 B2 | 9/2010 | Ganesan |
| 7,792,903 B2 | 9/2010 | Fischer et al. |
| 7,793,835 B1 | 9/2010 | Coggeshall et al. |
| 7,797,252 B2 | 9/2010 | Rosskamm et al. |
| 7,797,734 B2 | 9/2010 | Babi et al. |
| 7,801,807 B2 | 9/2010 | DeFrancesco et al. |
| 7,801,811 B1 | 9/2010 | Merrell et al. |
| 7,801,956 B1 | 9/2010 | Cumberbatch et al. |
| 7,802,104 B2 | 9/2010 | Dickinson |
| 7,805,362 B1 | 9/2010 | Merrell et al. |
| 7,809,398 B2 | 10/2010 | Pearson |
| 7,809,797 B2 | 10/2010 | Cooley et al. |
| 7,810,036 B2 | 10/2010 | Bales et al. |
| 7,813,943 B1 | 10/2010 | Lefco et al. |
| 7,814,002 B2 | 10/2010 | DeFrancesco et al. |
| 7,814,005 B2 | 10/2010 | Imrey et al. |
| 7,818,228 B1 | 10/2010 | Coulter |
| 7,818,229 B2 | 10/2010 | Imrey et al. |
| 7,827,108 B2 | 11/2010 | Perlman et al. |
| 7,827,115 B2 | 11/2010 | Weller et al. |
| 7,831,521 B1 | 11/2010 | Ball et al. |
| 7,832,006 B2 | 11/2010 | Chen et al. |
| 7,835,983 B2 | 11/2010 | Lefner et al. |
| 7,835,990 B2 | 11/2010 | Coleman |
| 7,836,197 B2 | 11/2010 | Isaac et al. |
| 7,840,484 B2 | 11/2010 | Haggerty et al. |
| 7,841,004 B1 | 11/2010 | Balducci et al. |
| 7,841,008 B1 | 11/2010 | Cole et al. |
| 7,844,520 B1 | 11/2010 | Franklin |
| 7,844,522 B2 | 11/2010 | Fong |
| 7,844,604 B2 | 11/2010 | Baio et al. |
| 7,848,972 B1 | 12/2010 | Sharma |
| 7,848,974 B2 | 12/2010 | Sheehan |
| 7,848,978 B2 | 12/2010 | Imrey et al. |
| 7,849,014 B2 | 12/2010 | Erikson |
| 7,853,436 B2 | 12/2010 | McConnell et al. |
| 7,853,493 B2 | 12/2010 | DeBie et al. |
| 7,853,522 B2 | 12/2010 | Chin |
| 7,856,203 B2 | 12/2010 | Lipovski |
| 7,856,386 B2 | 12/2010 | Hazlehurst et al. |
| 7,856,453 B2 | 12/2010 | Malik et al. |
| 7,861,287 B2 | 12/2010 | Pomerantz |
| 7,870,025 B2 | 1/2011 | English |
| 7,870,066 B2 | 1/2011 | Lin et al. |
| 7,870,068 B2 | 1/2011 | Chin |
| 7,870,077 B2 | 1/2011 | Woo et al. |
| 7,870,078 B2 | 1/2011 | Clark et al. |
| 7,873,441 B2 | 1/2011 | Synesiou et al. |
| 7,877,304 B1 | 1/2011 | Coulter |
| 7,877,784 B2 | 1/2011 | Chow et al. |
| RE42,154 E | 2/2011 | Walker et al. |
| 7,880,728 B2 | 2/2011 | de los Reyes et al. |
| 7,885,637 B2 | 2/2011 | Immonen et al. |
| 7,890,358 B2 | 2/2011 | Dutta et al. |
| 7,890,371 B2 | 2/2011 | Chao |
| 7,890,403 B1 | 2/2011 | Smith |
| 7,895,107 B2 | 2/2011 | Lapstun et al. |
| 7,899,750 B1 | 3/2011 | Klieman et al. |
| 7,904,354 B2 | 3/2011 | Pepe et al. |
| 7,908,242 B1 | 3/2011 | Achanta |
| 7,909,246 B2 | 3/2011 | Hogg et al. |
| 7,911,673 B1 | 3/2011 | Yap |
| 7,912,842 B1 | 3/2011 | Bayliss et al. |
| 7,912,865 B2 | 3/2011 | Akerman et al. |
| 7,917,410 B2 | 3/2011 | Morimoto |
| 7,917,435 B2 | 3/2011 | Hall et al. |
| 7,925,582 B1 | 4/2011 | Kornegay et al. |
| 7,925,982 B2 | 4/2011 | Parker |
| 7,930,285 B2 | 4/2011 | Abraham et al. |
| 7,933,834 B2 | 4/2011 | Kumar et al. |
| 7,937,323 B2 | 5/2011 | Wagner et al. |
| 7,937,325 B2 | 5/2011 | Kumar et al. |
| 7,945,240 B1 | 5/2011 | Klock et al. |

(56) References Cited

U.S. PATENT DOCUMENTS

| | | |
|---|---|---|
| 7,945,491 B2 | 5/2011 | Sharma |
| 7,949,609 B2 | 5/2011 | Colella |
| 7,953,660 B2 | 5/2011 | Ganesan et al. |
| 7,954,698 B1 | 6/2011 | Pliha |
| 7,958,046 B2 | 6/2011 | Doerner et al. |
| 7,958,049 B2 | 6/2011 | Jamison et al. |
| 7,962,410 B2 | 6/2011 | Tosswill |
| 7,966,192 B2 | 6/2011 | Pagliari et al. |
| 7,966,325 B2 | 6/2011 | Singh |
| 7,970,669 B1 | 6/2011 | Santos |
| 7,970,676 B2 | 6/2011 | Feinstein |
| 7,970,679 B2 | 6/2011 | Kasower |
| 7,970,698 B2 | 6/2011 | Gupta et al. |
| 7,970,701 B2 | 6/2011 | Lewis et al. |
| 7,975,299 B1 | 7/2011 | Balducci et al. |
| 7,979,908 B2 | 7/2011 | Millwee |
| 7,983,932 B2 | 7/2011 | Kane |
| 7,987,501 B2 | 7/2011 | Miller et al. |
| 7,990,895 B2 | 8/2011 | Ferguson et al. |
| 7,991,688 B2 | 8/2011 | Phelan et al. |
| 7,995,991 B2 | 8/2011 | Johnson et al. |
| 7,996,310 B1 | 8/2011 | Edwards et al. |
| 8,001,045 B1 | 8/2011 | McClinton |
| 8,001,153 B2 | 8/2011 | Skurtovich, Jr. et al. |
| 8,001,235 B2 | 8/2011 | Russ et al. |
| 8,005,754 B2 | 8/2011 | McCoy et al. |
| 8,006,261 B1 | 8/2011 | Haberman et al. |
| 8,015,107 B2 | 9/2011 | Kornegay et al. |
| 8,032,932 B2 | 10/2011 | Speyer et al. |
| 8,036,941 B2 | 10/2011 | Bennett et al. |
| 8,036,961 B2 | 10/2011 | Ducolon et al. |
| 8,037,097 B2 | 10/2011 | Guo et al. |
| 8,037,506 B2 | 10/2011 | Cooper et al. |
| 8,055,579 B2 | 11/2011 | Davies et al. |
| 8,055,904 B1 | 11/2011 | Cato et al. |
| 8,060,424 B2 | 11/2011 | Kasower |
| 8,060,438 B2 | 11/2011 | Dhar et al. |
| 8,060,441 B2 | 11/2011 | Stewart et al. |
| 8,060,916 B2 | 11/2011 | Bajaj et al. |
| 8,065,233 B2 | 11/2011 | Lee et al. |
| 8,069,066 B2 | 11/2011 | Stevens et al. |
| 8,069,407 B1 | 11/2011 | Armandpour et al. |
| 8,073,773 B2 | 12/2011 | Kozee et al. |
| 8,073,774 B2 | 12/2011 | Pousti |
| 8,073,777 B2 | 12/2011 | Barry et al. |
| 8,078,453 B2 | 12/2011 | Shaw |
| 8,078,516 B1 | 12/2011 | Weiss et al. |
| 8,078,524 B2 | 12/2011 | Crawford et al. |
| 8,078,527 B2 | 12/2011 | Cerise et al. |
| 8,078,528 B1 | 12/2011 | Vicente et al. |
| 8,078,881 B1 | 12/2011 | Liu |
| 8,086,219 B2 | 12/2011 | O'Neil et al. |
| 8,086,524 B1 | 12/2011 | Craig et al. |
| 8,095,443 B2 | 1/2012 | DeBie |
| 8,095,458 B2 | 1/2012 | Peterson et al. |
| 8,099,298 B2 | 1/2012 | Coleman et al. |
| 8,099,309 B1 | 1/2012 | Bober |
| 8,099,341 B2 | 1/2012 | Varghese |
| 8,099,356 B2 | 1/2012 | Feinstein et al. |
| 8,099,376 B2 | 1/2012 | Serrano-Morales et al. |
| 8,103,587 B2 | 1/2012 | Kumar et al. |
| 8,104,671 B2 | 1/2012 | Besecker et al. |
| 8,104,679 B2 | 1/2012 | Brown |
| 8,108,272 B2 | 1/2012 | Sorbe et al. |
| 8,108,301 B2 | 1/2012 | Gupta et al. |
| 8,112,354 B2 | 2/2012 | Lalwani et al. |
| 8,117,077 B2 | 2/2012 | Lin |
| 8,117,100 B1 | 2/2012 | Hopkins |
| 8,121,894 B2 | 2/2012 | Mason |
| 8,121,945 B2 | 2/2012 | Rackley, III et al. |
| 8,121,947 B1 | 2/2012 | Barth et al. |
| 8,126,456 B2 | 2/2012 | Lotter et al. |
| 8,127,982 B1 | 3/2012 | Casey et al. |
| 8,127,986 B2 | 3/2012 | Taylor et al. |
| 8,131,685 B1 | 3/2012 | Gedalius et al. |
| 8,131,777 B2 | 3/2012 | McCullouch |
| 8,140,432 B2 | 3/2012 | Johnson |
| 8,140,649 B2 | 3/2012 | Durand et al. |
| 8,145,188 B2 | 3/2012 | Park et al. |
| 8,145,554 B2 | 3/2012 | Kumar et al. |
| 8,145,568 B2 | 3/2012 | Rackley, III et al. |
| 8,150,754 B2 | 4/2012 | Leggatt et al. |
| 8,152,061 B2 | 4/2012 | Wolfe et al. |
| 8,160,959 B2 | 4/2012 | Rackley, III et al. |
| 8,160,960 B1 | 4/2012 | Fei et al. |
| 8,170,931 B2 | 5/2012 | Ross et al. |
| 8,175,889 B1 | 5/2012 | Girulat et al. |
| 8,175,969 B2 | 5/2012 | Yang et al. |
| 8,180,686 B2 | 5/2012 | Ryu et al. |
| 8,180,691 B2 | 5/2012 | Cao et al. |
| 8,185,472 B1 | 5/2012 | Boyd et al. |
| 8,195,549 B2 | 6/2012 | Kasower |
| 8,195,566 B2 | 6/2012 | Tsui et al. |
| 8,195,567 B2 | 6/2012 | Cinelli et al. |
| 8,201,257 B1 | 6/2012 | Andres et al. |
| 8,204,788 B1 | 6/2012 | Ivankovich et al. |
| 8,204,812 B2 | 6/2012 | Stewart et al. |
| 8,219,771 B2 | 7/2012 | Le Neel |
| 8,224,723 B2 | 7/2012 | Bosch et al. |
| 8,224,747 B2 | 7/2012 | Kumar et al. |
| 8,225,395 B2 | 7/2012 | Atwood et al. |
| 8,229,762 B2 | 7/2012 | Romans |
| 8,229,911 B2 | 7/2012 | Bennett |
| 8,234,498 B2 | 7/2012 | Britti et al. |
| 8,244,609 B2 | 8/2012 | Prakash et al. |
| 8,244,848 B1 | 8/2012 | Narayanan et al. |
| 8,249,961 B1 | 8/2012 | Hopkins |
| 8,249,965 B2 | 8/2012 | Tumminaro |
| 8,249,968 B1 | 8/2012 | Oldham et al. |
| 8,255,327 B2 | 8/2012 | Kemper et al. |
| 8,260,682 B2 | 9/2012 | Rigole |
| 8,260,694 B1 | 9/2012 | Lauer et al. |
| 8,261,970 B2 | 9/2012 | Suginaka |
| 8,261,974 B2 | 9/2012 | Hull |
| 8,265,591 B1 | 9/2012 | Abidogun et al. |
| 8,271,362 B2 | 9/2012 | Fasching |
| 8,271,393 B2 | 9/2012 | Twining et al. |
| 8,275,636 B2 | 9/2012 | Berg et al. |
| 8,275,710 B1 | 9/2012 | Hildebrand |
| 8,280,789 B2 | 10/2012 | Menzel |
| 8,280,792 B2 | 10/2012 | Rajan et al. |
| 8,280,810 B2 | 10/2012 | Grandcolas et al. |
| 8,281,372 B1 | 10/2012 | Vidal |
| 8,285,613 B1 | 10/2012 | Coulter |
| 8,285,640 B2 | 10/2012 | Scipioni |
| 8,285,641 B2 | 10/2012 | Cataline et al. |
| 8,285,656 B1 | 10/2012 | Chang et al. |
| 8,290,835 B2 | 10/2012 | Homer et al. |
| 8,290,840 B2 | 10/2012 | Kasower |
| 8,290,856 B1 | 10/2012 | Kasower |
| 8,290,865 B2 | 10/2012 | Lawrence et al. |
| 8,296,229 B1 | 10/2012 | Yellin et al. |
| 8,306,861 B2 | 11/2012 | Dunsmore et al. |
| 8,311,942 B1 | 11/2012 | Mason |
| 8,312,033 B1 | 11/2012 | McMillan |
| 8,315,945 B1 | 11/2012 | Gupta |
| 8,321,339 B2 | 11/2012 | Imrey et al. |
| 8,326,747 B2 | 12/2012 | Ang et al. |
| 8,326,770 B1 | 12/2012 | Weisman |
| 8,327,429 B2 | 12/2012 | Speyer et al. |
| 8,332,241 B2 | 12/2012 | Harrell et al. |
| 8,335,739 B1 | 12/2012 | Bol et al. |
| 8,335,741 B2 | 12/2012 | Kornegay et al. |
| 8,346,615 B2 | 1/2013 | Connors et al. |
| 8,352,365 B1 | 1/2013 | Goldberg et al. |
| 8,353,448 B1 | 1/2013 | Miller et al. |
| 8,355,966 B1 | 1/2013 | Vu et al. |
| 8,355,967 B2 | 1/2013 | Debie et al. |
| 8,359,003 B1 | 1/2013 | Gailloux et al. |
| 8,359,266 B2 | 1/2013 | Seale, III et al. |
| 8,364,711 B2 | 1/2013 | Wilkins et al. |
| 8,370,229 B2 | 2/2013 | Moduga et al. |
| 8,370,256 B1 | 2/2013 | Murphy |
| 8,374,962 B2 | 2/2013 | Abelman et al. |

(56) References Cited

U.S. PATENT DOCUMENTS

| | | |
|---|---|---|
| 8,374,973 B2 | 2/2013 | Herbrich et al. |
| 8,385,521 B2 | 2/2013 | Rustagi et al. |
| 8,386,341 B2 | 2/2013 | Bennett et al. |
| 8,391,846 B1 | 3/2013 | Mankovich |
| 8,392,272 B2 | 3/2013 | Lin |
| 8,392,300 B1 | 3/2013 | Battula et al. |
| 8,401,941 B1 | 3/2013 | Havemose |
| 8,401,965 B2 | 3/2013 | Johnson et al. |
| 8,401,966 B2 | 3/2013 | Stewart et al. |
| 8,407,141 B2 | 3/2013 | Mullen et al. |
| 8,407,194 B1 | 3/2013 | Chaput et al. |
| 8,412,593 B1 | 4/2013 | Song et al. |
| 8,417,627 B2 | 4/2013 | Cerise et al. |
| 8,417,635 B2 | 4/2013 | Kalra et al. |
| 8,417,644 B2 | 4/2013 | Ferguson et al. |
| 8,423,387 B1 | 4/2013 | Mirza |
| 8,423,452 B1 | 4/2013 | Ley et al. |
| 8,423,461 B2 | 4/2013 | Mukherjee |
| 8,423,463 B1 | 4/2013 | Matthews et al. |
| 8,423,563 B2 | 4/2013 | Chang et al. |
| 8,423,653 B2 | 4/2013 | Chang et al. |
| 8,429,073 B2 | 4/2013 | Ferguson et al. |
| 8,433,654 B2 | 4/2013 | Subbarao et al. |
| 8,438,063 B2 | 5/2013 | Albisu |
| 8,443,202 B2 | 5/2013 | White et al. |
| 8,447,667 B1 | 5/2013 | Dinamani |
| 8,452,704 B2 | 5/2013 | Barbara et al. |
| 8,452,708 B1 | 5/2013 | Birenbaum et al. |
| 8,453,940 B2 | 6/2013 | Diamond |
| 8,456,293 B1 | 6/2013 | Trundle et al. |
| 8,458,062 B2 | 6/2013 | Dutt et al. |
| 8,463,831 B2 | 6/2013 | Harris et al. |
| 8,463,939 B1 | 6/2013 | Galvin |
| 8,464,939 B1 | 6/2013 | Taylor et al. |
| 8,473,318 B2 | 6/2013 | Nielson et al. |
| 8,473,394 B2 | 6/2013 | Marshall |
| 8,467,766 B2 | 7/2013 | Rackley, III et al. |
| 8,478,674 B1 | 7/2013 | Kapczynski et al. |
| 8,483,473 B2 | 7/2013 | Roach et al. |
| 8,484,104 B1 | 7/2013 | Hurlbutt et al. |
| 8,484,131 B2 | 7/2013 | Kelly et al. |
| 8,484,186 B1 | 7/2013 | Kapczynski et al. |
| 8,489,067 B2 | 7/2013 | Rackley, III et al. |
| 8,489,504 B1 | 7/2013 | Gupta |
| 8,489,513 B2 | 7/2013 | Bishop et al. |
| 8,489,720 B1 | 7/2013 | Morford et al. |
| 8,490,126 B2 | 7/2013 | Walter et al. |
| 8,490,871 B1 | 7/2013 | Miller et al. |
| 8,494,958 B2 | 7/2013 | Schoenberg et al. |
| 8,498,613 B2 | 7/2013 | Aebi |
| 8,498,900 B1 | 7/2013 | Spirin et al. |
| 8,498,914 B2 | 7/2013 | Hazelhurst |
| 8,498,932 B2 | 7/2013 | Matthews |
| 8,499,348 B1 | 7/2013 | Rubin |
| 8,500,006 B2 | 8/2013 | Carlson et al. |
| 8,504,394 B2 | 8/2013 | Nutkiewicz et al. |
| 8,504,470 B1 | 8/2013 | Chirehdast |
| 8,504,474 B2 | 8/2013 | Armes et al. |
| 8,510,220 B2 | 8/2013 | Rackley, III et al. |
| 8,510,223 B2 | 8/2013 | Blair et al. |
| 8,515,825 B1 | 8/2013 | Ross, Jr. et al. |
| 8,515,828 B1 | 8/2013 | Wolf et al. |
| 8,515,842 B2 | 8/2013 | Papadimitriou |
| 8,515,844 B2 | 8/2013 | Kasower |
| 8,521,657 B2 | 8/2013 | Kuebert et al. |
| 8,527,357 B1 | 9/2013 | Ganesan |
| 8,527,377 B2 | 9/2013 | D'Englere |
| 8,527,410 B2 | 9/2013 | Markki et al. |
| 8,527,413 B2 | 9/2013 | Heller |
| 8,527,596 B2 | 9/2013 | Long et al. |
| 8,528,813 B1 | 9/2013 | Blossom |
| 8,533,118 B2 | 9/2013 | Weller et al. |
| 8,538,871 B2 | 9/2013 | Portillo et al. |
| 8,538,874 B2 | 9/2013 | Thomas |
| 8,538,878 B2 | 9/2013 | Meier et al. |
| 8,458,907 B1 | 10/2013 | Campbell |
| 8,548,832 B2 | 10/2013 | Ika et al. |
| 8,555,357 B1 | 10/2013 | Gauvin |
| 8,560,410 B2 | 10/2013 | Narkar |
| 8,560,436 B2 | 10/2013 | Ingram et al. |
| 8,560,444 B2 | 10/2013 | Rosenblatt et al. |
| 8,560,447 B1 | 10/2013 | Hinghole et al. |
| 8,560,450 B2 | 10/2013 | Kumar et al. |
| 8,572,083 B1 | 10/2013 | Snell et al. |
| 8,578,036 B1 | 11/2013 | Holfelder et al. |
| 8,578,496 B1 | 11/2013 | Krishnappa |
| 8,600,886 B2 | 12/2013 | Ramavarjula et al. |
| 8,601,602 B1 | 12/2013 | Zheng |
| 8,606,694 B2 | 12/2013 | Campbell et al. |
| 8,630,938 B2 | 1/2014 | Cheng et al. |
| 8,646,051 B2 | 2/2014 | Paden et al. |
| 8,671,115 B2 | 3/2014 | Skurtovich, Jr. et al. |
| 8,688,543 B2 | 4/2014 | Dominguez |
| 8,689,001 B1 | 4/2014 | Satish |
| 8,705,718 B2 | 4/2014 | Baniak et al. |
| 8,706,599 B1 | 4/2014 | Koenig et al. |
| 8,725,613 B1 | 5/2014 | Celka et al. |
| 8,738,516 B1 | 5/2014 | Dean et al. |
| 8,745,698 B1 | 6/2014 | Ashfield et al. |
| 8,751,378 B2 | 6/2014 | Dornhelm et al. |
| 8,768,914 B2 | 7/2014 | Scriffignano et al. |
| 8,775,299 B2 | 7/2014 | Achanta et al. |
| 8,781,951 B2 | 7/2014 | Lewis et al. |
| 8,781,953 B2 | 7/2014 | Kasower |
| 8,782,217 B1 | 7/2014 | Arone et al. |
| 8,818,888 B1 | 8/2014 | Kapczynski et al. |
| 8,856,894 B1 | 10/2014 | Dean et al. |
| 8,856,945 B2 | 10/2014 | Carter et al. |
| 8,860,763 B2 | 10/2014 | Privault et al. |
| 8,930,251 B2 | 1/2015 | DeBie |
| 8,930,263 B1 | 1/2015 | Mahacek et al. |
| 8,938,399 B1 | 1/2015 | Herman |
| 8,949,981 B1 | 2/2015 | Trollope et al. |
| 8,954,459 B1 | 2/2015 | McMillan et al. |
| 8,972,400 B1 | 3/2015 | Kapczynski et al. |
| 9,058,627 B1 | 6/2015 | Wasser et al. |
| 9,106,691 B1 | 8/2015 | Burger et al. |
| 9,147,042 B1 | 9/2015 | Haller et al. |
| 9,218,481 B2 | 10/2015 | Belisario |
| 9,183,377 B1 | 11/2015 | Sobel et al. |
| 9,225,704 B1 | 12/2015 | Johansson et al. |
| 9,230,283 B1 | 1/2016 | Taylor et al. |
| 9,256,624 B2 | 2/2016 | Skurtovich, Jr. et al. |
| 9,256,904 B1 | 2/2016 | Haller et al. |
| 9,400,589 B1 | 7/2016 | Wasser et al. |
| 9,406,085 B1 | 8/2016 | Hunt, III et al. |
| 9,443,268 B1 | 9/2016 | Kapczynski et al. |
| 9,477,737 B1 | 10/2016 | Charyk et al. |
| 9,483,606 B1 | 11/2016 | Dean et al. |
| 9,501,583 B2 | 11/2016 | Nordstrom et al. |
| 9,536,263 B1 | 1/2017 | Dean et al. |
| 9,542,553 B1 | 1/2017 | Burger et al. |
| 9,542,682 B1 | 1/2017 | Taylor et al. |
| 9,654,541 B1 | 5/2017 | Kapczynski et al. |
| 9,665,854 B1 | 5/2017 | Burger et al. |
| 9,697,568 B1 | 7/2017 | Hunt, III |
| 9,710,523 B2 | 7/2017 | Skurtovich, Jr. et al. |
| 9,710,852 B1 | 7/2017 | Olson et al. |
| 9,767,513 B1 | 9/2017 | Taylor et al. |
| 9,830,646 B1 | 11/2017 | Wasser et al. |
| 9,853,959 B1 | 12/2017 | Kapczynski et al. |
| 9,870,589 B1 | 1/2018 | Arnold et al. |
| 9,892,457 B1 | 2/2018 | Kapczynski |
| 9,916,621 B1 | 3/2018 | Wasser et al. |
| 9,972,048 B1 | 5/2018 | Dean et al. |
| 9,990,674 B1 | 6/2018 | Taylor et al. |
| 10,025,842 B1 | 7/2018 | Charyk et al. |
| 10,043,214 B1 | 8/2018 | Hunt, III |
| 10,061,936 B1 | 8/2018 | Burger et al. |
| 10,075,446 B2 | 9/2018 | McMillan et al. |
| 2001/0005840 A1 | 6/2001 | Verkama |
| 2001/0014878 A1 | 8/2001 | Mitra et al. |
| 2001/0029470 A1 | 10/2001 | Schultz et al. |
| 2001/0029482 A1 | 10/2001 | Tealdi et al. |

(56) References Cited

U.S. PATENT DOCUMENTS

| | | |
|---|---|---|
| 2001/0032181 A1 | 10/2001 | Jakstadt et al. |
| 2001/0034618 A1 | 10/2001 | Kessler et al. |
| 2001/0034631 A1 | 10/2001 | Kiselik |
| 2001/0037204 A1 | 11/2001 | Horn et al. |
| 2001/0037289 A1 | 11/2001 | Mayr et al. |
| 2001/0037295 A1 | 11/2001 | Olsen |
| 2001/0037297 A1 | 11/2001 | McNair |
| 2001/0039532 A1 | 11/2001 | Coleman, Jr. et al. |
| 2001/0039563 A1 | 11/2001 | Tian |
| 2001/0042785 A1 | 11/2001 | Walker et al. |
| 2001/0044729 A1 | 11/2001 | Pomerance |
| 2001/0044756 A1 | 11/2001 | Watkins et al. |
| 2001/0044764 A1 | 11/2001 | Arnold |
| 2001/0047332 A1 | 11/2001 | Gonen-Friedman et al. |
| 2001/0049274 A1 | 12/2001 | Degraeve |
| 2001/0056390 A1 | 12/2001 | Varadarajan et al. |
| 2002/0010616 A1 | 1/2002 | Itzaki |
| 2002/0013827 A1 | 1/2002 | Edstrom et al. |
| 2002/0013899 A1 | 1/2002 | Faul |
| 2002/0016767 A1 | 2/2002 | Johnston |
| 2002/0016771 A1 | 2/2002 | Carothers et al. |
| 2002/0026423 A1 | 2/2002 | Maritzen et al. |
| 2002/0029192 A1 | 3/2002 | Nakagawa et al. |
| 2002/0032611 A1 | 3/2002 | Khan |
| 2002/0032635 A1 | 3/2002 | Harris et al. |
| 2002/0033846 A1 | 3/2002 | Balasubramanian et al. |
| 2002/0035480 A1 | 3/2002 | Gordon et al. |
| 2002/0040355 A1 | 4/2002 | Weiner |
| 2002/0042715 A1 | 4/2002 | Kelley |
| 2002/0045154 A1 | 4/2002 | Wood et al. |
| 2002/0046185 A1 | 4/2002 | Villart et al. |
| 2002/0052841 A1 | 5/2002 | Guthrie et al. |
| 2002/0055906 A1 | 5/2002 | Katz et al. |
| 2002/0059139 A1 | 5/2002 | Evans |
| 2002/0059201 A1 | 5/2002 | Work |
| 2002/0062249 A1 | 5/2002 | Iannacci |
| 2002/0065772 A1 | 5/2002 | Saliba et al. |
| 2002/0069122 A1 | 6/2002 | Yun et al. |
| 2002/0069165 A1 | 6/2002 | O'Neil |
| 2002/0069168 A1 | 6/2002 | Lee et al. |
| 2002/0069182 A1 | 6/2002 | Dwyer |
| 2002/0073017 A1 | 6/2002 | Robertson |
| 2002/0077964 A1 | 6/2002 | Brody et al. |
| 2002/0077978 A1 | 6/2002 | O'Leary et al. |
| 2002/0087460 A1 | 7/2002 | Hornung |
| 2002/0087488 A1 | 7/2002 | Fordahl et al. |
| 2002/0091635 A1 | 7/2002 | Dilip et al. |
| 2002/0099612 A1 | 7/2002 | Seaman et al. |
| 2002/0099635 A1 | 7/2002 | Guiragosian |
| 2002/0103933 A1 | 8/2002 | Garon et al. |
| 2002/0111816 A1 | 8/2002 | Lortscher et al. |
| 2002/0111890 A1 | 8/2002 | Sloan et al. |
| 2002/0116331 A1 | 8/2002 | Cataline et al. |
| 2002/0120581 A1 | 8/2002 | Schiavone et al. |
| 2002/0120757 A1 | 8/2002 | Sutherland et al. |
| 2002/0120846 A1 | 8/2002 | Stewart et al. |
| 2002/0128917 A1 | 9/2002 | Grounds |
| 2002/0128962 A1 | 9/2002 | Kasower |
| 2002/0133365 A1 | 9/2002 | Grey et al. |
| 2002/0133462 A1 | 9/2002 | Shteyn |
| 2002/0133504 A1 | 9/2002 | Vlahos et al. |
| 2002/0138409 A1 | 9/2002 | Bass |
| 2002/0138470 A1 | 9/2002 | Zhou |
| 2002/0143674 A1 | 10/2002 | Beckman |
| 2002/0143943 A1 | 10/2002 | Lee et al. |
| 2002/0147801 A1 | 10/2002 | Gullotta et al. |
| 2002/0152166 A1 | 10/2002 | Dutta et al. |
| 2002/0156676 A1 | 10/2002 | Ahrens et al. |
| 2002/0161664 A1 | 10/2002 | Shaya et al. |
| 2002/0169747 A1 | 11/2002 | Chapman et al. |
| 2002/0173994 A1 | 11/2002 | Ferguson, III |
| 2002/0174048 A1 | 11/2002 | Dheer et al. |
| 2002/0174061 A1 | 11/2002 | Srinivasan et al. |
| 2002/0194120 A1 | 12/2002 | Russell et al. |
| 2002/0194140 A1 | 12/2002 | Makuck |
| 2002/0198798 A1 | 12/2002 | Ludwig et al. |
| 2002/0198800 A1 | 12/2002 | Shamrakov |
| 2002/0198806 A1 | 12/2002 | Blagg et al. |
| 2002/0198822 A1 | 12/2002 | Munoz et al. |
| 2002/0198824 A1 | 12/2002 | Cook |
| 2002/0198828 A1 | 12/2002 | Ludwig et al. |
| 2002/0198829 A1 | 12/2002 | Ludwig et al. |
| 2002/0198830 A1 | 12/2002 | Randell et al. |
| 2002/0198835 A1 | 12/2002 | Watson et al. |
| 2003/0002671 A1 | 1/2003 | Inchalik et al. |
| 2003/0004853 A1 | 1/2003 | Ram et al. |
| 2003/0004855 A1 | 1/2003 | Dutta et al. |
| 2003/0007283 A1 | 1/2003 | Ostwald et al. |
| 2003/0009301 A1 | 1/2003 | Anand et al. |
| 2003/0009411 A1 | 1/2003 | Ram et al. |
| 2003/0009415 A1 | 1/2003 | Lutnick et al. |
| 2003/0009418 A1 | 1/2003 | Green et al. |
| 2003/0009426 A1 | 1/2003 | Ruiz-Sanchez |
| 2003/0018578 A1 | 1/2003 | Schultz |
| 2003/0023531 A1 | 1/2003 | Fergusson |
| 2003/0023555 A1 | 1/2003 | Rees |
| 2003/0028466 A1 | 2/2003 | Jenson et al. |
| 2003/0028477 A1 | 2/2003 | Stevenson et al. |
| 2003/0028529 A1 | 2/2003 | Cheung |
| 2003/0036995 A1 | 2/2003 | Lazerson |
| 2003/0046311 A1 | 3/2003 | Baidya et al. |
| 2003/0050929 A1 | 3/2003 | Bookman et al. |
| 2003/0061104 A1 | 3/2003 | Thomson et al. |
| 2003/0061155 A1 | 3/2003 | Chin |
| 2003/0061163 A1 | 3/2003 | Durfield |
| 2003/0069839 A1 | 4/2003 | Whittington et al. |
| 2003/0069943 A1 | 4/2003 | Bahrs et al. |
| 2003/0093311 A1 | 5/2003 | Knowlson |
| 2003/0097342 A1 | 5/2003 | Whittingtom |
| 2003/0097380 A1 | 5/2003 | Mulhern et al. |
| 2003/0101111 A1 | 5/2003 | Dang et al. |
| 2003/0101344 A1 | 5/2003 | Wheeler et al. |
| 2003/0105646 A1 | 6/2003 | Siepser |
| 2003/0105710 A1 | 6/2003 | Barbara et al. |
| 2003/0105733 A1 | 6/2003 | Boreham |
| 2003/0105742 A1 | 6/2003 | Boreham et al. |
| 2003/0115133 A1 | 6/2003 | Bian |
| 2003/0130892 A1 | 7/2003 | Taono et al. |
| 2003/0154122 A1 | 8/2003 | Jackson, Jr. et al. |
| 2003/0154162 A1 | 8/2003 | Danaher et al. |
| 2003/0158960 A1 | 8/2003 | Engberg |
| 2003/0163418 A1 | 8/2003 | Marks |
| 2003/0163435 A1 | 8/2003 | Payone |
| 2003/0163513 A1 | 8/2003 | Schaeck et al. |
| 2003/0163733 A1 | 8/2003 | Barriga-Caceres et al. |
| 2003/0167229 A1 | 9/2003 | Ludwig et al. |
| 2003/0171942 A1 | 9/2003 | Gaito |
| 2003/0177090 A1 | 9/2003 | Eden |
| 2003/0187768 A1 | 10/2003 | Ryan et al. |
| 2003/0187837 A1 | 10/2003 | Culliss |
| 2003/0191701 A1 | 10/2003 | Haseltine et al. |
| 2003/0191711 A1 | 10/2003 | Jamison et al. |
| 2003/0191731 A1 | 10/2003 | Stewart et al. |
| 2003/0195859 A1 | 10/2003 | Lawrence |
| 2003/0196109 A1 | 10/2003 | Raley et al. |
| 2003/0204429 A1 | 10/2003 | Botscheck et al. |
| 2003/0204752 A1 | 10/2003 | Garrison |
| 2003/0208412 A1 | 11/2003 | Hillestad et al. |
| 2003/0212909 A1 | 11/2003 | Chandrashekhar |
| 2003/0217000 A1 | 11/2003 | Wichman |
| 2003/0219709 A1 | 11/2003 | Olenick et al. |
| 2003/0220858 A1 | 11/2003 | Lam et al. |
| 2003/0220871 A1 | 11/2003 | Clarke et al. |
| 2003/0225742 A1 | 12/2003 | Tenner et al. |
| 2003/0229580 A1 | 12/2003 | Gass et al. |
| 2003/0229590 A1 | 12/2003 | Byrne et al. |
| 2004/0001565 A1 | 1/2004 | Jones et al. |
| 2004/0002907 A1 | 1/2004 | Tosswill |
| 2004/0002916 A1 | 1/2004 | Timmerman et al. |
| 2004/0006536 A1 | 1/2004 | Kawashima et al. |
| 2004/0010458 A1 | 1/2004 | Friedman |
| 2004/0015714 A1 | 1/2004 | Abraham et al. |
| 2004/0015715 A1 | 1/2004 | Brown |
| 2004/0019549 A1 | 1/2004 | Gulbrandsen |

(56) References Cited

U.S. PATENT DOCUMENTS

| | | |
|---|---|---|
| 2004/0019799 A1 | 1/2004 | Vering et al. |
| 2004/0024671 A1 | 2/2004 | Freund |
| 2004/0024702 A1 | 2/2004 | Angel et al. |
| 2004/0024709 A1 | 2/2004 | Yu et al. |
| 2004/0024717 A1 | 2/2004 | Angel et al. |
| 2004/0030574 A1 | 2/2004 | DiCostanzo et al. |
| 2004/0030649 A1 | 2/2004 | Nelson et al. |
| 2004/0039586 A1 | 2/2004 | Garvey et al. |
| 2004/0044563 A1 | 3/2004 | Stein |
| 2004/0044601 A1 | 3/2004 | Kim et al. |
| 2004/0044628 A1 | 3/2004 | Mathew et al. |
| 2004/0044673 A1 | 3/2004 | Brady et al. |
| 2004/0046033 A1 | 3/2004 | Kolodziej et al. |
| 2004/0062213 A1 | 4/2004 | Koss |
| 2004/0078424 A1 | 4/2004 | Yairi et al. |
| 2004/0083159 A1 | 4/2004 | Crosby et al. |
| 2004/0088237 A1 | 5/2004 | Moenickheim et al. |
| 2004/0088255 A1 | 5/2004 | Zielke et al. |
| 2004/0093278 A1 | 5/2004 | Burchetta et al. |
| 2004/0098418 A1 | 5/2004 | Hein |
| 2004/0098546 A1 | 5/2004 | Bashant et al. |
| 2004/0102197 A1 | 5/2004 | Dietz |
| 2004/0107250 A1 | 6/2004 | Marciano |
| 2004/0110119 A1 | 6/2004 | Riconda et al. |
| 2004/0111359 A1 | 6/2004 | Hudock |
| 2004/0117302 A1 | 6/2004 | Weichert et al. |
| 2004/0122681 A1 | 6/2004 | Ruvolo et al. |
| 2004/0122696 A1 | 6/2004 | Beringer |
| 2004/0122697 A1 | 6/2004 | Becerra et al. |
| 2004/0122766 A1 | 6/2004 | Brooks et al. |
| 2004/0128150 A1 | 7/2004 | Lundegren |
| 2004/0128156 A1 | 7/2004 | Beringer et al. |
| 2004/0128215 A1 | 7/2004 | Florance et al. |
| 2004/0133440 A1 | 7/2004 | Carolan et al. |
| 2004/0133509 A1 | 7/2004 | McCoy et al. |
| 2004/0133513 A1 | 7/2004 | McCoy et al. |
| 2004/0133514 A1* | 7/2004 | Zielke ................... G06Q 20/10 705/40 |
| 2004/0133515 A1 | 7/2004 | McCoy et al. |
| 2004/0138992 A1 | 7/2004 | DeFrancesco et al. |
| 2004/0138994 A1 | 7/2004 | DeFrancesco et al. |
| 2004/0138997 A1 | 7/2004 | DeFrancesco et al. |
| 2004/0139005 A1 | 7/2004 | Ganesan |
| 2004/0141005 A1 | 7/2004 | Banatwala et al. |
| 2004/0143546 A1 | 7/2004 | Wood et al. |
| 2004/0143547 A1 | 7/2004 | Mersky |
| 2004/0143596 A1 | 7/2004 | Sirkin |
| 2004/0158723 A1 | 8/2004 | Root |
| 2004/0159700 A1 | 8/2004 | Khan et al. |
| 2004/0167793 A1 | 8/2004 | Masuoka et al. |
| 2004/0167823 A1 | 8/2004 | Neely et al. |
| 2004/0177035 A1 | 9/2004 | Silva |
| 2004/0186807 A1* | 9/2004 | Nathans et al. ................. 705/38 |
| 2004/0190694 A1 | 9/2004 | Schelberg, Jr. et al. |
| 2004/0193538 A1 | 9/2004 | Raines |
| 2004/0193891 A1 | 9/2004 | Ollila |
| 2004/0199789 A1 | 10/2004 | Shaw et al. |
| 2004/0210661 A1 | 10/2004 | Thompson |
| 2004/0215673 A1 | 10/2004 | Furukawa et al. |
| 2004/0220865 A1 | 11/2004 | Lozowski et al. |
| 2004/0220918 A1 | 11/2004 | Scriffignano et al. |
| 2004/0225545 A1 | 11/2004 | Turner et al. |
| 2004/0225609 A1* | 11/2004 | Greene ................... G06Q 20/10 705/40 |
| 2004/0225643 A1 | 11/2004 | Alpha et al. |
| 2004/0230524 A1 | 11/2004 | Meiners |
| 2004/0230527 A1 | 11/2004 | Hansen et al. |
| 2004/0236678 A1 | 11/2004 | Johns et al. |
| 2004/0236688 A1 | 11/2004 | Bozeman |
| 2004/0243508 A1 | 12/2004 | Samson et al. |
| 2004/0243588 A1 | 12/2004 | Tanner et al. |
| 2004/0249811 A1 | 12/2004 | Shostack |
| 2004/0250107 A1 | 12/2004 | Guo |
| 2004/0253988 A1 | 12/2004 | Goldman |
| 2004/0254935 A1 | 12/2004 | Chagoly et al. |
| 2004/0255127 A1 | 12/2004 | Arnouse |
| 2004/0267646 A1 | 12/2004 | Chandhok et al. |
| 2004/0267714 A1 | 12/2004 | Frid et al. |
| 2005/0010474 A1 | 1/2005 | Desai et al. |
| 2005/0010513 A1 | 1/2005 | Duckworth et al. |
| 2005/0010523 A1 | 1/2005 | Myklebust et al. |
| 2005/0015273 A1 | 1/2005 | Iyer |
| 2005/0015338 A1 | 1/2005 | Lee |
| 2005/0021353 A1 | 1/2005 | Aviles et al. |
| 2005/0021476 A1 | 1/2005 | Candella et al. |
| 2005/0021551 A1 | 1/2005 | Silva et al. |
| 2005/0027632 A1 | 2/2005 | Zeitoun et al. |
| 2005/0027666 A1 | 2/2005 | Beck |
| 2005/0027983 A1 | 2/2005 | Klawon |
| 2005/0033651 A1 | 2/2005 | Kogan et al. |
| 2005/0033690 A1 | 2/2005 | Antognini et al. |
| 2005/0042983 A1 | 2/2005 | Borgward |
| 2005/0050027 A1 | 3/2005 | Yeh et al. |
| 2005/0055231 A1 | 3/2005 | Lee |
| 2005/0055296 A1 | 3/2005 | Hattersley et al. |
| 2005/0058262 A1 | 3/2005 | Timmins et al. |
| 2005/0060332 A1 | 3/2005 | Bernstein et al. |
| 2005/0065893 A1 | 3/2005 | Josephson |
| 2005/0071328 A1 | 3/2005 | Lawrence |
| 2005/0080723 A1 | 4/2005 | Burchetta et al. |
| 2005/0080796 A1 | 4/2005 | Midgley |
| 2005/0085931 A1 | 4/2005 | Willeby |
| 2005/0086126 A1 | 4/2005 | Patterson |
| 2005/0086261 A1 | 4/2005 | Mammone |
| 2005/0091159 A1 | 4/2005 | Ichikawa et al. |
| 2005/0091164 A1 | 4/2005 | Varble |
| 2005/0097017 A1 | 5/2005 | Hanratty |
| 2005/0097039 A1 | 5/2005 | Kulcsar et al. |
| 2005/0097320 A1 | 5/2005 | Golan et al. |
| 2005/0102180 A1 | 5/2005 | Gailey et al. |
| 2005/0105719 A1 | 5/2005 | Huda |
| 2005/0108396 A1 | 5/2005 | Bittner |
| 2005/0108631 A1 | 5/2005 | Amorin et al. |
| 2005/0114335 A1 | 5/2005 | Wesinger, Jr. et al. |
| 2005/0114344 A1 | 5/2005 | Wesinger, Jr. et al. |
| 2005/0114345 A1 | 5/2005 | Wesinger, Jr. et al. |
| 2005/0125291 A1 | 6/2005 | Demkiw Grayson et al. |
| 2005/0125347 A1 | 6/2005 | Akialis et al. |
| 2005/0125397 A1 | 6/2005 | Gross et al. |
| 2005/0125686 A1 | 6/2005 | Brandt |
| 2005/0137899 A1 | 6/2005 | Davies et al. |
| 2005/0137948 A1 | 6/2005 | Kissner et al. |
| 2005/0137978 A1 | 6/2005 | Ganesan et al. |
| 2005/0144143 A1 | 6/2005 | Freiberg |
| 2005/0149354 A1 | 7/2005 | Cyr et al. |
| 2005/0149355 A1 | 7/2005 | Cyr et al. |
| 2005/0149356 A1 | 7/2005 | Cyr et al. |
| 2005/0149378 A1 | 7/2005 | Cyr et al. |
| 2005/0149379 A1 | 7/2005 | Cyr et al. |
| 2005/0154664 A1 | 7/2005 | Guy et al. |
| 2005/0154665 A1 | 7/2005 | Kerr |
| 2005/0154769 A1 | 7/2005 | Eckart et al. |
| 2005/0160051 A1 | 7/2005 | Johnson |
| 2005/0160280 A1 | 7/2005 | Caslin et al. |
| 2005/0165638 A1 | 7/2005 | Piller |
| 2005/0165681 A1 | 7/2005 | Heinemann et al. |
| 2005/0171850 A1 | 8/2005 | Yueh |
| 2005/0171884 A1 | 8/2005 | Arnott |
| 2005/0171900 A1 | 8/2005 | Onneken |
| 2005/0177480 A1 | 8/2005 | Huang |
| 2005/0177518 A1 | 8/2005 | Brown |
| 2005/0192839 A1 | 9/2005 | St. Jacques et al. |
| 2005/0203768 A1 | 9/2005 | Florance |
| 2005/0208461 A1 | 9/2005 | Krebs et al. |
| 2005/0216434 A1 | 9/2005 | Haveliwala et al. |
| 2005/0216524 A1 | 9/2005 | Gomes et al. |
| 2005/0216955 A1 | 9/2005 | Wilkins et al. |
| 2005/0226224 A1 | 10/2005 | Lee et al. |
| 2005/0240526 A1 | 10/2005 | Hill |
| 2005/0240578 A1 | 10/2005 | Biederman et al. |
| 2005/0251474 A1 | 11/2005 | Shinn et al. |
| 2005/0267840 A1 | 12/2005 | Holm-Blagg et al. |
| 2005/0273431 A1 | 12/2005 | Abel et al. |
| 2005/0278250 A1 | 12/2005 | Zair |

(56) References Cited

U.S. PATENT DOCUMENTS

| | | |
|---|---|---|
| 2005/0283414 A1 | 12/2005 | Fernandes et al. |
| 2005/0283415 A1 | 12/2005 | Studnitzer et al. |
| 2005/0288998 A1 | 12/2005 | Verma et al. |
| 2006/0004623 A1 | 1/2006 | Jasti |
| 2006/0004626 A1 | 1/2006 | Holmen et al. |
| 2006/0004654 A1* | 1/2006 | Kornegay ............ G06Q 20/10 705/39 |
| 2006/0010391 A1 | 1/2006 | Uemura et al. |
| 2006/0031158 A1 | 2/2006 | Orman |
| 2006/0031177 A1 | 2/2006 | Rule |
| 2006/0032909 A1 | 2/2006 | Seegar |
| 2006/0036543 A1 | 2/2006 | Blagg et al. |
| 2006/0036748 A1 | 2/2006 | Nusbaum et al. |
| 2006/0041464 A1 | 2/2006 | Powers et al. |
| 2006/0041670 A1 | 2/2006 | Musseleck et al. |
| 2006/0044599 A1 | 3/2006 | Lipowitz et al. |
| 2006/0047605 A1 | 3/2006 | Ahmad |
| 2006/0059083 A1 | 3/2006 | Friesen et al. |
| 2006/0059110 A1 | 3/2006 | Madhok et al. |
| 2006/0059362 A1 | 3/2006 | Paden et al. |
| 2006/0064377 A1 | 3/2006 | Ganesan et al. |
| 2006/0074986 A1 | 4/2006 | Mallalieu et al. |
| 2006/0074991 A1 | 4/2006 | Lussier et al. |
| 2006/0079211 A1 | 4/2006 | Degraeve |
| 2006/0080230 A1 | 4/2006 | Freiberg |
| 2006/0080251 A1 | 4/2006 | Fried et al. |
| 2006/0080263 A1 | 4/2006 | Willis et al. |
| 2006/0085334 A1 | 4/2006 | Murphy |
| 2006/0085337 A1 | 4/2006 | Conforti et al. |
| 2006/0085361 A1 | 4/2006 | Hoerle et al. |
| 2006/0095289 A1 | 5/2006 | Bunning |
| 2006/0101508 A1 | 5/2006 | Taylor |
| 2006/0106670 A1 | 5/2006 | Cai et al. |
| 2006/0106685 A1 | 5/2006 | Cheng et al. |
| 2006/0121880 A1 | 6/2006 | Cowsar et al. |
| 2006/0122932 A1 | 6/2006 | Birtwell et al. |
| 2006/0129419 A1 | 6/2006 | Flaxer et al. |
| 2006/0129472 A1 | 6/2006 | Harrington |
| 2006/0129481 A1 | 6/2006 | Bhatt et al. |
| 2006/0129533 A1 | 6/2006 | Purvis |
| 2006/0131390 A1 | 6/2006 | Kim |
| 2006/0136180 A1 | 6/2006 | Hansen et al. |
| 2006/0136524 A1 | 6/2006 | Wohlers et al. |
| 2006/0136595 A1 | 6/2006 | Satyavolu |
| 2006/0155780 A1 | 7/2006 | Sakairi et al. |
| 2006/0161435 A1 | 7/2006 | Atef et al. |
| 2006/0161554 A1 | 7/2006 | Lucovslw et al. |
| 2006/0169766 A1 | 8/2006 | Hoch |
| 2006/0173775 A1 | 8/2006 | Cullen, III et al. |
| 2006/0173776 A1 | 8/2006 | Shalley et al. |
| 2006/0173778 A1 | 8/2006 | Lipsky et al. |
| 2006/0173792 A1 | 8/2006 | Glass |
| 2006/0178971 A1 | 8/2006 | Owen et al. |
| 2006/0179050 A1 | 8/2006 | Giang et al. |
| 2006/0184585 A1 | 8/2006 | Grear et al. |
| 2006/0190334 A1 | 8/2006 | Smith |
| 2006/0190394 A1 | 8/2006 | Fraser et al. |
| 2006/0195351 A1 | 8/2006 | Bayburtian |
| 2006/0195395 A1 | 8/2006 | Ganesan et al. |
| 2006/0195396 A1 | 8/2006 | Ganesan et al. |
| 2006/0195397 A1 | 8/2006 | Ganesan et al. |
| 2006/0195398 A1 | 8/2006 | Dheer et al. |
| 2006/0200583 A1 | 9/2006 | Le Lann et al. |
| 2006/0202012 A1 | 9/2006 | Grano et al. |
| 2006/0206425 A1 | 9/2006 | Sharma |
| 2006/0212407 A1 | 9/2006 | Lyon |
| 2006/0212486 A1 | 9/2006 | Kennis et al. |
| 2006/0218407 A1 | 9/2006 | Toms |
| 2006/0223043 A1 | 10/2006 | Dancy-Edwards et al. |
| 2006/0224469 A1 | 10/2006 | Kunz et al. |
| 2006/0224498 A1 | 10/2006 | Chin |
| 2006/0229943 A1 | 10/2006 | Mathias et al. |
| 2006/0229961 A1 | 10/2006 | Lyftogt et al. |
| 2006/0235775 A1 | 10/2006 | Pollin |
| 2006/0235935 A1 | 10/2006 | Ng |
| 2006/0239512 A1 | 10/2006 | Petrillo |
| 2006/0253358 A1 | 11/2006 | Delgrosso et al. |
| 2006/0259427 A1 | 11/2006 | Randell et al. |
| 2006/0262929 A1 | 11/2006 | Vatanen et al. |
| 2006/0271456 A1 | 11/2006 | Romain et al. |
| 2006/0271457 A1 | 11/2006 | Romain et al. |
| 2006/0271633 A1 | 11/2006 | Adler |
| 2006/0277089 A1 | 12/2006 | Hubbard et al. |
| 2006/0277102 A1 | 12/2006 | Agliozzo |
| 2006/0282359 A1 | 12/2006 | Nobili et al. |
| 2006/0282373 A1 | 12/2006 | Stone |
| 2006/0282374 A1 | 12/2006 | Stone |
| 2006/0282429 A1 | 12/2006 | Hernandez-Sherrington et al. |
| 2006/0282819 A1 | 12/2006 | Graham et al. |
| 2006/0282886 A1 | 12/2006 | Gaug |
| 2006/0287764 A1 | 12/2006 | Kraft |
| 2006/0287765 A1 | 12/2006 | Kraft |
| 2006/0287766 A1 | 12/2006 | Kraft |
| 2006/0287767 A1 | 12/2006 | Kraft |
| 2006/0288090 A1 | 12/2006 | Kraft |
| 2006/0293987 A1 | 12/2006 | Shapiro |
| 2006/0294199 A1 | 12/2006 | Bertholf |
| 2007/0005508 A1 | 1/2007 | Chiang |
| 2007/0005984 A1 | 1/2007 | Florencio et al. |
| 2007/0011093 A1 | 1/2007 | Tree |
| 2007/0016500 A1 | 1/2007 | Chatterji et al. |
| 2007/0022141 A1 | 1/2007 | Singleton et al. |
| 2007/0027816 A1 | 2/2007 | Writer |
| 2007/0032240 A1 | 2/2007 | Finnegan et al. |
| 2007/0038563 A1 | 2/2007 | Ryzerski |
| 2007/0038568 A1 | 2/2007 | Greene et al. |
| 2007/0039049 A1 | 2/2007 | Kupferman et al. |
| 2007/0040015 A1 | 2/2007 | Carlson et al. |
| 2007/0043577 A1 | 2/2007 | Kasower |
| 2007/0047714 A1 | 3/2007 | Baniak et al. |
| 2007/0050777 A1 | 3/2007 | Hutchinson et al. |
| 2007/0055621 A1 | 3/2007 | Tischler et al. |
| 2007/0057947 A1 | 3/2007 | Yokoyama |
| 2007/0067239 A1 | 3/2007 | Dheer et al. |
| 2007/0067297 A1 | 3/2007 | Kublickis |
| 2007/0072190 A1 | 3/2007 | Aggarwal |
| 2007/0073577 A1 | 3/2007 | Krause |
| 2007/0073889 A1 | 3/2007 | Morris |
| 2007/0078908 A1 | 4/2007 | Rohatgi et al. |
| 2007/0078985 A1 | 4/2007 | Shao et al. |
| 2007/0083460 A1 | 4/2007 | Bachenheimer |
| 2007/0083463 A1 | 4/2007 | Kraft |
| 2007/0083465 A1 | 4/2007 | Ciurea et al. |
| 2007/0093234 A1 | 4/2007 | Willis et al. |
| 2007/0094230 A1 | 4/2007 | Subramaniam et al. |
| 2007/0094241 A1 | 4/2007 | Blackwell et al. |
| 2007/0100748 A1 | 5/2007 | Dheer et al. |
| 2007/0100749 A1 | 5/2007 | Bachu et al. |
| 2007/0100770 A1 | 5/2007 | Grinberg et al. |
| 2007/0112667 A1 | 5/2007 | Rucker |
| 2007/0112668 A1 | 5/2007 | Celano et al. |
| 2007/0112670 A1 | 5/2007 | DeFrancesco et al. |
| 2007/0121843 A1 | 5/2007 | Atazky et al. |
| 2007/0124235 A1 | 5/2007 | Chakraborty et al. |
| 2007/0124256 A1 | 5/2007 | Crooks et al. |
| 2007/0136109 A1 | 6/2007 | Yager et al. |
| 2007/0143123 A1 | 6/2007 | Goldberg et al. |
| 2007/0149184 A1 | 6/2007 | Viegers et al. |
| 2007/0150321 A1 | 6/2007 | Zhao et al. |
| 2007/0156554 A1 | 7/2007 | Nikoley et al. |
| 2007/0156576 A1 | 7/2007 | Imrey et al. |
| 2007/0156581 A1 | 7/2007 | Imrey et al. |
| 2007/0156692 A1 | 7/2007 | Rosewarne |
| 2007/0157107 A1 | 7/2007 | Bishop |
| 2007/0160458 A1 | 7/2007 | Yen |
| 2007/0162458 A1 | 7/2007 | Fasciano |
| 2007/0168279 A1 | 7/2007 | D'Angelo |
| 2007/0174186 A1 | 7/2007 | Hokland |
| 2007/0174448 A1 | 7/2007 | Ahuja et al. |
| 2007/0174903 A1 | 7/2007 | Greff |
| 2007/0192167 A1 | 8/2007 | Lei et al. |
| 2007/0198336 A1 | 8/2007 | Thompson |
| 2007/0198432 A1 | 8/2007 | Pitroda et al. |
| 2007/0204033 A1 | 8/2007 | Bookbinder et al. |

(56) References Cited

U.S. PATENT DOCUMENTS

| | | |
|---|---|---|
| 2007/0204212 A1 | 8/2007 | Chamberlain et al. |
| 2007/0204338 A1 | 8/2007 | Aiello et al. |
| 2007/0205266 A1 | 9/2007 | Carr et al. |
| 2007/0208640 A1 | 9/2007 | Banasiak et al. |
| 2007/0214078 A1 | 9/2007 | Coppinger |
| 2007/0219881 A1 | 9/2007 | Peterson et al. |
| 2007/0220003 A1 | 9/2007 | Chern et al. |
| 2007/0226047 A1 | 9/2007 | Ward |
| 2007/0226122 A1 | 9/2007 | Burrell et al. |
| 2007/0228148 A1 | 10/2007 | Rable |
| 2007/0233591 A1 | 10/2007 | Newton |
| 2007/0239493 A1 | 10/2007 | Sweetland et al. |
| 2007/0240206 A1 | 10/2007 | Wu et al. |
| 2007/0244807 A1 | 10/2007 | Andringa et al. |
| 2007/0245245 A1 | 10/2007 | Blue et al. |
| 2007/0250441 A1 | 10/2007 | Paulsen et al. |
| 2007/0262140 A1 | 11/2007 | Long, Sr. |
| 2007/0266439 A1 | 11/2007 | Kraft |
| 2007/0273558 A1 | 11/2007 | Smith |
| 2007/0276750 A1 | 11/2007 | Stuart |
| 2007/0282743 A1 | 12/2007 | Lovelett |
| 2007/0287415 A1 | 12/2007 | Yamada |
| 2007/0288355 A1 | 12/2007 | Roland et al. |
| 2007/0288360 A1 | 12/2007 | Seeklus |
| 2007/0294195 A1 | 12/2007 | Curry et al. |
| 2007/0295804 A1 | 12/2007 | Garvey et al. |
| 2007/0299770 A1 | 12/2007 | Delinsky |
| 2008/0004957 A1 | 1/2008 | Hildreth et al. |
| 2008/0005760 A1 | 1/2008 | Kay et al. |
| 2008/0010191 A1 | 1/2008 | Rackley, III et al. |
| 2008/0010203 A1 | 1/2008 | Grant |
| 2008/0010204 A1 | 1/2008 | Rackley, III et al. |
| 2008/0010206 A1 | 1/2008 | Coleman |
| 2008/0010687 A1 | 1/2008 | Gonen et al. |
| 2008/0015982 A1 | 1/2008 | Sokolic et al. |
| 2008/0015985 A1 | 1/2008 | Abhari et al. |
| 2008/0021761 A1 | 1/2008 | Rable |
| 2008/0021802 A1 | 1/2008 | Pendleton |
| 2008/0027859 A1 | 1/2008 | Nathans et al. |
| 2008/0028435 A1 | 1/2008 | Strickland et al. |
| 2008/0028446 A1 | 1/2008 | Burgoyne |
| 2008/0033956 A1 | 2/2008 | Saha et al. |
| 2008/0040176 A1 | 2/2008 | Ehling |
| 2008/0040475 A1 | 2/2008 | Bosworth et al. |
| 2008/0040610 A1 | 2/2008 | Fergusson |
| 2008/0046363 A1 | 2/2008 | Ali et al. |
| 2008/0047017 A1 | 2/2008 | Renaud |
| 2008/0052182 A1 | 2/2008 | Marshall |
| 2008/0052208 A1 | 2/2008 | Neece et al. |
| 2008/0052244 A1 | 2/2008 | Tsuei et al. |
| 2008/0059352 A1 | 3/2008 | Chandran |
| 2008/0059364 A1 | 3/2008 | Tidwell et al. |
| 2008/0065774 A1 | 3/2008 | Keeler |
| 2008/0066188 A1 | 3/2008 | Kwak |
| 2008/0072316 A1 | 3/2008 | Chang et al. |
| 2008/0077526 A1 | 3/2008 | Arumugam |
| 2008/0082536 A1 | 4/2008 | Schwabe et al. |
| 2008/0083021 A1 | 4/2008 | Doane et al. |
| 2008/0086400 A1 | 4/2008 | Ardelean et al. |
| 2008/0086431 A1 | 4/2008 | Robinson et al. |
| 2008/0091519 A1 | 4/2008 | Foss |
| 2008/0091530 A1 | 4/2008 | Egnatios et al. |
| 2008/0091818 A1 | 4/2008 | Bailey et al. |
| 2008/0097822 A1 | 4/2008 | Schigel et al. |
| 2008/0103800 A1 | 5/2008 | Domenikos et al. |
| 2008/0103836 A1 | 5/2008 | Park et al. |
| 2008/0103972 A1 | 5/2008 | Lanc |
| 2008/0109355 A1 | 5/2008 | Dutta et al. |
| 2008/0109422 A1 | 5/2008 | Dedhia |
| 2008/0109740 A1 | 5/2008 | Prinsen et al. |
| 2008/0110973 A1* | 5/2008 | Nathans et al. ............... 235/379 |
| 2008/0114657 A1 | 5/2008 | Forzley |
| 2008/0114670 A1 | 5/2008 | Friesen |
| 2008/0114855 A1 | 5/2008 | Welingkar et al. |
| 2008/0115226 A1 | 5/2008 | Welingkar et al. |
| 2008/0120155 A1 | 5/2008 | Pliha |
| 2008/0120204 A1 | 5/2008 | Conner et al. |
| 2008/0120569 A1 | 5/2008 | Mann et al. |
| 2008/0120716 A1 | 5/2008 | Hall et al. |
| 2008/0126136 A1 | 5/2008 | Nighan |
| 2008/0126233 A1 | 5/2008 | Hogan |
| 2008/0133273 A1 | 6/2008 | Marshall |
| 2008/0133278 A1 | 6/2008 | Stanfield |
| 2008/0133657 A1 | 6/2008 | Pennington |
| 2008/0140476 A1 | 6/2008 | Anand et al. |
| 2008/0140734 A1 | 6/2008 | Wagner |
| 2008/0141346 A1 | 6/2008 | Kay et al. |
| 2008/0147523 A1 | 6/2008 | Mulry et al. |
| 2008/0148368 A1 | 6/2008 | Zurko et al. |
| 2008/0148392 A1 | 6/2008 | Akens |
| 2008/0154758 A1 | 6/2008 | Schattmaier et al. |
| 2008/0162317 A1 | 7/2008 | Banaugh et al. |
| 2008/0162350 A1 | 7/2008 | Allen-Rouman et al. |
| 2008/0162383 A1 | 7/2008 | Kraft |
| 2008/0175360 A1 | 7/2008 | Schwarz et al. |
| 2008/0177630 A1 | 7/2008 | Maghfourian et al. |
| 2008/0177655 A1 | 7/2008 | Zalik |
| 2008/0183480 A1 | 7/2008 | Carlson et al. |
| 2008/0183504 A1 | 7/2008 | Highley |
| 2008/0183585 A1 | 7/2008 | Vianello |
| 2008/0184351 A1 | 7/2008 | Gephart |
| 2008/0195548 A1 | 8/2008 | Chu et al. |
| 2008/0201257 A1 | 8/2008 | Lewis et al. |
| 2008/0201401 A1 | 8/2008 | Pugh et al. |
| 2008/0208548 A1 | 8/2008 | Metzger et al. |
| 2008/0208735 A1 | 8/2008 | Balet et al. |
| 2008/0210752 A1 | 9/2008 | March |
| 2008/0212845 A1 | 9/2008 | Lund |
| 2008/0216156 A1 | 9/2008 | Kosaka |
| 2008/0221972 A1 | 9/2008 | Megdal et al. |
| 2008/0222027 A1 | 9/2008 | Megdal et al. |
| 2008/0222706 A1 | 9/2008 | Renaud et al. |
| 2008/0228556 A1 | 9/2008 | Megdal et al. |
| 2008/0228775 A1 | 9/2008 | Abhyanker et al. |
| 2008/0229415 A1 | 9/2008 | Kapoor et al. |
| 2008/0235091 A1 | 9/2008 | Holliday |
| 2008/0243650 A1 | 10/2008 | Yoon |
| 2008/0249869 A1 | 10/2008 | Angell et al. |
| 2008/0249936 A1 | 10/2008 | Miller et al. |
| 2008/0255992 A1 | 10/2008 | Lin |
| 2008/0263638 A1 | 10/2008 | McMurtry et al. |
| 2008/0270038 A1 | 10/2008 | Partovi et al. |
| 2008/0270209 A1 | 10/2008 | Mauseth et al. |
| 2008/0270294 A1 | 10/2008 | Lent et al. |
| 2008/0270295 A1 | 10/2008 | Lent et al. |
| 2008/0270304 A1 | 10/2008 | Brown |
| 2008/0277465 A1 | 11/2008 | Pletz et al. |
| 2008/0281737 A1 | 11/2008 | Fajardo |
| 2008/0282324 A1 | 11/2008 | Hoal |
| 2008/0288283 A1 | 11/2008 | Baldwin, Jr. et al. |
| 2008/0288299 A1 | 11/2008 | Schultz |
| 2008/0288400 A1 | 11/2008 | Panthaki et al. |
| 2008/0291932 A1 | 11/2008 | Mukherjee |
| 2008/0294501 A1 | 11/2008 | Rennich et al. |
| 2008/0301016 A1 | 12/2008 | Durvasula et al. |
| 2008/0319889 A1 | 12/2008 | Hammad |
| 2008/0319896 A1 | 12/2008 | Carlson et al. |
| 2009/0006230 A1 | 1/2009 | Lyda et al. |
| 2009/0018986 A1 | 1/2009 | Alcorn et al. |
| 2009/0024484 A1 | 1/2009 | Walker et al. |
| 2009/0030776 A1 | 1/2009 | Walker et al. |
| 2009/0037279 A1 | 2/2009 | Chockalingam et al. |
| 2009/0037332 A1 | 2/2009 | Cheung et al. |
| 2009/0043691 A1 | 2/2009 | Kasower |
| 2009/0043696 A1 | 2/2009 | Ornce et al. |
| 2009/0047992 A1 | 2/2009 | Ortiz et al. |
| 2009/0048957 A1 | 2/2009 | Celano |
| 2009/0048999 A1 | 2/2009 | Gupta et al. |
| 2009/0055287 A1 | 2/2009 | Chin |
| 2009/0055312 A1 | 2/2009 | Chin |
| 2009/0055322 A1 | 2/2009 | Bykov et al. |
| 2009/0055404 A1 | 2/2009 | Heiden et al. |
| 2009/0058676 A1 | 3/2009 | Orlosky |
| 2009/0063330 A1 | 3/2009 | Cerise et al. |

(56) References Cited

U.S. PATENT DOCUMENTS

| | | |
|---|---|---|
| 2009/0064297 A1 | 3/2009 | Selgas et al. |
| 2009/0089190 A1 | 4/2009 | Girulat |
| 2009/0089193 A1* | 4/2009 | Paintin .................. G06Q 20/02 705/34 |
| 2009/0089205 A1 | 4/2009 | Bayne |
| 2009/0089869 A1 | 4/2009 | Varghese |
| 2009/0094156 A1 | 4/2009 | Wright et al. |
| 2009/0094237 A1 | 4/2009 | Churi et al. |
| 2009/0094675 A1 | 4/2009 | Powers |
| 2009/0098854 A1 | 4/2009 | Park et al. |
| 2009/0100047 A1 | 4/2009 | Jones et al. |
| 2009/0106141 A1 | 4/2009 | Becker |
| 2009/0106150 A1 | 4/2009 | Pelegero et al. |
| 2009/0106846 A1 | 4/2009 | Dupray et al. |
| 2009/0112746 A1 | 4/2009 | Fong |
| 2009/0119116 A1 | 5/2009 | Steen |
| 2009/0119299 A1 | 5/2009 | Rhodes |
| 2009/0125369 A1 | 5/2009 | Kloostra et al. |
| 2009/0125972 A1 | 5/2009 | Hinton et al. |
| 2009/0132312 A1 | 5/2009 | Reinheimer et al. |
| 2009/0132347 A1 | 5/2009 | Anderson et al. |
| 2009/0157517 A1 | 6/2009 | Davis |
| 2009/0157564 A1 | 6/2009 | Cross |
| 2009/0157693 A1 | 6/2009 | Palahnuk |
| 2009/0158030 A1 | 6/2009 | Rasti |
| 2009/0164380 A1 | 6/2009 | Brown |
| 2009/0164582 A1 | 6/2009 | Dasgupta et al. |
| 2009/0164929 A1 | 6/2009 | Chen et al. |
| 2009/0171723 A1 | 7/2009 | Jenkins |
| 2009/0171817 A1 | 7/2009 | Cassis |
| 2009/0171838 A1 | 7/2009 | Liu et al. |
| 2009/0172788 A1 | 7/2009 | Veldula et al. |
| 2009/0172795 A1 | 7/2009 | Ritari et al. |
| 2009/0177529 A1 | 7/2009 | Hadi |
| 2009/0177562 A1 | 7/2009 | Peace et al. |
| 2009/0177670 A1 | 7/2009 | Grenier et al. |
| 2009/0183259 A1 | 7/2009 | Rinek et al. |
| 2009/0187607 A1 | 7/2009 | Yoo et al. |
| 2009/0198557 A1 | 8/2009 | Wang et al. |
| 2009/0198572 A1 | 8/2009 | Jurgens |
| 2009/0198602 A1 | 8/2009 | Wang et al. |
| 2009/0199094 A1 | 8/2009 | Jurgens et al. |
| 2009/0199294 A1 | 8/2009 | Schneider |
| 2009/0204435 A1 | 8/2009 | Gale |
| 2009/0204514 A1 | 8/2009 | Bhogal et al. |
| 2009/0204519 A1 | 8/2009 | Randell et al. |
| 2009/0204522 A1 | 8/2009 | Meyer et al. |
| 2009/0204599 A1 | 8/2009 | Morris et al. |
| 2009/0210241 A1 | 8/2009 | Calloway |
| 2009/0210807 A1 | 8/2009 | Xiao et al. |
| 2009/0216640 A1 | 8/2009 | Masi |
| 2009/0217342 A1 | 8/2009 | Nadler |
| 2009/0222449 A1 | 9/2009 | Horn et al. |
| 2009/0222527 A1 | 9/2009 | Arconati et al. |
| 2009/0228295 A1 | 9/2009 | Lowy |
| 2009/0228392 A1 | 9/2009 | Pinson, III |
| 2009/0228918 A1 | 9/2009 | Rolff et al. |
| 2009/0228966 A1 | 9/2009 | Parfene et al. |
| 2009/0228990 A1 | 9/2009 | Chen et al. |
| 2009/0234665 A1 | 9/2009 | Conkel |
| 2009/0234775 A1 | 9/2009 | Whitney et al. |
| 2009/0234814 A1 | 9/2009 | Boerries et al. |
| 2009/0234876 A1 | 9/2009 | Schigel et al. |
| 2009/0240567 A1 | 9/2009 | Kinkead et al. |
| 2009/0240610 A1 | 9/2009 | Barsade |
| 2009/0240624 A1 | 9/2009 | James et al. |
| 2009/0244600 A1 | 10/2009 | Haycock et al. |
| 2009/0247122 A1 | 10/2009 | Fitzgerald et al. |
| 2009/0248573 A1 | 10/2009 | Haggerty et al. |
| 2009/0249451 A1 | 10/2009 | Su et al. |
| 2009/0254375 A1 | 10/2009 | Martinez et al. |
| 2009/0254476 A1 | 10/2009 | Sharma et al. |
| 2009/0254656 A1 | 10/2009 | Vignisson et al. |
| 2009/0254971 A1 | 10/2009 | Herz et al. |
| 2009/0258334 A1 | 10/2009 | Pyne |
| 2009/0260064 A1 | 10/2009 | Mcdowell et al. |
| 2009/0271265 A1 | 10/2009 | Lay et al. |
| 2009/0276368 A1 | 11/2009 | Martin et al. |
| 2009/0280467 A1 | 11/2009 | Ahart |
| 2009/0281816 A1 | 11/2009 | Houga et al. |
| 2009/0288012 A1 | 11/2009 | Hertel et al. |
| 2009/0289110 A1 | 11/2009 | Regen et al. |
| 2009/0292603 A1 | 11/2009 | Wallach |
| 2009/0292642 A1 | 11/2009 | Han |
| 2009/0300066 A1 | 12/2009 | Guo et al. |
| 2009/0300604 A1 | 12/2009 | Barringer |
| 2009/0300641 A1 | 12/2009 | Friedman et al. |
| 2009/0300668 A1 | 12/2009 | Campagna et al. |
| 2009/0307778 A1 | 12/2009 | Mardikar |
| 2009/0313562 A1 | 12/2009 | Appleyard et al. |
| 2009/0319294 A1 | 12/2009 | Phillips et al. |
| 2009/0319648 A1 | 12/2009 | Dutta et al. |
| 2009/0327054 A1 | 12/2009 | Yao et al. |
| 2009/0327108 A1 | 12/2009 | Swierz, III et al. |
| 2009/0327120 A1 | 12/2009 | Eze et al. |
| 2009/0327270 A1 | 12/2009 | Teevan et al. |
| 2010/0005024 A1 | 1/2010 | Schmitz et al. |
| 2010/0009320 A1 | 1/2010 | Wilkelis |
| 2010/0009332 A1 | 1/2010 | Yaskin et al. |
| 2010/0010935 A1 | 1/2010 | Shelton |
| 2010/0011428 A1 | 1/2010 | Atwood et al. |
| 2010/0023434 A1 | 1/2010 | Bond |
| 2010/0023440 A1 | 1/2010 | Fraser et al. |
| 2010/0023448 A1 | 1/2010 | Eze |
| 2010/0023506 A1 | 1/2010 | Sahni et al. |
| 2010/0025820 A1 | 2/2010 | Suekawa |
| 2010/0030578 A1 | 2/2010 | Siddique et al. |
| 2010/0030649 A1 | 2/2010 | Ubelhor |
| 2010/0030675 A1 | 2/2010 | Hanan et al. |
| 2010/0030677 A1 | 2/2010 | Melik-Aslanian et al. |
| 2010/0036697 A1 | 2/2010 | Kelnar |
| 2010/0036769 A1 | 2/2010 | Winters et al. |
| 2010/0042537 A1 | 2/2010 | Smith et al. |
| 2010/0042539 A1 | 2/2010 | Dheer et al. |
| 2010/0042542 A1 | 2/2010 | Rose et al. |
| 2010/0043055 A1 | 2/2010 | Baumgart |
| 2010/0049642 A1 | 2/2010 | Agisim et al. |
| 2010/0049643 A1 | 2/2010 | Mitchell et al. |
| 2010/0049803 A1 | 2/2010 | Ogilvie et al. |
| 2010/0063942 A1 | 3/2010 | Arnott et al. |
| 2010/0063993 A1 | 3/2010 | Higgins et al. |
| 2010/0076880 A1 | 3/2010 | Williams et al. |
| 2010/0077483 A1 | 3/2010 | Stolfo et al. |
| 2010/0082445 A1 | 4/2010 | Hodge et al. |
| 2010/0082476 A1 | 4/2010 | Bowman |
| 2010/0083371 A1 | 4/2010 | Bennetts et al. |
| 2010/0094768 A1 | 4/2010 | Miltonberger |
| 2010/0094774 A1 | 4/2010 | Jackowitz et al. |
| 2010/0094910 A1 | 4/2010 | Bayliss |
| 2010/0100480 A1 | 4/2010 | Altman et al. |
| 2010/0100945 A1 | 4/2010 | Ozzie et al. |
| 2010/0114724 A1 | 5/2010 | Ghosh et al. |
| 2010/0114744 A1 | 5/2010 | Gonen |
| 2010/0114766 A1 | 5/2010 | Gustin et al. |
| 2010/0114768 A1 | 5/2010 | Duke et al. |
| 2010/0114776 A1 | 5/2010 | Weller et al. |
| 2010/0122324 A1 | 5/2010 | Welingkar et al. |
| 2010/0122333 A1 | 5/2010 | Noe et al. |
| 2010/0125521 A1 | 5/2010 | Hanan et al. |
| 2010/0130172 A1 | 5/2010 | Vendrow et al. |
| 2010/0131396 A1 | 5/2010 | Roach |
| 2010/0136956 A1 | 6/2010 | Drachev et al. |
| 2010/0138314 A1 | 6/2010 | Li et al. |
| 2010/0145836 A1 | 6/2010 | Baker et al. |
| 2010/0153227 A1 | 6/2010 | Medvinsky et al. |
| 2010/0153278 A1 | 6/2010 | Farsedakis |
| 2010/0153290 A1 | 6/2010 | Duggan |
| 2010/0161466 A1 | 6/2010 | Gilder |
| 2010/0161486 A1 | 6/2010 | Liu et al. |
| 2010/0161816 A1 | 6/2010 | Kraft et al. |
| 2010/0169159 A1 | 7/2010 | Rose et al. |
| 2010/0174638 A1 | 7/2010 | Debie et al. |
| 2010/0174813 A1 | 7/2010 | Hildreth et al. |
| 2010/0179906 A1 | 7/2010 | Hawkes |

(56) References Cited

U.S. PATENT DOCUMENTS

| | | |
|---|---|---|
| 2010/0185546 A1 | 7/2010 | Pollard |
| 2010/0188684 A1 | 7/2010 | Kumara |
| 2010/0205076 A1 | 8/2010 | Parson et al. |
| 2010/0205662 A1 | 8/2010 | Ibrahim et al. |
| 2010/0211445 A1 | 8/2010 | Bodington |
| 2010/0211636 A1 | 8/2010 | Starkenburg et al. |
| 2010/0214090 A1 | 8/2010 | Sartini et al. |
| 2010/0217706 A1 | 8/2010 | Griffin et al. |
| 2010/0217837 A1 | 8/2010 | Ansari et al. |
| 2010/0223160 A1 | 9/2010 | Brown |
| 2010/0223184 A1 | 9/2010 | Perlman |
| 2010/0223192 A1 | 9/2010 | Levine et al. |
| 2010/0228658 A1 | 9/2010 | Ketelsen et al. |
| 2010/0229245 A1 | 9/2010 | Singhal |
| 2010/0241535 A1 | 9/2010 | Nightengale et al. |
| 2010/0248681 A1 | 9/2010 | Phills |
| 2010/0250338 A1 | 9/2010 | Banerjee et al. |
| 2010/0250376 A1 | 9/2010 | Nandiraju |
| 2010/0250394 A1 | 9/2010 | Lin |
| 2010/0250410 A1 | 9/2010 | Song et al. |
| 2010/0250411 A1 | 9/2010 | Ogrodski |
| 2010/0250416 A1 | 9/2010 | Hazlehurst |
| 2010/0250509 A1 | 9/2010 | Andersen |
| 2010/0253686 A1 | 10/2010 | Alsbury et al. |
| 2010/0257102 A1 | 10/2010 | Perlman |
| 2010/0257577 A1 | 10/2010 | Grandison et al. |
| 2010/0258623 A1 | 10/2010 | Beemer et al. |
| 2010/0262606 A1 | 10/2010 | Bedolla et al. |
| 2010/0262932 A1 | 10/2010 | Pan |
| 2010/0268557 A1 | 10/2010 | Faith et al. |
| 2010/0274815 A1 | 10/2010 | Vanasco |
| 2010/0280914 A1 | 11/2010 | Carlson |
| 2010/0280944 A1 | 11/2010 | Low et al. |
| 2010/0281020 A1 | 11/2010 | Drubner |
| 2010/0293090 A1 | 11/2010 | Domenikos et al. |
| 2010/0299186 A1 | 11/2010 | Cameo et al. |
| 2010/0306103 A1 | 12/2010 | Hankins et al. |
| 2010/0306834 A1 | 12/2010 | Grandison et al. |
| 2010/0312691 A1 | 12/2010 | Johnson, Jr. |
| 2010/0318460 A1 | 12/2010 | Stewart et al. |
| 2010/0323446 A1 | 12/2010 | Barnett et al. |
| 2010/0325045 A1 | 12/2010 | Johnson |
| 2010/0325048 A1 | 12/2010 | Carlson et al. |
| 2010/0332393 A1 | 12/2010 | Weller et al. |
| 2011/0004498 A1 | 1/2011 | Readshaw |
| 2011/0010283 A1 | 1/2011 | Williams |
| 2011/0022515 A1 | 1/2011 | Tallitsch et al. |
| 2011/0022516 A1 | 1/2011 | Gao et al. |
| 2011/0023115 A1 | 1/2011 | Wright |
| 2011/0029388 A1 | 2/2011 | Kendall et al. |
| 2011/0029566 A1 | 2/2011 | Grandison et al. |
| 2011/0035305 A1 | 2/2011 | Imrey et al. |
| 2011/0035315 A1 | 2/2011 | Langley |
| 2011/0035452 A1 | 2/2011 | Gittleman |
| 2011/0040629 A1 | 2/2011 | Chiu et al. |
| 2011/0047606 A1 | 2/2011 | Blomquist |
| 2011/0066495 A1 | 3/2011 | Ayloo et al. |
| 2011/0066618 A1 | 3/2011 | Sigurbjornsson et al. |
| 2011/0071950 A1 | 3/2011 | Ivanovic |
| 2011/0078073 A1 | 3/2011 | Annappindi et al. |
| 2011/0082733 A1 | 4/2011 | Goldman et al. |
| 2011/0082736 A1 | 4/2011 | Goldman et al. |
| 2011/0082788 A1 | 4/2011 | Itwaru |
| 2011/0083181 A1 | 4/2011 | Nazarov |
| 2011/0093387 A1 | 4/2011 | Fuerstenberg et al. |
| 2011/0107400 A1 | 5/2011 | Shankaranarayanan et al. |
| 2011/0112851 A1 | 5/2011 | Poley |
| 2011/0112919 A1 | 5/2011 | Gray |
| 2011/0113084 A1 | 5/2011 | Ramnani |
| 2011/0113086 A1 | 5/2011 | Long et al. |
| 2011/0119169 A1 | 5/2011 | Passero et al. |
| 2011/0119182 A1 | 5/2011 | Smolkin |
| 2011/0125924 A1 | 5/2011 | McAleer |
| 2011/0126275 A1 | 5/2011 | Anderson et al. |
| 2011/0131123 A1 | 6/2011 | Griffin et al. |
| 2011/0136468 A1 | 6/2011 | McNamara et al. |
| 2011/0137760 A1 | 6/2011 | Rudie et al. |
| 2011/0137765 A1 | 6/2011 | Nonaka |
| 2011/0142213 A1 | 6/2011 | Baniak et al. |
| 2011/0143711 A1 | 6/2011 | Hirson et al. |
| 2011/0145049 A1 | 6/2011 | Hertel et al. |
| 2011/0145899 A1 | 6/2011 | Cao et al. |
| 2011/0148625 A1 | 6/2011 | Velusamy |
| 2011/0161218 A1 | 6/2011 | Swift |
| 2011/0166889 A1 | 7/2011 | Bain |
| 2011/0166988 A1 | 7/2011 | Coulter |
| 2011/0167011 A1 | 7/2011 | Paltenghe et al. |
| 2011/0178841 A1 | 7/2011 | Rane et al. |
| 2011/0178860 A1 | 7/2011 | Imrey et al. |
| 2011/0178899 A1 | 7/2011 | Huszar |
| 2011/0179139 A1 | 7/2011 | Starkenburg et al. |
| 2011/0184780 A1 | 7/2011 | Alderson et al. |
| 2011/0184863 A1 | 7/2011 | Coleman et al. |
| 2011/0191196 A1 | 8/2011 | Orr et al. |
| 2011/0191209 A1 | 8/2011 | Gould et al. |
| 2011/0191241 A1 | 8/2011 | Blain et al. |
| 2011/0193704 A1 | 8/2011 | Harper et al. |
| 2011/0196791 A1 | 8/2011 | Dominguez |
| 2011/0196795 A1 | 8/2011 | Pointer |
| 2011/0208601 A1 | 8/2011 | Ferguson et al. |
| 2011/0208659 A1 | 8/2011 | Easterly et al. |
| 2011/0211445 A1 | 9/2011 | Chen |
| 2011/0214187 A1 | 9/2011 | Wittenstein et al. |
| 2011/0218863 A1 | 9/2011 | Roh et al. |
| 2011/0246244 A1 | 10/2011 | O'Rourke |
| 2011/0246361 A1 | 10/2011 | Geering |
| 2011/0251953 A1 | 10/2011 | Trende et al. |
| 2011/0252071 A1 | 10/2011 | Cidon |
| 2011/0258001 A1 | 10/2011 | Green et al. |
| 2011/0264566 A1 | 10/2011 | Brown |
| 2011/0264581 A1 | 10/2011 | Clyne |
| 2011/0264582 A1 | 10/2011 | Kim et al. |
| 2011/0270618 A1 | 11/2011 | Banerjee et al. |
| 2011/0270749 A1 | 11/2011 | Bennett et al. |
| 2011/0270754 A1 | 11/2011 | Kelly et al. |
| 2011/0276396 A1 | 11/2011 | Rathod |
| 2011/0288973 A1 | 11/2011 | Pazdziora et al. |
| 2011/0295662 A1 | 12/2011 | Harris |
| 2011/0295750 A1 | 12/2011 | Rammal |
| 2011/0296003 A1 | 12/2011 | McCann et al. |
| 2011/0302055 A1 | 12/2011 | Drake |
| 2011/0302067 A1 | 12/2011 | Washington |
| 2011/0302122 A1 | 12/2011 | Klein et al. |
| 2011/0302653 A1 | 12/2011 | Frantz et al. |
| 2011/0307397 A1 | 12/2011 | Benmbarek |
| 2011/0307434 A1 | 12/2011 | Rostampour et al. |
| 2011/0307957 A1 | 12/2011 | Barcelo et al. |
| 2011/0313921 A1 | 12/2011 | Dheer et al. |
| 2011/0320582 A1 | 12/2011 | Lewis |
| 2012/0005070 A1 | 1/2012 | McFall et al. |
| 2012/0005542 A1 | 1/2012 | Petersen et al. |
| 2012/0011027 A1 | 1/2012 | Okuyama |
| 2012/0011158 A1 | 1/2012 | Avner et al. |
| 2012/0016800 A1 | 1/2012 | Stewart et al. |
| 2012/0016948 A1 | 1/2012 | Sinha |
| 2012/0022990 A1 | 1/2012 | Kasower |
| 2012/0030216 A1 | 2/2012 | Churi et al. |
| 2012/0030771 A1 | 2/2012 | Pierson et al. |
| 2012/0036065 A1 | 2/2012 | Orttung et al. |
| 2012/0041879 A1 | 2/2012 | Kim et al. |
| 2012/0046974 A1 | 2/2012 | Eshleman et al. |
| 2012/0047219 A1 | 2/2012 | Feng et al. |
| 2012/0054088 A1 | 3/2012 | Edrington et al. |
| 2012/0054224 A1 | 3/2012 | Eskin |
| 2012/0054592 A1 | 3/2012 | Jaffe et al. |
| 2012/0060105 A1 | 3/2012 | Brown et al. |
| 2012/0066044 A1 | 3/2012 | Honnef et al. |
| 2012/0066046 A1 | 3/2012 | Satyavolu et al. |
| 2012/0066050 A1 | 3/2012 | Satyavolu et al. |
| 2012/0066106 A1 | 3/2012 | Papadimitriou |
| 2012/0066119 A1 | 3/2012 | Carion |
| 2012/0072338 A1 | 3/2012 | Sorbe |
| 2012/0072382 A1 | 3/2012 | Pearson et al. |
| 2012/0078764 A1 | 3/2012 | Ross et al. |

(56) References Cited

U.S. PATENT DOCUMENTS

| | | |
|---|---|---|
| 2012/0078781 A1 | 3/2012 | Ross et al. |
| 2012/0084162 A1 | 4/2012 | Smith et al. |
| 2012/0084210 A1 | 4/2012 | Farahmand |
| 2012/0084866 A1 | 4/2012 | Stolfo |
| 2012/0089438 A1 | 4/2012 | Tavares et al. |
| 2012/0089521 A1 | 4/2012 | Abrevaya et al. |
| 2012/0101938 A1 | 4/2012 | Kasower |
| 2012/0101939 A1 | 4/2012 | Kasower |
| 2012/0110467 A1 | 5/2012 | Blake et al. |
| 2012/0110677 A1 | 5/2012 | Abendroth et al. |
| 2012/0116963 A1 | 5/2012 | Klein et al. |
| 2012/0124498 A1 | 5/2012 | Santoro et al. |
| 2012/0130785 A1 | 5/2012 | Postrel |
| 2012/0136699 A1 | 5/2012 | Martin et al. |
| 2012/0136763 A1 | 5/2012 | Megdal et al. |
| 2012/0136774 A1 | 5/2012 | Imrey et al. |
| 2012/0136780 A1 | 5/2012 | El-Awady et al. |
| 2012/0143767 A1 | 6/2012 | Abadir |
| 2012/0143772 A1 | 6/2012 | Abadir |
| 2012/0144461 A1 | 6/2012 | Rathbun |
| 2012/0150736 A1 | 6/2012 | Dickerson et al. |
| 2012/0151045 A1 | 6/2012 | Anakata et al. |
| 2012/0151046 A1 | 6/2012 | Weiss et al. |
| 2012/0158654 A1 | 6/2012 | Behren et al. |
| 2012/0166264 A1 | 6/2012 | Shum et al. |
| 2012/0173339 A1 | 7/2012 | Flynt et al. |
| 2012/0173396 A1 | 7/2012 | Melby et al. |
| 2012/0173417 A1* | 7/2012 | Lohman ............... G06Q 20/102 705/40 |
| 2012/0179605 A1 | 7/2012 | Blain et al. |
| 2012/0185515 A1 | 7/2012 | Ferrel et al. |
| 2012/0191602 A1 | 7/2012 | Wright et al. |
| 2012/0195412 A1 | 8/2012 | Smith |
| 2012/0197788 A1 | 8/2012 | Sanghvi et al. |
| 2012/0198556 A1 | 8/2012 | Patel et al. |
| 2012/0203680 A1 | 8/2012 | Wehunt et al. |
| 2012/0203693 A1 | 8/2012 | Morgan et al. |
| 2012/0203696 A1 | 8/2012 | Morgan et al. |
| 2012/0208495 A1 | 8/2012 | Lawson et al. |
| 2012/0209766 A1 | 8/2012 | Kitchen et al. |
| 2012/0215682 A1 | 8/2012 | Lent et al. |
| 2012/0215690 A1 | 8/2012 | Grinberg et al. |
| 2012/0215719 A1 | 8/2012 | Verlander |
| 2012/0216125 A1 | 8/2012 | Pierce |
| 2012/0221467 A1 | 8/2012 | Hamzeh |
| 2012/0233066 A1 | 9/2012 | Vallabhaneni |
| 2012/0235897 A1 | 9/2012 | Hirota |
| 2012/0239417 A1 | 9/2012 | Pourfallah et al. |
| 2012/0239497 A1 | 9/2012 | Nuzzi |
| 2012/0239553 A1 | 9/2012 | Gonen et al. |
| 2012/0239560 A1 | 9/2012 | Pourfallah et al. |
| 2012/0246060 A1 | 9/2012 | Conyack, Jr. et al. |
| 2012/0253852 A1 | 10/2012 | Pourfallah et al. |
| 2012/0259763 A1 | 10/2012 | Pessin |
| 2012/0262472 A1 | 10/2012 | Garr et al. |
| 2012/0271712 A1 | 10/2012 | Katzin et al. |
| 2012/0278217 A1 | 11/2012 | Sui et al. |
| 2012/0278226 A1 | 11/2012 | Kolo |
| 2012/0278767 A1 | 11/2012 | Stibel et al. |
| 2012/0290451 A1 | 11/2012 | Jones et al. |
| 2012/0290660 A1 | 11/2012 | Rao et al. |
| 2012/0290740 A1 | 11/2012 | Tewari et al. |
| 2012/0295583 A1 | 11/2012 | Kim et al. |
| 2012/0297484 A1 | 11/2012 | Srivastava |
| 2012/0310825 A1 | 12/2012 | Freishtat et al. |
| 2012/0311433 A1 | 12/2012 | Pasupulati et al. |
| 2012/0317005 A1 | 12/2012 | Hutson et al. |
| 2012/0317013 A1 | 12/2012 | Luk et al. |
| 2012/0317014 A1 | 12/2012 | Cerise et al. |
| 2012/0323775 A1 | 12/2012 | Weinstein et al. |
| 2012/0324388 A1 | 12/2012 | Rao et al. |
| 2013/0006782 A1 | 1/2013 | Schwarzkopf et al. |
| 2013/0006843 A1 | 1/2013 | Tralvex |
| 2013/0006844 A1 | 1/2013 | Kremen |
| 2013/0013501 A1 | 1/2013 | Perlman |
| 2013/0013533 A1 | 1/2013 | Agarwal et al. |
| 2013/0018785 A1 | 1/2013 | Dolphin et al. |
| 2013/0018798 A1 | 1/2013 | Scipioni |
| 2013/0018811 A1 | 1/2013 | Britti et al. |
| 2013/0030994 A1 | 1/2013 | Calman et al. |
| 2013/0030996 A1 | 1/2013 | MacKouse |
| 2013/0031109 A1 | 1/2013 | Roulson et al. |
| 2013/0031624 A1 | 1/2013 | Britti et al. |
| 2013/0036000 A1 | 2/2013 | Giordano et al. |
| 2013/0036046 A1 | 2/2013 | Rom et al. |
| 2013/0041798 A1 | 2/2013 | Unger |
| 2013/0041810 A1 | 2/2013 | Murrell et al. |
| 2013/0043305 A1 | 2/2013 | Zhou et al. |
| 2013/0054345 A1 | 2/2013 | Ross et al. |
| 2013/0054357 A1 | 2/2013 | Mager et al. |
| 2013/0054393 A1 | 2/2013 | Francisco et al. |
| 2013/0054452 A1 | 2/2013 | Au et al. |
| 2013/0060694 A1 | 3/2013 | Oskolkov et al. |
| 2013/0066775 A1 | 3/2013 | Milam |
| 2013/0073445 A1 | 3/2013 | Meszaros |
| 2013/0073457 A1 | 3/2013 | Sander et al. |
| 2013/0080467 A1 | 3/2013 | Carson et al. |
| 2013/0085804 A1 | 4/2013 | Leff et al. |
| 2013/0085894 A1 | 4/2013 | Chan et al. |
| 2013/0085936 A1 | 4/2013 | Law et al. |
| 2013/0085939 A1 | 4/2013 | Colak et al. |
| 2013/0090982 A1 | 4/2013 | Ross |
| 2013/0095810 A1 | 4/2013 | Moreton et al. |
| 2013/0103464 A1 | 4/2013 | Kuznetsov |
| 2013/0103571 A1 | 4/2013 | Chung et al. |
| 2013/0103580 A1 | 4/2013 | Ventura |
| 2013/0110557 A1 | 5/2013 | Kasower |
| 2013/0110565 A1 | 5/2013 | Means et al. |
| 2013/0110668 A1 | 5/2013 | Hart et al. |
| 2013/0117072 A1 | 5/2013 | Nish |
| 2013/0117087 A1 | 5/2013 | Coppinger |
| 2013/0117177 A1 | 5/2013 | MacMillan et al. |
| 2013/0124392 A1 | 5/2013 | Achanta et al. |
| 2013/0124406 A1 | 5/2013 | Poplawski et al. |
| 2013/0125010 A1 | 5/2013 | Strandell |
| 2013/0130778 A1 | 5/2013 | Anderson et al. |
| 2013/0132151 A1 | 5/2013 | Stibel et al. |
| 2013/0132181 A1 | 5/2013 | Fisher |
| 2013/0132219 A1 | 5/2013 | Liberty |
| 2013/0132235 A1 | 5/2013 | Gandhi |
| 2013/0132245 A1 | 5/2013 | Hsieh et al. |
| 2013/0138494 A1 | 5/2013 | Levine |
| 2013/0159411 A1 | 6/2013 | Bowen |
| 2013/0173447 A1 | 7/2013 | Rothschild |
| 2013/0173449 A1 | 7/2013 | Ng et al. |
| 2013/0173451 A1 | 7/2013 | Kornegay et al. |
| 2013/0173463 A1 | 7/2013 | Stewart et al. |
| 2013/0173465 A1 | 7/2013 | Talimaa et al. |
| 2013/0173468 A1 | 7/2013 | Ross |
| 2013/0179312 A1 | 7/2013 | Al-Hilali |
| 2013/0179332 A1 | 7/2013 | Allen et al. |
| 2013/0179337 A1 | 7/2013 | Ochynski |
| 2013/0179348 A1 | 7/2013 | Crofts et al. |
| 2013/0185205 A1 | 7/2013 | Boss et al. |
| 2013/0185210 A1 | 7/2013 | Dodson et al. |
| 2013/0185293 A1 | 7/2013 | Boback |
| 2013/0187923 A1 | 7/2013 | Yoshimoto et al. |
| 2013/0191231 A1 | 7/2013 | Gazdzinski |
| 2013/0191270 A1 | 7/2013 | Carragher |
| 2013/0191272 A1 | 7/2013 | Cochran et al. |
| 2013/0191278 A1 | 7/2013 | O'Leary et al. |
| 2013/0198066 A1 | 8/2013 | Wall et al. |
| 2013/0198514 A1 | 8/2013 | Grinberg et al. |
| 2013/0204745 A1 | 8/2013 | Martin |
| 2013/0204753 A1 | 8/2013 | Wallace |
| 2013/0204762 A1 | 8/2013 | Harris et al. |
| 2013/0205135 A1 | 8/2013 | Lutz |
| 2013/0211986 A1 | 8/2013 | Debie et al. |
| 2013/0212016 A1 | 8/2013 | Davis et al. |
| 2013/0226784 A1 | 8/2013 | He et al. |
| 2013/0246254 A1 | 9/2013 | Crooks |
| 2013/0254049 A1 | 9/2013 | Todd |
| 2013/0262226 A1 | 10/2013 | LaChapelle et al. |
| 2013/0262291 A1 | 10/2013 | Ricci |

(56) References Cited

U.S. PATENT DOCUMENTS

| | | |
|---|---|---|
| 2013/0267171 A1 | 10/2013 | Sarkar et al. |
| 2013/0268378 A1 | 10/2013 | Yovin |
| 2013/0268434 A1 | 10/2013 | Mohsenzadeh |
| 2013/0275294 A1 | 10/2013 | Liu et al. |
| 2013/0278515 A1 | 10/2013 | Kikuchi |
| 2013/0279676 A1 | 10/2013 | Baniak et al. |
| 2013/0293363 A1 | 11/2013 | Plymouth |
| 2013/0297485 A1 | 11/2013 | Whitney |
| 2013/0297499 A1 | 11/2013 | Mukherjee |
| 2013/0298238 A1 | 11/2013 | Shah et al. |
| 2013/0304596 A1 | 11/2013 | Munif |
| 2013/0332341 A1 | 12/2013 | Papadimitriou |
| 2013/0332342 A1 | 12/2013 | Kasower |
| 2013/0332352 A1 | 12/2013 | Imrey et al. |
| 2013/0339249 A1 | 12/2013 | Weller et al. |
| 2013/0347059 A1 | 12/2013 | Fong et al. |
| 2014/0012733 A1 | 1/2014 | Vidal |
| 2014/0012737 A1 | 1/2014 | Evans |
| 2014/0019348 A1* | 1/2014 | Daley .................. G06Q 20/14 705/40 |
| 2014/0032300 A1 | 1/2014 | Zhang et al. |
| 2014/0032723 A1 | 1/2014 | Nema |
| 2014/0046872 A1 | 2/2014 | Arnott et al. |
| 2014/0061302 A1 | 3/2014 | Hammad |
| 2014/0074689 A1 | 3/2014 | Lund et al. |
| 2014/0089166 A1 | 3/2014 | Padawer |
| 2014/0089167 A1 | 3/2014 | Kasower |
| 2014/0089191 A1 | 3/2014 | Brown |
| 2014/0096249 A1 | 4/2014 | Dupont et al. |
| 2014/0098229 A1 | 4/2014 | Lu et al. |
| 2014/0110477 A1 | 4/2014 | Hammad |
| 2014/0129942 A1 | 5/2014 | Rathod |
| 2014/0156500 A1 | 6/2014 | Lassen et al. |
| 2014/0156501 A1 | 6/2014 | Howe |
| 2014/0156503 A1 | 6/2014 | Lassen et al. |
| 2014/0164112 A1 | 6/2014 | Kala |
| 2014/0164398 A1 | 6/2014 | Smith et al. |
| 2014/0164519 A1 | 6/2014 | Shah |
| 2014/0180919 A1 | 6/2014 | Brown |
| 2014/0181285 A1 | 6/2014 | Stevens et al. |
| 2014/0258083 A1 | 9/2014 | Achanta et al. |
| 2014/0258084 A1 | 9/2014 | Padawer et al. |
| 2014/0279329 A1 | 9/2014 | Dancel |
| 2014/0279382 A1 | 9/2014 | Drakeley et al. |
| 2014/0279391 A1 | 9/2014 | Gallo et al. |
| 2014/0298485 A1 | 10/2014 | Gardner |
| 2014/0310151 A1 | 10/2014 | Shishkov et al. |
| 2014/0317023 A1 | 10/2014 | Kim |
| 2014/0379554 A1 | 12/2014 | Grossman et al. |
| 2015/0026060 A1 | 1/2015 | Krietzman et al. |
| 2015/0127490 A1 | 5/2015 | Puertas |
| 2015/0134506 A1 | 5/2015 | King et al. |
| 2015/0178829 A1 | 6/2015 | Weiss |
| 2015/0310543 A1 | 10/2015 | DeBie |
| 2015/0324920 A1 | 11/2015 | Wilson et al. |
| 2017/0132700 A1 | 5/2017 | Kazerani et al. |
| 2017/0200223 A1 | 7/2017 | Kasower |

FOREIGN PATENT DOCUMENTS

| | | |
|---|---|---|
| EP | 1 239 378 | 9/2002 |
| EP | 1 301 887 | 4/2003 |
| EP | 1 591 931 | 11/2005 |
| EP | 1 850 278 | 10/2007 |
| EP | 2 088 743 | 8/2009 |
| EP | 2 151 793 | 2/2010 |
| GB | 2 102 606 | 2/1983 |
| JP | 2005-208945 | 8/2005 |
| KR | 10-2000-0063313 | 11/2000 |
| KR | 10-2002-0039203 | 5/2002 |
| KR | 10-2007-0081504 | 8/2007 |
| TW | 256569 | 6/2006 |
| WO | WO 91/16691 | 10/1991 |
| WO | WO 00/051052 | 8/2000 |
| WO | WO 00/055778 | 9/2000 |
| WO | WO 01/009752 | 2/2001 |
| WO | WO 01/009792 | 2/2001 |
| WO | WO 01/084281 | 11/2001 |
| WO | WO 02/029636 | 4/2002 |
| WO | WO 2004/031986 | 4/2004 |
| WO | WO 2005/010683 | 2/2005 |
| WO | WO 2005/033979 | 4/2005 |
| WO | WO 2006/050278 | 5/2006 |
| WO | WO 2006/069199 | 6/2006 |
| WO | WO 2007/084555 | 7/2007 |
| WO | WO 2008/021104 | 2/2008 |
| WO | WO 2008/042614 | 4/2008 |
| WO | WO 2009/064694 | 5/2009 |
| WO | WO 2009/064840 | 5/2009 |
| WO | WO 2009/102391 | 8/2009 |
| WO | WO 2010/001406 | 1/2010 |
| WO | WO 2010/062537 | 6/2010 |
| WO | WO 2010/077989 | 7/2010 |
| WO | WO 2010/150251 | 12/2010 |
| WO | WO 2011/005876 | 1/2011 |

OTHER PUBLICATIONS

U.S. Appl. No. 12/705,489, filed Feb. 12, 2010, Bargoli et al.
U.S. Appl. No. 12/705,511, filed Feb. 12, 2010, Bargoli et al.
Actuate, "Delivering Enterprise Information for Corporate Portals", White Paper, 2004, pp. 1-7.
"Aggregate and Analyze Social Media Content: Gain Faster and Broader Insight to Market Sentiment," SAP Partner, Mantis Technology Group, Apr. 2011, pp. 4.
Aktas et al., "Personalizing PageRank Based on Domain Profiles", WEBKDD workshop: Webmining and Web Usage Analysis, Aug. 22, 2004, pp. 83-90.
Aktas et al., "Using Hyperlink Features to Personalize Web Search", WEBKDD workshop: Webmining and Web Usage Analysis, Aug. 2004.
"Arizona Company Has Found Key in Stopping ID Theft," PR Newswire, New York, Aug. 10, 2005 http://proquest.umi.com/pqdweb?did=880104711&sid=1&Fmt=3&clientId=19649&RQT=309&Vname=PQD.
ABC News Now: Money Matters, as broadcasted Nov. 15, 2005 with guest Todd Davis (CEO of Lifelock), pp. 6.
Anonymous, "Credit-Report Disputes Await Electronic Resolution," Credit Card News, Chicago, Jan. 15, 1993, vol. 5, No. 19, p. 5.
Anonymous, "MBNA Offers Resolution of Credit Card Disputes," Hempstead, Feb. 2002, vol. 68, No. 2, p. 47.
Anonymous, "Feedback", Credit Management, ABI/INFORM Global, Sep. 2006, pp. 6.
Awoonor-Williams, Princess Josephine, Ph.D. "Gender and Credit: An Analysis of Women's Experience in the Credit Market", ProQuest Dissertations and Theses, 2004, pp. 148.
"Beware of 'Who Viewed My Profile' Apps on Facebook" Tech for Luddites, Mar. 15, 2010 printed Sep. 27, 2013 http://www.techforluddites.com/2010/03/beware-of-who-viewed-my-profile-apps-on-facebook.html.
Bielski, Lauren, "Will you Spend to Thwart ID Theft?" ABA Banking Journal, Apr. 2005, pp. 54, 56-57, 60.
BlueCava, "What We Do", http://www.bluecava.com/what-we-do/, printed Nov. 5, 2012 in 3 pages.
Buxfer, http://www.buxfer.com/ printed Feb. 5, 2014 in 1 page.
Check, http://check.me/ printed Feb. 5, 2014 in 3 pages.
Chores & Allowances, "Do Kids Have Credit Reports?" Oct. 15, 2007, http://choresandallowances.blogspot.com/2007/10/do-kids-have-credit-reports.html, pp. 5.
Comlounge.net, "plonesocial.auth.rpx" http://web.archive.org/web/20101026041841/http://comlounge.net/rpx as captured Oct. 26, 2010 in 9 pages.
CreditKarma, http://www.creditkarma.com printed Feb. 8, 2013 in 2 pages.
CreditSesame, http://www.creditsesame.com/how-it-works/our-technology/ printed Feb. 5, 2013 in 2 pages.

(56) References Cited

OTHER PUBLICATIONS

Collins, Michael J., "Exploring the Design of Financial Counseling for Mortgage Borrowers in Default," Journal of Family and Economic Issues, Springer Science+Business Media, Mar. 13, 2007, pp. 207-226.
"Consumers Gain Immediate and Full Access to Credit Score Used by Majority of U.S. Lenders", PR Newswire, ProQuest Copy, Mar. 19, 2001, p. 1.
"CreditCheck Monitoring Services," Dec. 11, 2000, pp. 1, lines 21-23.
"Credit Improvement", CreditRepair.com, Mar. 10, 2010, http://web.archive.org/web/20100310134914/http://www.creditrepair.com/credit/, as archived Mar. 10, 2010 in 2 pages.
Credit Plus, Inc., "Score Wizard", http://web.archive.org/web/20030806080310/www.creditplus.com/scorewizard.asp, as archived Aug. 6, 2003 in 1 page.
Cullen, Terri; "The Wall Street Journal Complete Identity Theft Guidebook:How to Protect Yourself from the Most Pervasive Crime in America"; Chapter 3, pp. 59-79; Jul. 10, 2007.
"D&B Corporate Family Linkage", D&B Internet Access for U.S. Contract Customers, https://www.dnb.com/ecomp/help/linkage.htm as printed Dec. 17, 2009, pp. 1.
"Data Loss Prevention (DLP) Software", http://www.symantec.com/data-loss-prevention/ printed Apr. 8, 2013 in 8 pages.
"Data Protection", http://compliantprocessing.com/data-protection/ printed Apr. 8, 2013 in 4 pages.
Day, Jo and Kevin; "ID-ology: A Planner's Guide to Identity Theft"; Journal of Financial Planning:Tech Talk; pp. 36-38; Sep. 2004.
"Debt Settlement: Watch Video on how to Pay Your Debt Faster", http://www.debtconsolidationcare.com/debt-settlement.html printed Jan. 9, 2013 in 6 pages.
Demby, Elayne, "Special Report: Letting Consumers Know the Score—and More", Collections and Credit Risk, New York, Feb. 2003, vol. 8, Issue 2, p. 53, pp. 3.
"Disputes in Cyberspace 2001: Update of online dispute resolution for consumers in cross-border disputes", Consumers International, Nov. 2001, pp. 45, http://web.archive.org/web/20160414183303/http://www.consumersinternational.org/media/304196/disputes%20in%20cyberspace%202001.%20update%20of%20online%20dispute%20resolution%20for%20consumers%20in%20cross-border%20disputes..pdf.
Elangovan, A.R., "Managerial Third-Party Dispute Intervention: A Prescriptive Model of Strategy Selection", Academy of Management, Oct. 1, 1995, vol. 20, No. 4, pp. 800-830.
Elliehausen et al., The Impact of Credit Counseling on Subsequent Borrower Behavior, The Journal of Consumer Affairs, Summer 2007, vol. 41, No. 1, pp. 1-28.
Equifax, "Business Status Alerts: User Guide", Jul. 2009, pp. 1-21.
Equifax Consumer Credit Report http://www.equifax.com/home/, as retrieved on Sep. 17, 2008.
Equifax; "Equifax Credit Watch"; https://www.econsumer.equifax.co.uk/consumer/uk/sitepage.ehtml, dated Jun. 27, 2007 on www.archive.org.
"Equifax: Debt Wise™ Credit Monitoring Service," Product Review, http://www.mdmproofing.com/iym/reviews/equifax/debt-wise/, Jan. 2010, pp. 11.
Equifax; "Places", http://web.archive.org/web/20111111113930/http://www.equifax.com/places as archived Nov. 11, 2011 in 1 page.
Equifax; "Places", http://www.equifax.com/places/ as printed Nov. 16, 2015 in 1 page.
Equifax; "Welcome to Equifax Mobile", http://www.equifax.com/mobile/ as printed Mar. 18, 2011 in 2 pages.
Ettorre, "Paul Kahn on Exceptional Marketing," Management Review, vol. 83, No. 11, Nov. 1994, pp. 48-51.
Experian Consumer Credit Report http://www.experian.com/, as retrieved on Sep. 17, 2008.
Facebook, "Facebook helps you connect and share with the people in your life," www.facebook.com printed Nov. 16, 2010 in 1 page.
FamilySecure.com, "Frequently Asked Questions", http://www.familysecure.com/FAQ.aspx as archived Jul. 15, 2007 in 3 pages.
FamilySecure.com; "Identity Theft Protection for the Whole Family | FamilySecure.com" http://www.familysecure.com/, as retrieved on Nov. 5, 2009.
Fenner, Peter, "Mobile Address Management and Billing for Personal Communications", 1st International Conference on Universal Personal Communications, 1992, ICUPC '92 Proceedings, pp. 253-257.
"Fictitious Business Name Records", Westlaw Database Directory, http://directory.westlaw.com/scope/default.asp?db=FBN-ALL&RS-W...&VR=2.0 as printed Dec. 17, 2009, pp. 5.
Fitzpatrick, Alex, "Facebook Monitors Your Chats for Criminal Activity [Report]," Mashable, Jul. 12, 2012 printed Sep. 27, 2013 http://mashable.com/2012/07/12/facebook-scanning-chats/.
"Fraud Alert | Learn How". Fight Identity Theft. http://www.fightidentitytheft.com/flag.html, accessed on Nov. 5, 2009.
"Fund Manager," Portfolio Management Software website, indexed into Google on Jan. 7, 2005, Retrieved Oct. 24, 2014 http://www.fundmanagersoftware.com/, http://www.fundmanagersoftware.com/help/gph_tp_pieasset.html, http://www.fundmanagersoftware.com/demo2.html.
Gibbs, Adrienne; "Protecting Your Children from Identity Theft," Nov. 25, 2008, http://www.creditcards.com/credit-card-news/identity-ID-theft-and-kids-children-1282.php, pp. 4.
"GLBA Compliance and FFIEC Compliance" http://www.trustwave.com/financial-services.php printed Apr. 8, 2013 in 1 page.
Gordon et al., "Identity Fraud: A Critical National and Global Threat," LexisNexis, Oct. 28, 2003, pp. 1-48.
"Guide to Benefits, MasterCard® Cardholder Smart Shopper Benefits", May 2005, pp. 10.
Herzberg, Amir, "Payments and Banking with Mobile Personal Devices," Communications of the ACM, May 2003, vol. 46, No. 5, pp. 53-58.
Hoofnagle, Chris Jay, "Identity Theft: Making the Known Unknowns Known," Harvard Journal of Law & Technology, Fall 2007, vol. 21, No. 1, pp. 98-122.
Hunt, Robert M.; Whither Consumer Credit Counseling? Business Review, Dec. 31, 2005, pp. 9-20.
ID Analytics, "ID Analytics® Consumer Notification Service" printed Apr. 16, 2013 in 2 pages.
ID Theft Assist, "Do You Know Where Your Child's Credit Is?", Nov. 26, 2007, http://www.idtheftassist.com/pages/story14, pp. 3.
"ID Thieves These Days Want Your Number, Not Your Name", The Columbus Dispatch, Columbus, Ohio, http://www.dispatch.com/content/stories/business/2014/08/03/id-thieves-these-days-want-your-number-not-your-name.html, Aug. 3, 2014 in 2 pages.
Identity Theft Resource Center; Fact Sheet 120 A—To Order a Credit Report for a Child; Fact Sheets, Victim Resources; Apr. 30, 2007.
"Identity Thieves Beware: Lifelock Introduces Nation's First Guaranteed Proactive Solution to Identity Theft Protection," PR Newswire, New York, Jun. 13, 2005 http://proquest.umi.com/pqdweb?did=852869731&sid=1&Fmt=3&clientId=19649&RQT=309&Vname=PQD.
Ideon, Credit-Card Registry that Bellyflopped this Year, Is Drawing some Bottom-Fishers, The Wall Street Journal, Aug. 21, 1995, pp. C2.
Information Brokers of America, "Information Brokers of America Child Identity Theft Protection" http://web.archive.org/web/20080706135451/http://iboainfo.com/child-order.html as archived Jul. 6, 2008 in 1 page.
Information Brokers of America, "Safeguard Your Child's Credit", http://web.archive.org/web/20071215210406/http://www.iboainfo.com/child-id-protect.html as archived Dec. 15, 2007 in 1 page.
Intelius, "People Search—Updated Daily, Accurate and Fast!" http://www.intelius.com/people-search.html?=&gclid=CJqZIZP7paUCFYK5KgodbCUJJQ printed Nov. 16, 2010 in 1 page.
Iovation, Device Identification & Device Fingerprinting, http://www.iovation.com/risk-management/device-identification printed Nov. 5, 2012 in 6 pages.

(56) References Cited

OTHER PUBLICATIONS

Irby, LaToya, "How Will a Late Payment Hurt My Credit Score?" http://web.archive.org/web/20101024113603/http://credit.about.com/od/creditscorefaq/f/how-late-payment-affects-credit-score.htm, Oct. 24, 2010, pp. 1.

"Judging Credit: Consumers Need Better Finance Tools", News Journal, Daytona Beach, FL, Dec. 28, 2002.

Kaushik, Nishant, "The Epic Hacking of Mat Honan and Our Identity Challenge," Aug. 7, 2012, http://blog.talkingidentity.com/2012/08/the-epic-hacking-of-mat-honan-and-our-identity-challenge.html.

Khan, Mickey Alam, "Equifax Recognizes Changing Customer Behavior with Four-Pronged Mobile Strategy", Mobile Marketer, http://web.archive.org/web/20151117005818/http://www.mobilemarketer.com/cms/news/strategy/9733.html, Apr. 19, 2011 in 10 pages.

Lan, Joe, "The Top Portfolio Management Software," http://www.aaii.com/computerizedinvesting/article/the-top-portfolio-management-software, Includes Discussion thread, Fourth Quarter 2011, pp. 17.

Lanubile, et al., "Evaluating Empirical Models for the Detection of High-Risk Components: Some Lessons Learned", 20th Annual Software Engineering Workshop, Nov. 29-30, 1995, Greenbelt, Maryland, pp. 1-6.

Lauwers et al., "Five Hundred Years of Bookkeeping: A Portrait of Luca Pacioli", Tijdschrift voor Economie en Management, 1994, vol. 39. No. 3, pp. 289-304.

Lee, W.A.; "Experian, on Deal Hunt, Nets Identity Theft Insurer", American Banker: The Financial Services Daily, Jun. 4, 2003, New York, NY, 1 page.

Leskovec, Jure, "Social Media Analytics: Tracking, Modeling and Predicting the Flow of Information through Networks", WWW 2011-Tutorial, Mar. 28-Apr. 1, 2011, Hyderabad, India, pp. 277-278.

Letter to Donald A. Robert from Carolyn B. Maloney, dated Oct. 31, 2007, pp. 2.

Letter to Donald A. Robert from Senator Charles E. Schumer, dated Oct. 11, 2007, pp. 2.

Letter to Harry C. Gambill from Carolyn B. Maloney, dated Oct. 31, 2007, pp. 2.

Letter to Harry C. Gambill from Senator Charles E. Schumer, dated Oct. 11, 2007, pp. 2.

Letter to Richard F. Smith from Carolyn B. Maloney, dated Oct. 31, 2007, pp. 2.

Letter to Richard F. Smith from Senator Charles E. Schumer, dated Oct. 11, 2007, pp. 2.

Li et al., "Automatic Verbal Information Verification for User Authentication", IEEE Transactions on Speech and Audio Processing, vol. 8, No. 5, Sep. 2000, pp. 585-596.

LifeLock, http://web.archive.org/web/20110724011010/http://www.lifelock.com/? as archived Jul. 24, 2011 in 1 page.

LifeLock, "How LifeLock Works," http://www.lifelock.com/lifelock-for-people printed Mar. 14, 2008 in 1 page.

LifeLock, "LifeLock Launches First ID Theft Prevention Program for the Protection of Children," Press Release, Oct. 14, 2005, http://www.lifelock.com/about-us/press-room/2005-press-releases/lifelock-protection-for-children.

LifeLock; "How Can LifeLock Protect My Kids and Family?" http://www.lifelock.com/lifelock-for-people/how-we-do-it/how-can-lifelock-protect-my-kids-and-family printed Mar. 14, 2008 in 1 page.

LifeLock, "Personal Identity Theft Protection & Identity Theft Products," http://www.lifelock.com/lifelock-for-people, accessed Nov. 5, 2007.

LifeLock, Various Pages, www.lifelock.com/, 2007.

Littwin, Angela, "Beyond Usury: A Study of Credit-Card Use and Preference Among Low-Income Consumers", Texas Law Review, vol. 86, No. 3, pp. 451-506; Feb. 2008.

Lobo, Jude, "MySAP.com Enterprise Portal Cookbook," SAP Technical Delivery, Feb. 2002, vol. 1, pp. 1-13.

Lund, Graham, "Credit Bureau Data: Maximizing the Benefits," Credit Management, May 2004, ProQuest Central, pp. 44-45.

Magid, Lawrence, J., Business Tools: When Selecting an ASP Ensure Data Mobility, Los Angeles Times, Los Angeles, CA, Feb. 26, 2001, vol. C, Issue 4, pp. 3.

"Managing Debt?" Federal Trade Commission: Consumer Information, http://www.consumer.ftc.gov/articles/0158-managing-debt, printed Mar. 22, 2013 in 4 pages.

Manilla, http://www.manilla.com/how-it-works/ printed Feb. 5, 2014 in 1 page.

Mannan et al., "Mercury: Recovering Forgotten Passwords Using Personal Devices*", Dec. 17, 2011, Pre-Proceedings of Financial Cryptography and Data Security 2011, pp. 1-16.

Meyers et al., "Using Your Social Networking Accounts to Log Into NPR.org," NPR.org, Jun. 24, 2010, http://web.archive.org/web/20100627034054/http://www.npr.org/blogs/inside/2010/06/24/128079309/using-your-social-networking-accounts-to-log-into-npr-org in 3 pages.

Micarelli et al., "Personalized Search on the World Wide Web," The Adaptive Web, LNCS 4321, 2007, pp. 195-230.

Microsoft, "Expand the Reach of Your Business," Microsoft Business Solutions, 2004, in 16 pages.

Mint.com, http://www.mint.com/ printed Sep. 18, 2008 in 2 pages.

Mint.com, http://www.mint.com/how-it-works/ printed Feb. 5, 2013 in 2 pages.

MS Money Software by Microsoft http://www.microsoft.com/Money/default.mspx as retrieved on Sep. 17, 2008.

Mvelopes, http://www.mvelopes.com/ printed Feb. 5, 2014 in 2 pages.

My Call Credit http://www.mycallcredit.com/products.asp?product=ALR dated Dec. 10, 2005 on www.archive.org.

My Call Credit http://www.mycallcredit.com/rewrite.asp?display=faq dated Dec. 10, 2005 on www.archive.org.

My ID Alerts, "Why ID Alerts" http://www.myidalerts.com/why-id-alerts.jsps printed Apr. 3, 2012 in 2 pages.

My ID Alerts, "How it Works" http://www.myidalerts.com/how-it-works.jsps printed Apr. 3, 2012 in 3 pages.

MyRatePlan.com, "Cell Phone Buying Guide", http://web.archive.org/web/20061116103256/http://myrateplan.com/cell_phone_buying_guide/family_plans/, as archived Nov. 16, 2006 in 2 pages.

MyReceipts, http://www.myreceipts.com/, printed Oct. 16, 2012 in 1 page.

MyReceipts—How it Works, http://www.myreceipts.com/howItWorks.do, printed Oct. 16, 2012 in 1 page.

"Name Availability Records", Westlaw Database Directory, http://directory.westlaw.com/scope/default.asp?db=NA-ALL&RS=W...&VR=2.0 as printed Dec. 17, 2009, pp. 5.

National Alert Registry Launches RegisteredOffendersList.org to Provide Information on Registered Sex Offenders, May 16, 2005, pp. 2, http://www.prweb.com/printer/240437.htm accessed on Oct. 18, 2011.

National Alert Registry Offers Free Child Safety "Safe From Harm" DVD and Child Identification Kit, Oct. 24, 2006. pp. 2, http://www.prleap.com/pr/53170 accessed on Oct. 18, 2011.

National Alert Registry website titled, "Does a sexual offender live in your neighborhood", Oct. 22, 2006, pp. 2, http://web.archive.org/wb/20061022204835/http://www.nationallertregistry.com/ accessed on Oct. 13, 2011.

"New for Investors: Asset Allocation, Seasoned Returns and More," Prosper, http://blog.prosper.com/2011/10/27/new-for-investors-asset-allocation-seasoned-returns-and-more/, pp. 4.

Next Card: About Us, http://web.cba.neu.edu/~awatson/NextCardCase/NextCardAboutUs.htm printed Oct. 23, 2009 in 10 pages.

Ogg, Erica, "Apple Cracks Down on UDID Use", http://gigaom.com/apple/apple-cracks-down-on-udid-use/ printed Nov. 5, 2012 in 5 Pages.

Organizing Maniac's Blog—Online Receipts Provided by MyQuickReceipts.com, http://organizingmaniacs.wordpress.com/2011/01/12/online-receipts-provided-by-myquickreceipts.com/ dated Jan. 12, 2011 printed Oct. 16, 2012 in 3 pages.

Paustian, Chuck, "Every Cardholder a King Customers get the Full Treatment at Issuers' Web Sites," Card Marketing, New York, Mar. 2001, vol. 5, No. 3, pp. 4.

(56) References Cited

OTHER PUBLICATIONS

Peltier, Jon, "Conditional Formatting of Excel Charts", Peltier Tech Blog, as posted Feb. 13, 2012, http://peltiertech.com/conditional-formatting-of-excel-charts/, pp. 1-5.
People Finders, http://www.peoplefinders.com/?CMP=Google&utm_source=google&utm_medium=cpc printed Nov. 16, 2010 in 1 page.
People Lookup, "Your Source for Locating Anyone!" www.peoplelookup.com/people-search.html printed Nov. 16, 2010 in 1 page.
People Search, "The Leading Premium People Search Site on the Web," http://www.peoplesearch.com printed Nov. 16, 2010 in 2 pages.
PersonalCapital.com, http://www.personalcapital.com/how-it-works printed Feb. 5, 2014 in 5 pages.
Pinola, Melanie, "How Can I Protect Against Social Engineering Hacks?" Aug. 9, 2012, http://lifehacker.com/5933296/how-can-i-protect-against-hackers-who-use-sneaky-social-engineering-techniques-to-get-into-my-accounts.
Planet Receipt—Home, http://www.planetreceipt.com/home printed Oct. 16, 2012 in 1 page.
Planet Receipt—Solutions & Features, http://www.planetreceipt.com/solutions-features printed Oct. 16, 2012 in 2 pages.
Planwise, http://planwise.com printed Feb. 8, 2013 in 5 pages.
Press Release—"Helping Families Protect Against Identity Theft—Experian Announces FamilySecure.com; Parents and guardians are alerted for signs of potential identity theft for them and their children; product features an industry-leading $2 million guarantee"; PR Newswire; Irvine, CA; Oct. 1, 2007.
PrivacyGuard, http://web.archive.org/web/20110728114049/http://www.privacyguard.com/ as archived Jul. 28, 2011 in 1 page.
Privacy Rights Clearinghouse, "Identity Theft: What to do if it Happens to You," http://web.archive.org/web/19990218180542/http://privacyrights.org/fs/fs17a.htm printed Feb. 18, 1999.
"Qualifying for Debt Settlement", http://www.certifieddebt.com/debt/settlement-qualifications.shtml printed Jan. 9, 2013 in 2 pages.
Quantix Software, "Investment Account Manager," available at https://www.youtube.com/watch?v=1UwNTEER1Kk, as published Mar. 21, 2012.
Quicken Online by Intuit http://www.quicken.intuit.com/, as retrieved on Sep. 17, 2008.
"Quicken Support", http://web.archive.org/web/20071231040130/http://web.intuit.com/support/quicken/docs/d_gif.html as archived Dec. 31, 2007 in 6 pages.
Ramaswamy, Vinita M., Identity-Theft Toolkit, The CPA Journal, Oct. 1, 2006, vol. 76, Issue 10, pp. 66-70.
Rawe, Julie; "Identity Thieves", Time Bonus Section, Inside Business, Feb. 2002, pp. 2.
Repici et al., "The Comma Separated Value (CSV) File Format", http://creativyst.com/Doc/Articles/CSV/CSV01.htm, Creativyst, Inc., 2002, pp. 10.
Reppler.com, "Learn More: Basic Information about how TrustedID Reppler Works for You," www.reppler.com/learn/ printed Oct. 24, 2012 in 2 pages.
"Resolve Debt for Less: With Help from Freedom Financial" http://www.debtsettlementusa.com/ printed Jan. 9, 2013 in 6 pages.
Romig, Shane, "The Truth About Credit Repair", Credit.com, May 5, 2010, http://web.archive.org/web/20100505055526/http://www.credit.com/credit_information/credit_help/The-Truth-About-Credit-Repair.jsp printed Mar. 22, 2013 in 4 pages.
Roth, Andrew, "CheckFree to Introduce E-Mail Billing Serving," American Banker, New York, Mar. 13, 2001, vol. 166, No. 49, pp. 3.
SAS, "SAS® Information Delivery Portal", Fact Sheet, 2008, in 4 pages.
Schmidt et al., "A Set of Multi-Touch Graph Interaction Techniques", ITS '10, Nov. 7-10, 2010, Saarbrucken, Germany, pp. 1-4.
Scholastic Inc.:Parent's Request for Information http://web.archive.org/web/20070210091055/http://www.scholastic.com/inforequest/index.htm as archived Feb. 10, 2007 in 1 page.
Scholastic Inc.:Privacy Policy http://web.archive.org/web/20070127214753/http://www.scholastic.com/privacy.htm as archived Jan. 27, 2007 in 3 pages.
Screenshot for Investment Account Manager v.2.8.3, published at http://www.aaii.com/objects/get/1642.gif by at least Aug. 30, 2011 in 1 page.
Sealey, Geraldine, "Child ID Theft Can Go Unnoticed for Years", http://abcnews.go.com/US/story?id=90257, Sep. 12, 2003 in 9 pages.
"Settling Your Debts—Part 1 in Our Debt Settlement Series", http://www.creditinfocenter.com/debt/settle_debts.shtml printed Jan. 9, 2013 in 6 pages.
Shin, Laura, "See an Error on Your Credit Report? Credit Karma Now Makes It Easy to Dispute", Nov. 12, 2015, http://www.forbes.com/sites/laurashin/2015/11/12/see-an-error-on-your-credit-report-credit-karma-now-makes-it-easy-to-dispute/, pp. 4.
ShoeBoxed, https://www.shoeboxed.com/sbx-home/ printed Oct. 16, 2012 in 4 pages.
Simpson, Glyn, "Microsoft (MS) Money (MSMoney FAQ, Help and Information pp.", pp. 2, Copyright © Glyn Simpson 1998-2007, http://web.archive.org/web/20071018075531/http://money.mvps.org/faq/article/196.aspx.
Singletary, Michelle, "The Littlest Victims of ID Theft", The Washington Post, The Color of Money, Oct. 4, 2007.
Stauffer et al., "Using HTML 3.2," Second Edition, 1996, Que Publishing, pp. 192-193.
Tajik, S., "Conditional Plotting, Changing Color of Line Based on Value", MathWorks®, MATLAB Answers™, Question Posted Feb. 10, 2011 to https://www.mathworks.com/matlabcentral/answers/1156-conditional-plotting-changing-color-of-line-based-on-value?requestedDomain=www.mathworks.com, pp. 8.
TheMorningCall.Com, "Cheap Ways to Foil Identity Theft," www.mcall.com/business/columnists/all-karp.5920748ju101,0 . . . , published Jul. 1, 2007.
Thompson, Herbert H., "How I Stole Someone's Identity", https://www.scientificamerican.com/article/anatomy-of-a-social-hack/#, Aug. 18, 2008, pp. 5.
Todorova, Aleksandra, "Protecting Your Child's Identity", Smart Money, Published Aug. 2, 2007, pp. 1-5.
"TransUnion—Child Identity Theft Inquiry", TransUnion, http://www.transunion.com/corporate/personal/fraudIdentityTheft/fraudPrevention/childIDInquiry.page as printed Nov. 5, 2009 in 4 pages.
TransUnion Consumer Credit Report http://www.transunion.com/, as retrieved on Sep. 17, 2008.
Truston, "Checking if your Child is an ID Theft Victim can be Stressful," as posted by Michelle Pastor on Jan. 22, 2007 at http://www.mytruston.com/blog/credit/checking_if_your_child_is_an_id_theft_vi.html.
US Legal, Description, http://www.uslegalforms.com/us/US-00708-LTR.htm printed Sep. 4, 2007 in 2 pages.
Vamosi, Robert, "How to Handle ID Fraud's Youngest Victims," Nov. 21, 2008, http://news.cnet.com/8301-10789_3-10105303-57.html.
Waggoner, Darren J., "Having a Global Identity Crisis," Collections & Credit Risk, Aug. 2001, vol. vol. 6, No. 8, pp. 6.
Wesabe.com http://www.wesabe.com/, as retrieved on Sep. 17, 2008.
Yahoo! Search, "People Search," http://people.yahoo/com printed Nov. 16, 2010 in 1 page.
Yodlee | Money Center, https://yodleemoneycenter.com/ printed Feb. 5, 2014 in 2 pages.
You Need a Budget, http://www.youneedabudget.com/features printed Feb. 5, 2014 in 3 pages.

\* cited by examiner

| Residential | |
|---|---|
| Business | |

Shop  My Account  My Connection  Support      🔑   ⚐ Sign Out   ⊙ Costa Mesa, CA
                                                      ○ Contact Hi          Account Number:
John Smith    8935-018559584

Current Services:
TV, Internet, Telephone View Service Details

My Account Overview

My Bill                  Quick Links                       Manage Profile & Settings

Account Number: 001-8935-018559584                Data Usage Meter         Reset your password, edit
Total Due:                                                Check Usage             preferences and manage users
$155.40                                                                                   on your account.
Balance Due By: Feb 17, 2014                    Webmail Inbox
                                                                             Check Your Email          Profile & Preferences
( $ ) Pay Now ← 210                                                               Change Password
                                                                            Channel Lineup            Privacy Settings
( ⋮ ) Report Now ← 220                                         View Lineup                    [ Manage Profile ]

View Bill Details
Set Up Automatic EasyPay Payments

*FIG. 2A*        User interface of a biller's website with an option to report payments

FIG. 2B User interface of a consumer submitting PII to setup payment reporting

FIG. 2C  User interface of a biller's website with confirmation that payments will be reported when made

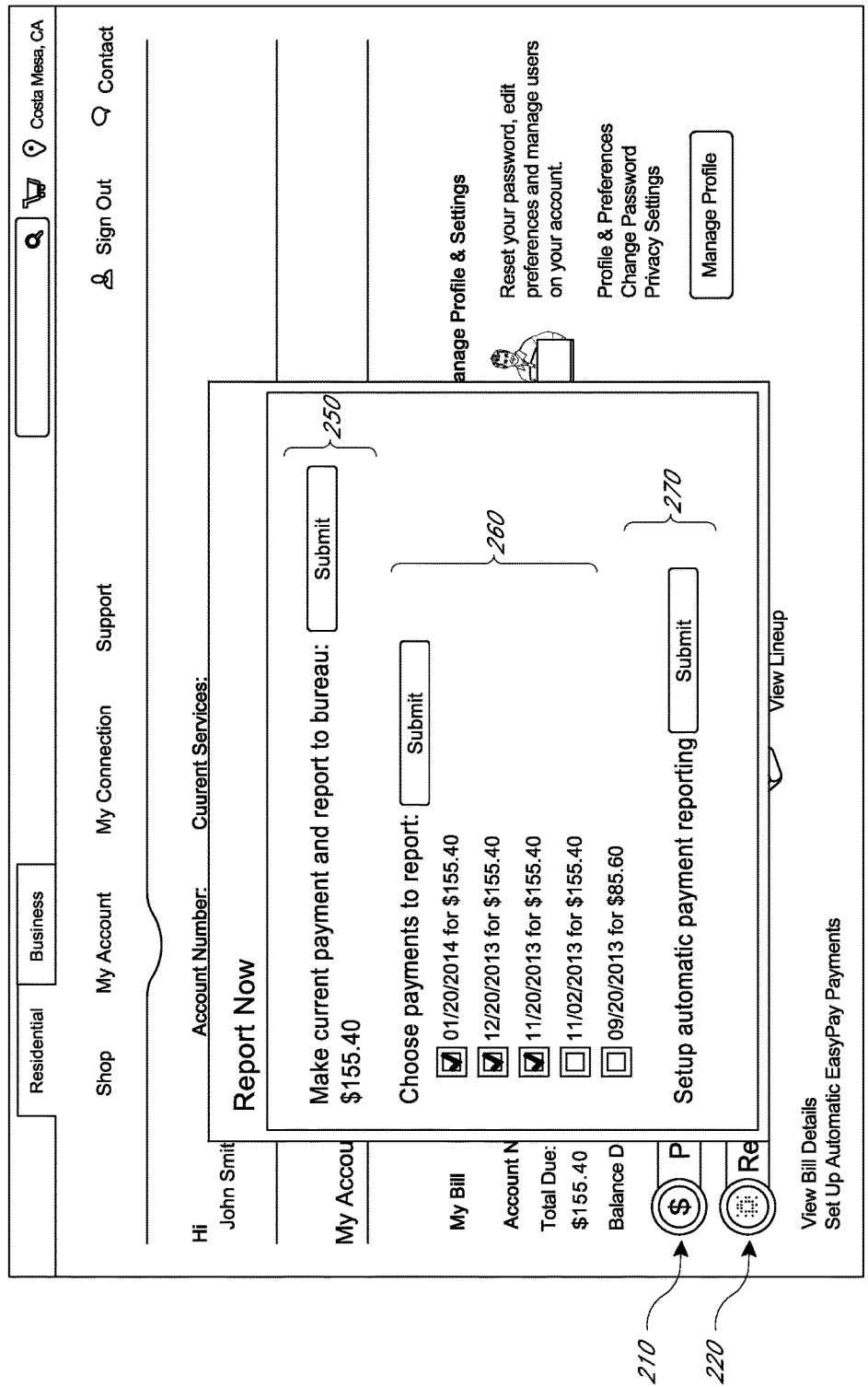
*FIG. 2D*  Secondary interface showing reporting options for a consumer

| Residential | Business |

Shop  My Account  My Connection  Support  🔍  ⊙ Costa Mesa, CA

& Sign Out  ℚ Contact

Hi
John Smith

Account Number:
8935-018559584

Current Services:
TV, Internet, Telephone  View Service Details

Your Payment has been confirmed

Account Holder: John Smith
Payment: $155.40
Data: 12/20/2014
Creditor: Cable Provider
Confirmation: 512A-4EN3-Z853-5135

(●) Report Now ← 210

Your account agreement has been verified with the reporting service. Clicking Report Now will immediately transmit payment details to be reported to the credit bureaus.

Quick Links

Data Usage Meter
Check Usage

Webmail Inbox
Check Your Email

Channel Lineup
View Lineup

Manage Profile & Settings

Reset your password, edit preferences and manage users on your account.

Profile & Preferences
Change Password
Privacy Settings

[ Manage Profile ]

View Bill Details
Set Up Automatic EasyPay Payments

*FIG. 2E*   User interface showing payment confirmation before a user selects to report the payment

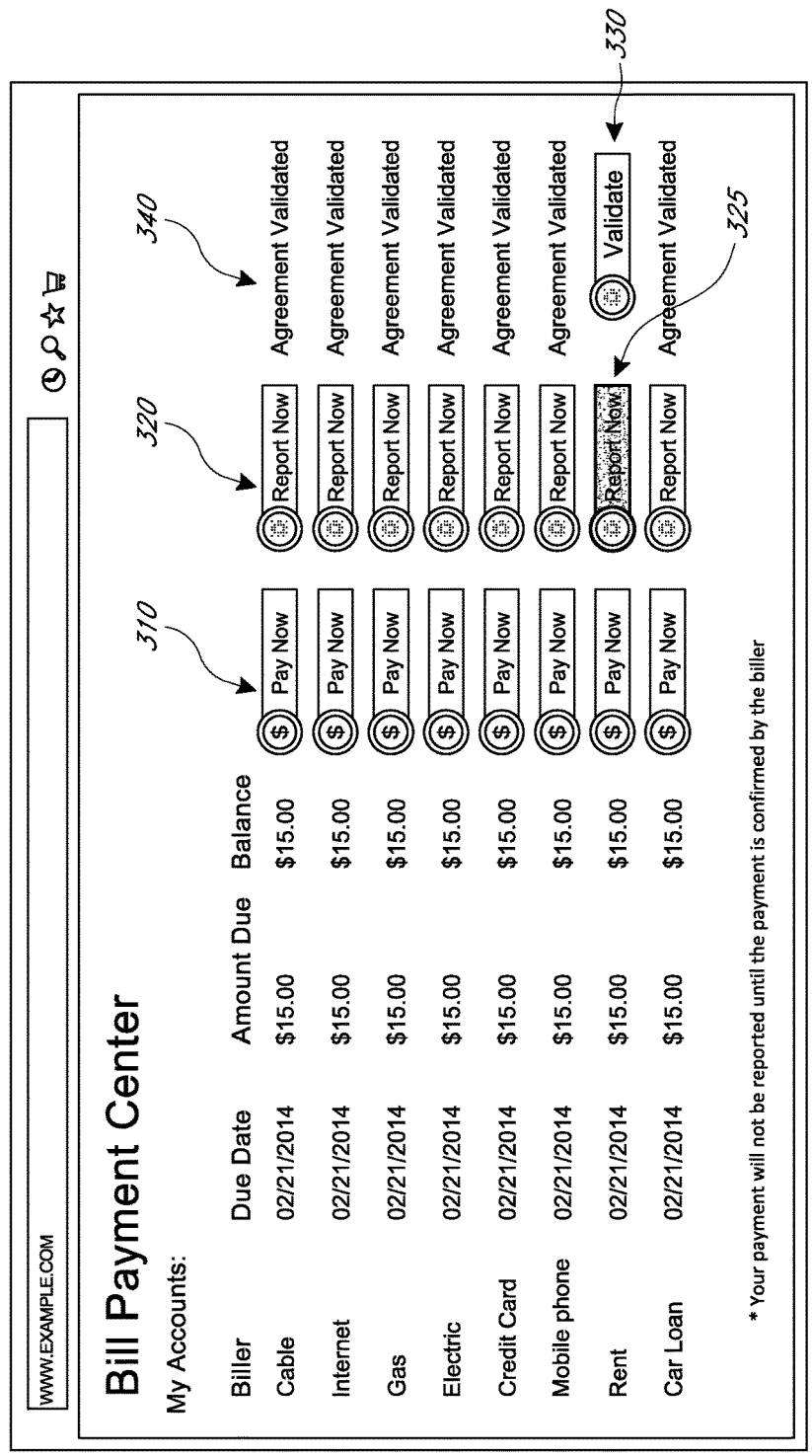
FIG. 3    Bill payment center with payment and reporting options

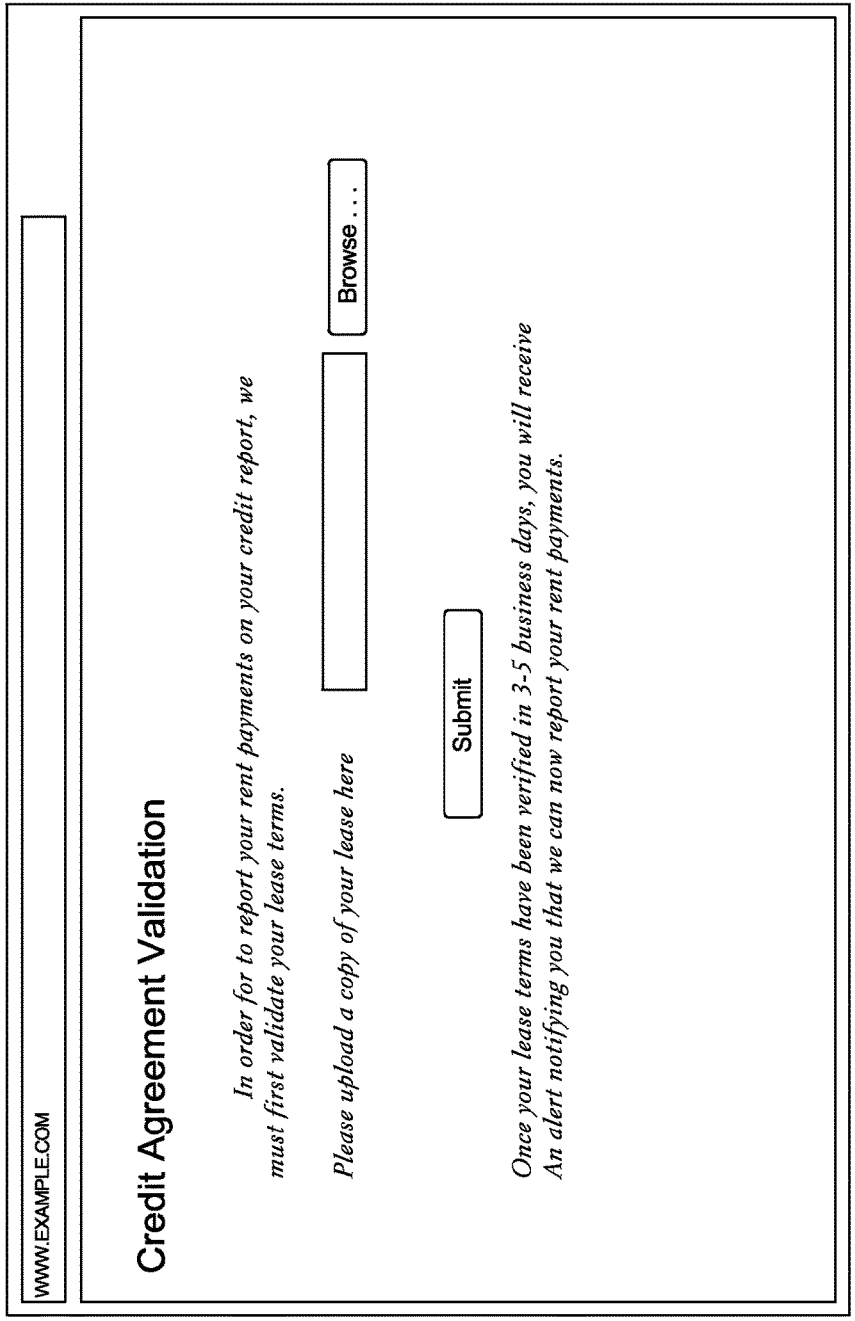
FIG. 4    User interface to validate a consumer's account before reporting to credit bureaus

WWW.EXAMPLE.COM

Setup New Account to Report

Search for billers already in our system

[        ]  [Submit]  } 510

Add a new biller

Name of biller     [        ]
Type of biller     [        ]     } 520
Address of biller  [        ]
Account number     [        ]

User interface at payment/reporting system that allows the consumer to add additional billers

*FIG. 5*

Setup Automatic Reporting

My Non-Reporting billers:

| | | |
|---|---|---|
| Cable | ☑ | *Report payments to Credit Bureau* |
| Internet | ☑ | *Report payments to Credit Bureau* |
| Gas | ☐ | *Report payments to Credit Bureau* |
| Electric | ☑ | *Report payments to Credit Bureau* |
| Mobile phone | ☑ | *Report payments to Credit Bureau* |

⎬ *610*

My Reporting billers:

| | | |
|---|---|---|
| Credit Card | ☐ | *Report payments at time of payment* |
| Home Loan | ☑ | *Report payments at time of payment* |
| Car Loan | ☑ | *Report payments at time of payment* |

⎬ *610*

Setup a New Biller for Reporting

Type of Biller [ ▼ ]   Name of Biller [ ▼ ]

Search for Biller

[            ]  🔍 Search

*FIG. 6*   Bill payment center allowing a consumer to setup automatic payment reporting

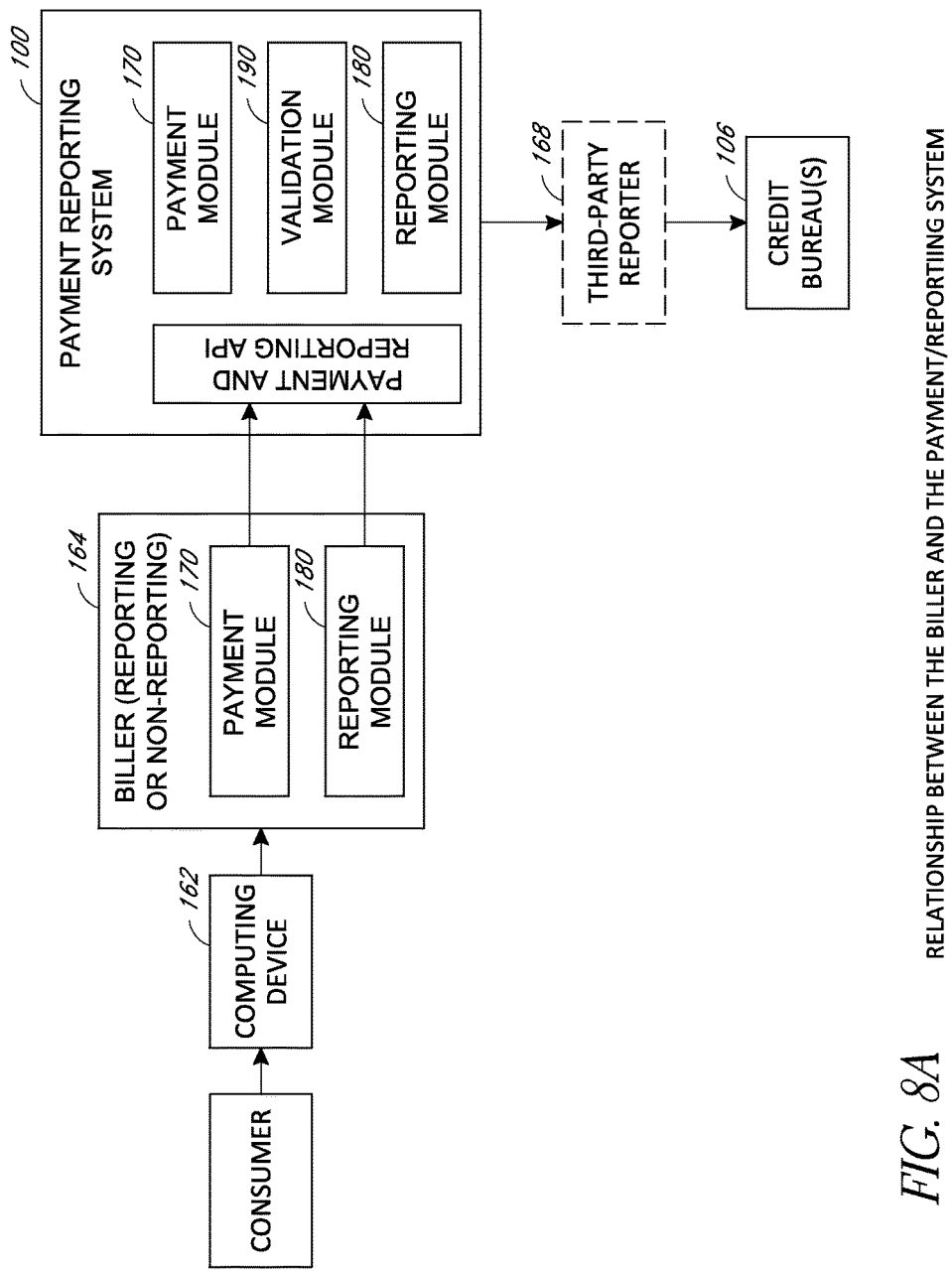
FIG. 8A  RELATIONSHIP BETWEEN THE BILLER AND THE PAYMENT/REPORTING SYSTEM

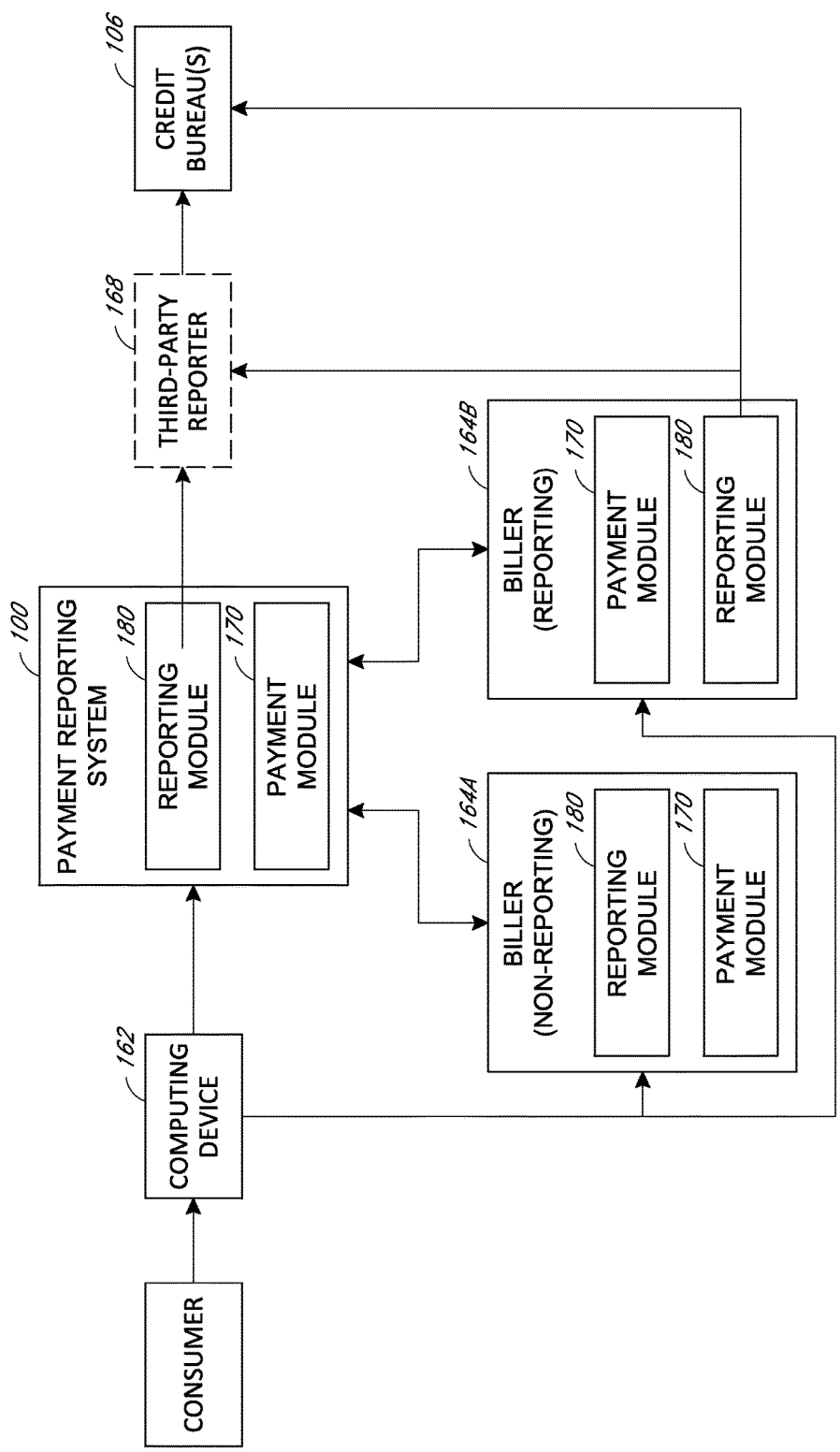
FIG. 8C  VARIOUS OPTIONS FOR IMPLEMENTING PAYMENT REPORTING FUNCTIONALITY

PAYMENT REPORTING SYSTEMS

CROSS-REFERENCE TO RELATED APPLICATIONS

This application is a continuation-in-part of U.S. patent application Ser. No. 14/164,561 filed Jan. 27, 2014, which claims the benefit of U.S. Provisional Application No. 61/919,618 filed Dec. 20, 2013 and U.S. Provisional App. No. 61/905,112 filed Nov. 15, 2013. This application is also a non-provisional of, and claims priority to, U.S. Provisional Application No. 61/919,618 filed Dec. 20, 2013 and U.S. Provisional App. No. 61/905,112 filed Nov. 15, 2013. Each of the above identified applications is hereby incorporated by reference as if set forth herein in its entirety.

BACKGROUND

The credit score is an important indicator of a consumer's financial health. A consumer's credit score may impact availability and/or terms (e.g., interest rate) of such things as credit cards, loans, rentals, and real estate mortgages, as well as impacting the consumer's ability to find employment. Therefore, consumers have a substantial interest in monitoring and improving their credit scores.

SUMMARY

In one embodiment, a reporting system comprises hardware processors and one or more storage devices. The storage devices store software instructions for execution by the hardware processors. The system is configured to authenticate the identity of a consumer and access payment data associated with the consumer indicating a biller of the consumer. The system may then present the consumer with a user interface including the payment data and a selectable indicator enabling the consumer to instruct the system to report payments to one or more credit bureaus. In response to the consumer selecting the indicator, the system may initiate a report of the payment to one or more credit bureaus.

BRIEF DESCRIPTION OF THE DRAWINGS

FIG. 2A is a sample user interface which presents a biller's bill payment screen with a reporting option, as used in an embodiment.

FIG. 2B is a sample user interface which enables a consumer to enroll in a payment reporting service, as used in an embodiment.

FIG. 2C is a sample user interface which presents a biller's bill payment screen with an indication that payments will be reported to one or more credit bureaus immediately after payment is made and/or confirmed, as used in an embodiment.

FIG. 2D is a sample user interface which presents a consumer with various ways to set up payments and reporting, as used in an embodiment.

FIG. 2E is a sample user interface which presents a consumer with payment confirmation information and enables the consumer to initiate reporting of the payment to one or more credit bureaus, as used in an embodiment.

FIG. 3 is a sample user interface which presents the consumer with a bill payment center, as used in an embodiment.

FIG. 4 is a sample user interface which enables the consumer to validate a credit agreement, as used in an embodiment.

FIG. 5 is a sample user interface which enables a consumer to setup automatic payment reporting, as used in an embodiment.

FIG. 6 is a sample user interface which enables a consumer to setup new accounts to report, as used in an embodiment.

FIG. 8A is a block diagram illustrating one embodiment of a biller reporting payments to one or more credit bureaus through a reporting system.

FIG. 8C is a block diagram illustrating multiple embodiments of a consumer initiating reporting of payments to one or more credit bureaus.

DETAILED DESCRIPTION

Figure 1:
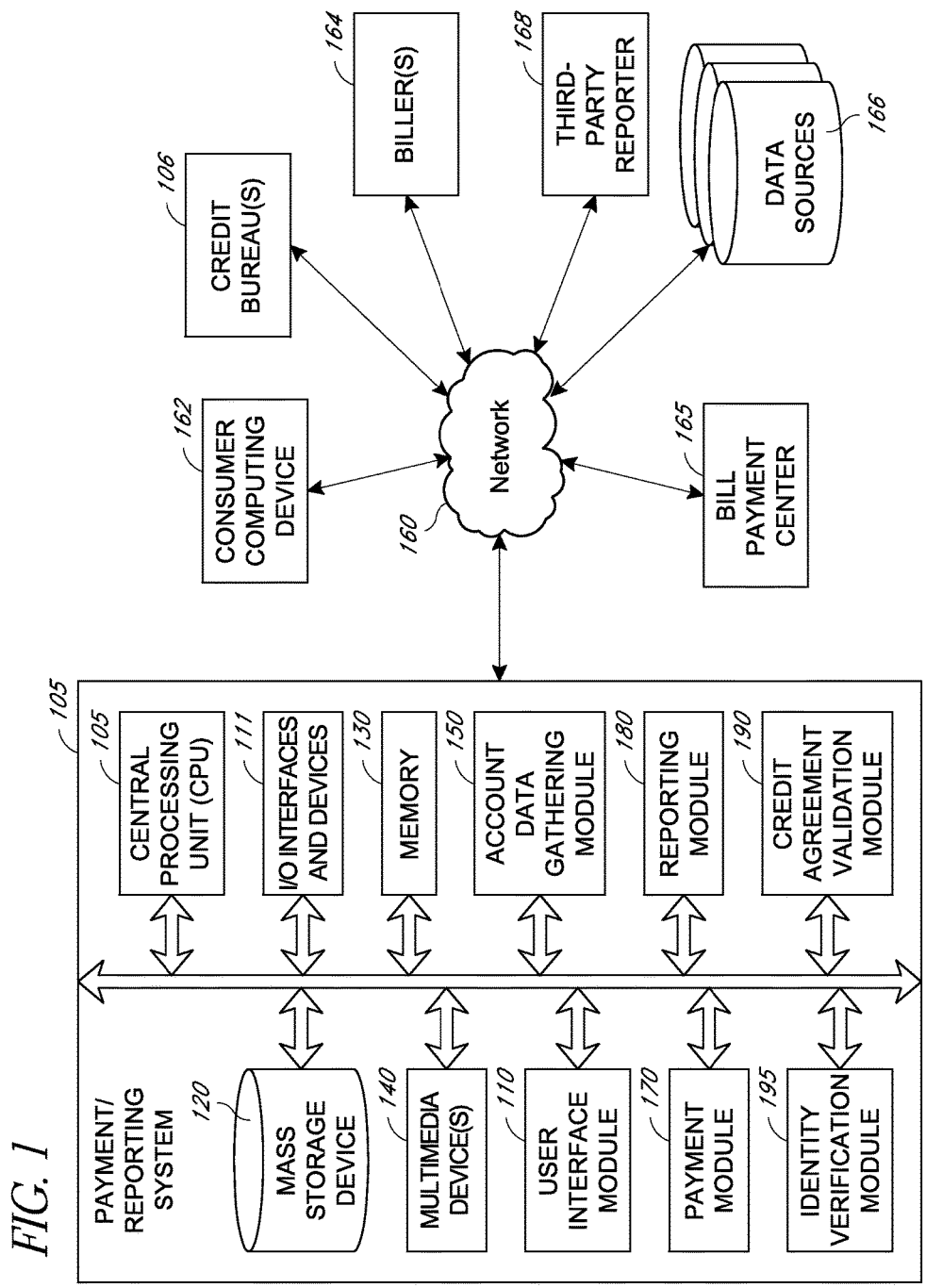
FIG. 1 is a block diagram illustrating one embodiment of a payment reporting system in communication with various other systems.

Data reporting is the reporting of consumer credit information by a business, such as a biller, to one or more credit bureaus. For example, business that require payment for a product or service that has been received or used by a consumer may report billing and payment information to one or more credit bureaus. Businesses that report data may be referred to as data reporters or data furnishers, while credit bureaus, such as Experian, are referred to as credit reporting agencies (CRA). Once billing and/or payment information is received by a credit bureau, a tradeline associated with the reporting business is created and/or updated with the new data. In general, a tradeline represents a particular financial account of a consumer (e.g., each credit card account is a different tradeline), and may be represented in various manners in a user interface displaying credit information. Consumers may have few or multiple tradelines on their record. Together, all tradelines reported on a specific consumer are included in the consumer's credit report and can be used to determine the consumer's overall risk or creditworthiness.

The credit score is an important indicator of a consumer's financial health. Consequently, having a high credit score is important to consumers for many reasons. A consumer's credit score may impact availability and/or terms (e.g., interest rate) of such things as credit cards, loans, leases, real estate mortgages, and so on. A poor credit score may even prevent a consumer from finding a good job. Thus, many consumers have a substantial interest in monitoring and finding ways to improve their credit scores. However, a consumer's credit report is based on the information on their credit report, and the information on a consumer's credit report doesn't change until it is updated by a data reporter. Typically, there are two types of data reporters. The first type is the billers themselves. Some billers report data about their consumer accounts directly to the credit bureaus. The second type is third party data furnishers (also referred to as third party data reporters). These companies report to the credit bureaus on behalf of one or more companies with consumer credit accounts. In both cases, the billers receiving payments from consumers and/or the third party data reporters typically aggregate payment information from many consumers and only report to the credit bureaus periodically (e.g., every 30 days). Thus, if a consumer makes a payment with the hope of improving his credit score there is often a substantial delay before any improvement actually occurs. For consumers seeking a quick improvement to their credit scores, this delay can be costly. In some embodiments of the disclosed systems, a consumer can report payment faster than relying on traditional reporting procedures and can ensure that some payments, that may otherwise not be reported, are reported.

Although several embodiments, examples and illustrations are disclosed below, the inventions described herein extend beyond the specifically disclosed embodiments, examples and illustrations and includes other uses of the inventions and modifications and equivalents thereof. Embodiments are described with reference to the accompanying figures, wherein like numerals refer to like elements throughout. The terminology used in the description presented herein is not intended to be interpreted in any limited or restrictive manner simply because it is being used in conjunction with a detailed description of certain specific embodiments of the invention. In addition, various embodiments can comprise several novel features and no single feature is solely responsible for its desirable attributes or is essential to practicing the inventions herein described.

System Block Diagram

FIG. 1 is a block diagram illustrating one embodiment of a payment reporting system 100 that may be used to implement certain systems and methods discussed herein, such as providing billing information to a consumer, gathering a consumer's account data, enabling a consumer to report payments to one or more credit bureaus, and/or processing payments to one or more billers. Each of these features is discussed further below with reference to the various figures.

In one embodiment, the payment reporting system 100 is configured to interface with multiple devices and/or data sources. The payment reporting system 100 may be configured to implement certain systems and methods described herein. The functionality provided for in the components and modules of the payment reporting system 100 may be combined into fewer components and modules or further separated into additional components and modules.

The payment reporting system 100 may be used to implement systems and methods described herein, such as providing billing information to a consumer, gathering a consumer's account data, enabling a consumer to initiate immediate payment reports to one or more credit bureaus, and/or processing payments to one or more billers. In the embodiment of FIG. 1, the payment reporting system 100 may include modules that may be executed by CPU 105 such as an account data gathering module 150, a user interface module 110, a payment module 170, a reporting module 180, an identity verification module 195, and a credit agreement validation module 190. In some embodiments, the other computing devices discussed herein, such as the computing devices 162, may include some or all of the same components as discussed below with reference to payment reporting system 100. Furthermore, depending on the embodiment, certain modules, such as the user interface module 110, account data gathering module 150, payment module 170, and/or reporting module 180 may be performed by different and/or multiple computing devices. For example, certain functionality of the reporting module 180 may be performed by the computing device 162, while other functionality of the reporting module 180 may be performed by billers 164.

In some embodiments, the payment reporting system 100 includes an account data gathering module 150, which performs various tasks of gathering payment data and other data relating to one or more accounts of a consumer (e.g., a consumer operating the consumer computing device 162 in FIG. 1). Such data may include, for example, account details associated with specific accounts, records of payments made by a consumer, credit data retrieved from credit bureau(s) 106, and/or payments due on the accounts. The account data may be retrieved via a network 160, via a dedicated communication channel, or by other means. In some embodiments, account data is communicated to the payment reporting system 100 via a secured communication channel to ensure the privacy and security of the data. In an embodiment, account data is gathered on demand as required by the payment reporting system. For example, account data may be gathered when a consumer requests to view billing information. In another embodiment, account data is gathered on a periodic basis independent of requests for information to the payment reporting system. For example, account gathering module 150 may gather new account data for specific accounts on a daily basis regardless of requests for information from the consumer. In another embodiment, account data is stored on the payment reporting system, in which case, retrieval of account data may not be necessary.

The payment reporting system 100 may also include a payment module 170 configured to process payments from a consumer to one or more billers 164. The payments may be processed through the payment reporting system 100 or using a third party payment processor (e.g., Yodlee or Fiserv). When processing payments the system 100 may interact with one or more financial institutions to direct the transfer of money from an account associated with the consumer to an account associated with a biller 164. When processing payments through a third party payment processor, the system 100 may transmit payment information including account information for the consumer and the biller to the third party payment processor. The third party payment processor may then use the payment information to cause the transfer of money from the consumer to the biller.

In one embodiment, the reporting module 180 is configured to report payments to one or more credit bureaus. In some embodiments, the payment reporting module 180 may report payments that have been processed by payment module 170, and/or may report payments made through other modules or systems. Reporting module 180 may be configured to report payment information faster than waiting for reporting of the payment from the billers receiving payments. Reporting module 180 may also be configured to report payments made to a biller 164 that does not otherwise report payments. Payments may be reported directly by the reporting system 100 to the credit bureau 106 over the network 160, or may be made through an intermediate third-party reporter 168. Payment module 170 and reporting module 180 may include executable instructions for processing and reporting payments, respectively. The modules may include portions that are executed by the payment reporting system 100, by billers 164, by bill payment center 165, and/or by the computing device 162. Thus, discussion herein of operations performed by the payment module 170 and the reporting module 180 may be performed entirely by the payment reporting system 100, entirely by another computing device, or some portions may be performed by the payment reporting system 100 while other portions are performed by another computing device. Furthermore, other computing systems may also perform all or some of the processes discussed with reference to the payment module 170 or reporting module 180.

The payment reporting system 100 may also include a credit agreement validation module 190 which checks the authenticity of a consumer's accounts to verify terms of the credit agreement, e.g., to make sure that the consumer really has an account with a biller/biller for which the consumer is requesting payment reporting. The accounts may be validated with data from a credit bureau 106, a biller 164, other data sources 166, and/or information received from computing device 162. The identity verification module 195 verifies the consumer's identity, for example, before reporting payment information.

In some embodiments, the payment reporting system 100 further includes user interface module 110 which may access data from account data gathering module 150, billers 164, or other computing systems, and use that data to construct user interfaces that enable the consumer to report one or more payments to a credit bureau. Such visualization may be presented to the end user and are designed to be easily manipulated and/or understood by the user. In an embodiment, the user interfaces transmitted by user interface module 110 are interactive. Various embodiments of the user interfaces that may be provided by user interface module 110, are shown and described throughout this specification. Variations on such interfaces and other possible interfaces will be known to those of skill in the art. User interface module 110 may be configured to construct user interfaces of various types. In an embodiment, user interface module 110 constructs web pages to be displayed in a web browser or computer/mobile application. The web pages may, in an embodiment, be specific to a type of device, such as a mobile device or a desktop web browser, to maximize usability for the particular device. In an embodiment, user interface module 110 may also interact with a client-side application, such as a mobile phone application (an "app") or a stand-alone desktop application, and provide data to the application as necessary to provide reporting functions to the consumer.

Client computing device 162, which may comprise software and/or hardware that implements the user interface module 110, may be an end user computing device that comprises one or more processors able to execute programmatic instructions. Examples of such a computing device 162 are a desktop computer workstation, a smart phone such as an Apple iPhone or an Android phone, a computer laptop, a tablet PC such as an iPad, Kindle, or Android tablet, a video game console, or any other device of a similar nature. In some embodiments, the client computing device 162 may comprise a touch screen that allows a user to communicate input to the device using their finger(s) or a stylus on a display screen. The computing device 162 and/or payment reporting system 100 may comprise storage systems such as a hard drive or memory, or comprise any other non-transitory data storage medium. The storage systems may be configured to store executable instructions that may be executed by one or more processors to perform computerized operations on the client computing device 162, such as accept data input from a user (e.g., on the touch screen), and/or provide output to a user using the display. These executable instructions may be transmitted to another device for execution or processing by the device to implement the systems and methods described herein.

The various computing devices illustrated in FIG. 1 may be in direct communication with the payment reporting system 100 or may be in communication with the payment reporting system 100 via the network 160, which may include any combination of networks, such as local area, wide area, Internet, etc., by way of a wired network, such as an ethernet LAN or cable modem, or via a wireless method, such as through an 802.11 access point or via a cell phone network. The network 160 allows computing devices to send (i.e. transmit) and receive electronic transmissions.

As described above, some embodiments may include portions that are executed by the payment reporting system 100, biller(s) 164, bill payment centers 165, and/or by the computing device 162, or are entirely executed by the payment reporting system 100, biller(s) 164, bill payment center 165, or the computing device 162. Thus, discussion herein of any structure (e.g., CPU, memory, etc.) of a computing device 162 or operations performed by the computing device 162, billers 164, bill payment center 165 or modules of the payment reporting system 100 may be equally applied to the payment reporting system 100. Furthermore, other computing systems may also perform all or some of the processes discussed with reference to the modules of the payment reporting system 100.

The biller(s) 164 may be reporting or non-reporting billers. In either case, the biller is a biller of the consumer. Reporting billers may regularly report payments received from the consumer to one or more credit bureaus. Reporting billers may include credit card companies, mortgage lenders, auto-loan lenders, and/or other billers that have provided credit to a consumer. Reporting billers may be required to report payments by laws or regulations, or may report voluntarily. Non-reporting billers do not typically report payments received from consumer's to a credit bureau. For example, non-reporting billers may include landlords and/or utility companies that have not traditionally reported payments. A biller 164 may refer to the legal entity that lends money or other services to a consumer, or may refer to the hardware and software components implemented on a computer system that interact with the payment reporting system 100 and/or the associated modules. In some embodiments, the payment reporting system 100 may operate as part of the computer systems of a biller 164.

Bill payment center 165 may be an online portal from which a consumer can make payments to one or more billers. In some embodiments, the consumer may identify billers to the bill payment center 165 or the billers may be identified automatically. The bill payment center may interact with a payment reporting system 100 and/or associated modules or may perform some features and modules associated with the payment reporting system 100. In some embodiments, the bill payment center 165 may perform part of modules that are included in the payment reporting system 100 and other parts of the modules may be performed by other computing systems, such as those included as part of a biller 164 or the payment reporting system 100. A consumer may access and interact through the computing system 162 with the bill payment center 165 through a web page or other user interface provided by the bill payment center 165 or another computer system.

Example Computing System Components

In general, the word module, as used herein, refers to logic embodied in hardware or firmware, or to a collection of software instructions, possibly having entry and exit points, written in a programming language such as, for example, C, C++, C#. Software modules may be compiled and linked into an executable program, installed in a dynamic link library, or may be written in an interpreted programming language such as, for example, BASIC, Java, Perl, or Python. It will be appreciated that software modules may be callable from other modules or from themselves or may be invoked in response to detected events and interrupts, or both. The modules included in the payment reporting system 100 may be stored in the mass storage device 120 as executable software codes that are executed by the CPU 105. Modules in the payment reporting system 100 may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. Software modules configured for execution on computing devices may be provided on a computer readable medium, such as a compact disc, digital video disc, flash drive, magnetic disc, or any other tangible medium, or as a digital download (and may be originally stored in a compressed or installable format that requires installation, decompression or decryption prior to execution). Such software code may be stored, partially or fully, on a memory device of the executing computing device, such as the computing device 162, for execution by the computing device. Software instructions may be embedded in firmware, such as an EPROM. It will be further appreciated that hardware modules may be comprised of connected logic units, such as programmable gate arrays or processors. The modules described herein are preferably implemented as software modules, but may be represented in hardware or firmware. Generally, the modules described herein refer to logical modules that may be combined with other modules or devices into sub-modules despite their physical organization or storage. Other computing systems, such as, computing device 162, billers 164, and bill payment center 165 may comprise similar computing hardware, software, and functionality as described in reference to payment reporting system 100.

In one embodiment, the payment reporting system 100 includes, for example, one or more servers or personal computers that are IBM, Macintosh, or Linux/Unix compatible. In another embodiment, the payment reporting system 100 includes one or more laptop computers, smart phones, personal digital assistants, or other computing devices. The payment reporting system 100 may include a memory 130, which may include a random access memory ("RAM") for temporary storage of information, a read only memory ("ROM") for permanent storage of information, and/or a mass storage device, such as a hard drive, diskette, optical media storage device, or USB flash drive. The payment reporting system 100 may also contain a separate mass storage device 120 for permanent storage of information. Typically, the modules of the payment reporting system are in communication with each other via a standards based bus system. In different embodiments, the standards based bus system could be Peripheral Component Interconnect (PCI), Microchannel, SCSI, Industrial Standard Architecture (ISA), and Extended ISA (EISA) architectures, for example.

The payment reporting system 100 may be generally controlled and coordinated by operating system software, such as Windows 95, 98, NT, 2000, XP, Vista, 7, 8, SunOS, Solaris, Blackberry OS, or other compatible operating systems. In Macintosh systems, the operating system may be any available operating system, such as MAC OS X. In other embodiments, the Payment reporting system 100 may be controlled by a proprietary operating system. Conventional operating systems control and schedule computer processes for execution, perform memory management, provide file systems, networking, and I/O services, and provide a user interface, such as a graphical user interface ("GUI"), among other functions.

The example payment reporting system 100 shown in FIG. 1 includes one or more commonly available input/output (I/O) interfaces and devices 111, such as a keyboard, mouse, touchpad, and printer. In one embodiment, the I/O interfaces and devices 111 include one or more display devices, such as a monitor, that allow the visual presentation of data to a user. More particularly, a display device provides for the presentation of GUIs, application software data, and multimedia presentations, for example. The payment reporting system 100 may also include one or more multimedia devices 140, such as speakers, video cards, graphics accelerators, and microphones, for example. In one embodiment, the I/O interfaces and devices 111 comprise devices that are in communication with modules of the payment reporting system 100 via a network, such as the network 160, or any local area network, including secured local area networks, or any combination thereof. In some embodiments, multimedia devices 140 and I/O interfaces and devices 111 may be part of computing devices 162, which payment reporting system 100 may interact with through network 160.

Some embodiments of a payment reporting system 100 may contain fewer or additional elements and modules than are present in the embodiment in FIG. 1. In addition, modules illustrated in FIG. 1 as part of payment reporting system 100 may be located and/or operated as part of other systems. For example, modules of payment reporting system 100 may be operated by billers 164, third-party reporter 168, and computing devices 162. Some modules present in the embodiment of FIG. 1 may be implemented in part by multiple hardware devices associated with various entities interacting with the payment reporting system 100.

Sample User Interfaces:

The payment reporting system 100 may present one or more user interfaces to the consumer through computing devices 162. In some embodiments, the user interfaces may be generated and/or configured by a user interface module 110, but one or more functions of the user interface module may be performed by one or more other modules, or other suitable hardware or software components. FIGS. 2A-6 illustrate some embodiments of user interfaces that may be presented to a consumer for interaction with payment reporting system 100. These user interfaces may be presented to the consumer as part of a bill payment center, a biller's website, or other systems enabling a consumer to report payment data to a credit bureau.

In the user interfaces illustrated in FIGS. 2A-2E, the payment reporting system 100 provides reporting services to a consumer through a biller's website. In these embodiments, the payment reporting system 100 may be included as part of a biller's hardware systems or separate hardware systems associated with the payment reporting system 100. In some embodiments, the payment reporting system 100 may also provide a biller's website and/or billings statements on behalf of the biller, branded with the biller's information. In some embodiments, the user interface may be generated and provided by a biller, but the payment reporting system 100 provides the software modules that enable reporting features to be incorporated into the interface. In such cases, the biller's hardware or software systems may execute software modules provided by the payment reporting system 100. The modules may be configured to provide the payment reporting system 100 with payment information for reporting to the credit bureau(s) and/or details of a consumer's enrollment in payment reporting services. Various examples of interactions between entities executing modules that are part of the payment reporting system 100 are discussed in more detail with reference to the block diagrams illustrated in FIGS. 9A-10.

In the user interface illustrated in FIG. 2A, the payment reporting system 100 presents the consumer with billing information, including an amount due and a due date. In some embodiments, additional or less information may be provided. The user is also presented with several interactive buttons including a "Pay Now" button 210, and a "Report Now" button 220. Selecting the "Pay Now" button 210 may initiate payments to the biller. Payments may be performed automatically upon selection, or may require further input from the consumer as part of the same, or a secondary user interface. Selecting "Report Now" 220 may cause the payment reporting system 100 to report payments made to the biller 164 to one or more credit bureaus 106, either directly to the credit bureau 106, or through a third party reporter 168. In some embodiments, a biller may be authorized to immediately report payments to a credit bureau. For example, if the biller is a credit provider for the consumer, the biller may already be reporting payments to the credit bureaus. In such cases, selecting the "Report Now" 220 button may expedite the reporting process performed by the biller. In other embodiments, the biller may not be authorized to report payments to the credit bureaus. In these cases, before reporting to credit bureaus is performed by the payment reporting system 100, the identity of the consumer may need to be authenticated and/or evidence that the credit agreement relationship exists and/or terms of the credit relationship may need to be provided. Example user-interfaces and processes for these situations are discussed below.

Figure 2B:
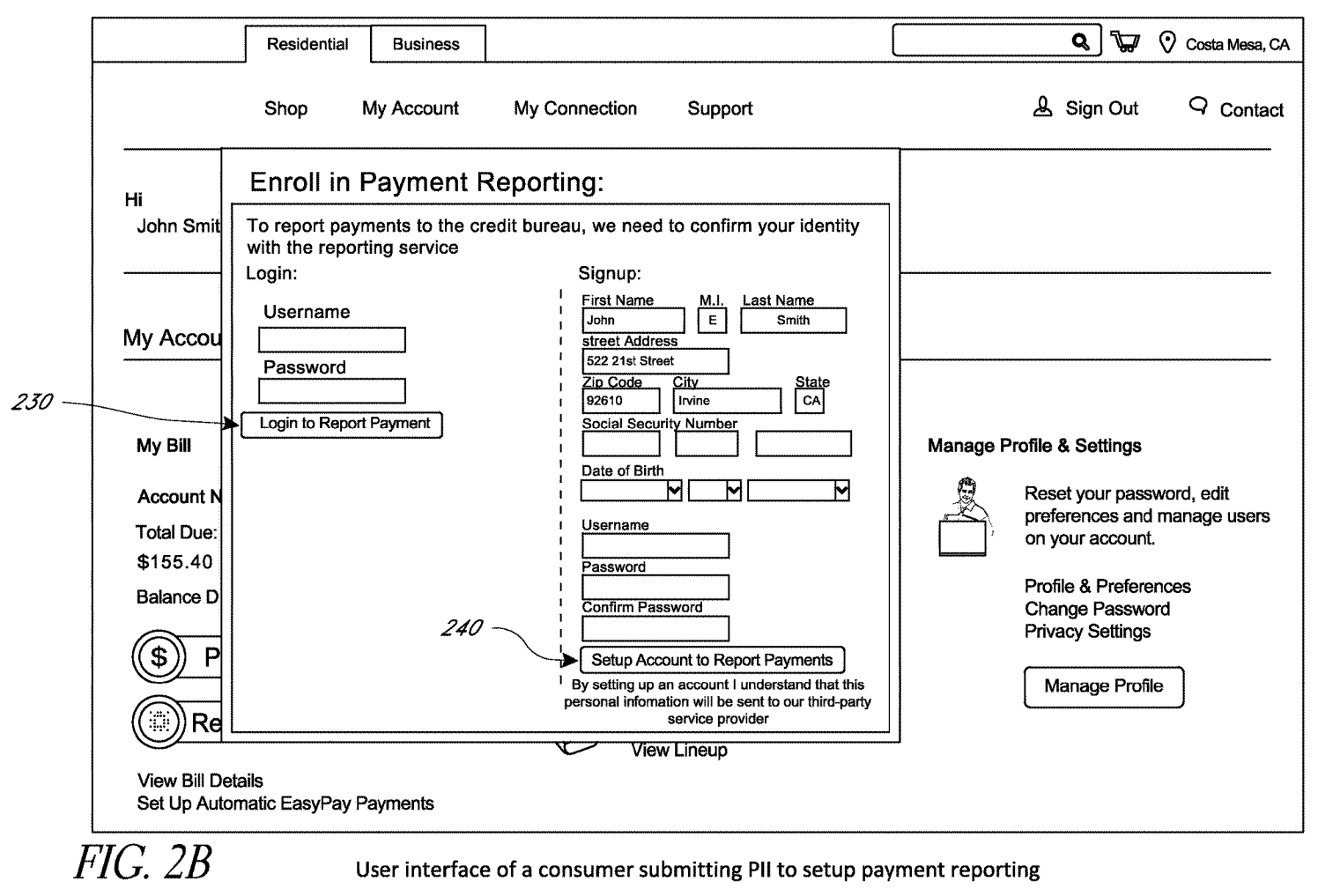

In the user interface illustrated in FIG. 2B, the payment reporting system 100 attempts to enroll the consumer in payment reporting for the biller. In some embodiments, a user interface to enroll in payment reporting may be presented upon selection of the "Report Now" button 220 as described in reference to FIG. 2A, or may be presented at another time when the consumer indicates an interest in reporting services. The option to enroll in payment reporting may be provided as part of the same user interface, as part of a secondary user interface, or as part of a user interface provided by another entity (e.g., on a third party's website)

In the user interface illustrated in FIG. 2B, the consumer is offered two identity verification options before enrolling in payment reporting for the biller. The consumer can sign up for, or login to the payment reporting system 100. The first option for the consumer is to login to the payment reporting system 100. If this is the first biller for which the consumer has attempted to enroll in payment reporting via the payment reporting system 100, the consumer may not have a username and password. However, if the consumer has signed up with the payment reporting system 100 for another biller, or for a bill payment system, the consumer may be able to confirm his identity by providing login information. Providing login credentials and clicking a "login to report payment" button 230 may complete the enrollment process at the biller's website. Additional user interfaces such as illustrated in FIG. 2D (discussed further below) may also be provided to customize reporting during the enrollment process. In some embodiments, information other than a username and password is used to confirm the identity of a consumer after the consumer has an account with the payment reporting system 100. For example, the consumer may be required to provide the answer to one or more security questions, such as out of wallet questions that are derived from information in the consumer's credit data. The consumer's identity may also be confirmed using browser cookies or tags which track the consumer's identity on a specific computer.

If the consumer does not have login credentials, the consumer may need to sign up for reporting services account by first authenticating his identity. The user interface illustrated in FIG. 2B enables a consumer to sign up for reporting services. The payment reporting system 100 may require more information than was required to enroll in online statements and/or payments directly from the biller. For example, the biller may not have required a valid social security number or date of birth, but both may be required to report payments to one or more credit bureaus. The biller's website may automatically perform some of the enrolling process, such as through one or more modules provided by the payment reporting system 100. For instance, in the example of FIG. 2B, the biller's website provides known information about the consumer to the payment reporting system 100 to fill in some required fields. The consumer may provide additional information, such as social security number and date of birth through the provided user interface. In some embodiments, the payment reporting system may require fewer or additional pieces of information than are illustrated in FIG. 2B. The user interface may also request other or additional identity verification from a consumer such as out-of-wallet data, for example. The consumer may complete the process by providing the required information to sign up for reporting and selecting a "setup account to report payments" button 240. This may enroll the consumer in payment reporting for the biller, such as by establishing an account for the consumer at the payment reporting system 100. If the consumer then tries to report payments for a second biller, the consumer may be able to provide identity confirmation with just a username and password as discussed with reference to the login process. During the process of creating an account with the payment reporting system 100, the consumer may be provided with information confirming the relationship between the consumer and the payment reporting system 100 and letting the consumer know personal information will be sent to third parties such as third party reporters 168 and credit bureau(s) 106 as part of the reporting process.

The user interface in FIG. 2B may also enable the consumer to report payments without signing up or logging into a reporting system. For example, the biller may collect information from the consumer sufficient to report a payment to the credit bureau(s) without the consumer creating an additional account with a reporting service, such as via the reporting module 180 being executed by the biller.

The user interface shown in FIG. 2C illustrates another embodiment of a biller's website. The "Pay Now" button 210 now informs the consumer that selecting "Pay Now" will report payments to the credit bureau(s) immediately. In some embodiments, this option may only be provided if the consumer's identity has been authenticated, either because the biller is a reporting biller, or because the consumer has logged-in or signed-up through a user interface with features such as to those discussed in reference to FIG. 2B. Immediately, as used in some embodiments, may mean when payment instructions are received, after funds in the consumer's payment account are verified, after confirmation of a successful payment, or another time shortly after the consumer selects to make a payment. In some embodiments of the payment reporting system 100, clicking on the "Pay Now" button 210 will not cause payments to be reported immediately, but will offer the consumer reporting options as shown in FIG. 2D, or will only offer reporting options after the payment is successfully completed as shown in FIG. 2E.

In the user interface illustrated in FIG. 2D, the payment reporting system 100 provides the consumer with various reporting options. In some embodiments, this interface may be provided to the consumer when the consumer selects either the "Pay Now" button 210, or "Report Now" button 220 as shown in, for example, FIG. 2A or in a user interface with similar features. In the example user interface of FIG. 2D, the consumer is provided with three reporting options. First the consumer is offered the option 250 to initiate payment of the amount currently due and then immediately report the payment. Selecting this option may require the consumer to enter more information, such as payment account information. In some embodiments, payment account information necessary to make payments may be stored in a mass storage device 120 or other memory 130 such that additional information is not required. The second option 260 offered to the consumer in the sample user interface is to report several past payments. This may be useful in some embodiments where the biller is not a reporting biller. Using this option, the consumer may choose to report only those payments made on time and in the full amount due. The consumer may also be able to choose payments based on the effect reporting payments will have on the consumer's credit score. In some embodiments, the system may only be able to report payments a limited time after completion before reporting is prevented by regulations. The system may offer consumer's an option to report "all available payments." In some embodiments, the system may identify as options for the consumer only those payments which have not been previously reported. For example, the system can keep records of reported payments and not offer those to the consumer for reporting a second time. The system may also access the consumer's credit report to identify from the credit report which payments have already been reported by respective billers. In some embodiments, billers may inform the system when payments are reported to the bureau so the payment reporting system 100 will not allow the consumer to report the same payments a second time.

In the third option 270 presented as part of the user interface of FIG. 2D, the consumer can setup automatic reporting. This option may change settings in the user's account so that all payments made to the biller (or all on time payments or other subset of payments) are reported to one or more credit bureaus. After setting up automatic reporting, the payment user interface shown in FIG. 2A may appear as shown in FIG. 2C. In some embodiments fewer or additional reporting options may be available to the consumer. The consumer may be able to update reporting options each time a payment is made, through settings on the biller's user interface, through settings on a user interface associated with the payment reporting system 100, or through other user interfaces. The user interface illustrated in FIG. 2D may be used in other systems such as those associated with a bill payment center 165

The user interface of FIG. 2E illustrates another embodiment of offering the consumer with an option to report a payment. In the reporting processes of the user interfaces discussed above, reporting payments to a credit bureau may be contingent on a payment being successfully completed to the biller. In the user interface of FIG. 2E, the biller's website processes the payment before offering a "Report Now" button 210. Therefore, upon selection of the "Report Now" button 210 in FIG. 2E, the payment reporting system 100 can initiate reporting to the credit bureaus immediately without additional confirmation of a successful payment. In some embodiments, the consumer may have to perform other actions such as enrolling in reporting services in a similar manner as discussed above before the payment reporting system 100 may report to a credit bureau.

Sample Payment Center User Interfaces

In some embodiments, the payment reporting system 100 operates as part of, or in conjunction with a bill payment center 165. FIG. 3 illustrates a user interface of a bill payment center which allows the consumer to report payments made through the bill payment center. In the embodiment of FIG. 3, the consumer can select a "Pay Now" button 310, a "Report Now" button 320, or "Validate" button 330 associated with respective billers. Selecting "Pay Now" 310 will initiate a payment to the associated Biller. The payment may be made immediately, for example, in the amount due (or other value based on settings decided by the consumer), or the payment may be processed after additional user input on the same, or a different, user interface. Selecting the "Report Now" button 320 may cause the payment reporting system 100 to report payments made through the system or to initiate a payment as well as reporting that payment. In some embodiments, in response to selection of the "Report Now" button 320 the payment reporting system 100 may provide a user interface similar to that illustrated in FIG. 2D to enable a consumer to choose specific payments to report and payments to make. The credit report system 100 may indicate which billers have credit agreements already validated by the payment reporting system 100. For example, in FIG. 3, the consumer's cable bill has been validated and is marked with text 340 stating "agreement validated". In other embodiments other indicators may be used to show which agreements have been validated such as other text, an image, or the absence of a button enabling the consumer to validate an agreement. Billers that do not have validated credit agreements may provide an option for the consumer to validate the agreement such as "Validate" button 330. Selecting "Validate" 330 may provide the consumer with a separate user interface to provide the payment reporting system 100 with more information to validate the credit agreement between the biller and the consumer. Before a credit agreement is validated by the credit report system 100, the "Report Now" button may be greyed, outlined, or in another manner indicate that reporting is not possible. For example, in FIG. 3 the "report now" button 325 related to the consumer's rent is greyed instead of solid indicating reporting is not possible at this time. In some embodiments, a validate button 330 may replace a report now button 320 until the credit agreement is validated. An example user interface to validate a credit agreement is illustrated in FIG. 4.

The additional features described with reference to FIGS. 2A-2E may also be implemented as necessary or desired in the context of a bill payment center 165 to enable similar interactions between a payment reporting center 100 and a consumer. For example, the "Pay Now" button 310 and "Report Now" button 320 may initiate the same or similar interactions and processes as described in reference to FIG. 2A, and may direct the consumer to similar secondary user interfaces where necessary. The consumer may identify billers individually as described in reference to FIG. 5. A biller may also automatically be included on a bill payment center user interface if the consumer enrolls in automatic payment or reporting through the payment reporting system 100 at the biller's website. In some embodiments, the payment reporting system 100 identifies biller's for the consumer through other data sources, such as from a credit report and/or demographic data about the consumer.

The user interface illustrated in FIG. 4 enables a consumer to validate the credit agreement between the consumer and a biller. This user interface may be displayed, for example, after the consumer selects the "Validate" button on the user interface illustrated in FIG. 3. In one embodiment, billers that report payments directly or indirectly to one or more credit bureaus must have a valid credit arrangement with the consumer. Payments not based on a valid credit arrangement should not be reported to a credit bureau. Therefore, the payment reporting system 100 may only report payments on behalf of the biller if there is a validated credit agreement. Therefore, in order to report payment data to a credit bureau, either directly or through a third-party reporter, the payment reporting system 100 needs confirmation that a valid credit agreement exists, as well as confirmation of the terms of the credit arrangement. Some billers may already report to credit bureaus, and the payment reporting system 100 may rely on the information provided to the credit bureaus from that biller to validate the credit relationship. Other billers may not report to credit bureaus and may require additional validation of the credit agreement. For example, a landlord may not report payments to any credit bureaus. The payment reporting system may therefore require additional validation of the credit agreement. This requirement is indicated in FIG. 3 by the presence of the "Validate" button 330 enabling the consumer to validate the relationship. In some embodiments, the credit relationship that needs to be validated (e.g., the landlord/tenant relationship) may be established by submitting additional information as is requested in FIG. 4. In the lease agreement example of FIG. 4, the lease agreement may be submitted to the payment reporting system 100 in order to validate the lease agreement and/or to identify terms of the lease agreement. In some embodiments, validation of the credit relationship from one or more provided documents (e.g., a lease agreement) may be done automatically by a computer system configured to parse the information in the documents for relevant terms of the credit agreement. Alternatively, certain agreements may require human review in order to manually validate the existence of a credit relationship between the biller and the consumer and/or to identify terms of the relationship that determine the payment reporting systems 100 ability to report payments to one or more credit bureaus.

For some billers, even those that do not report to credit bureaus, the biller may have an established relationship with the payment reporting system 100. In such embodiments, the biller and/or consumer may provide information about the credit relationship that the payment reporting system 100 can interpret and rely on to validate the credit agreement. Once a credit agreement is validated the payment reporting system 100 can report payments to the biller to one or more credit bureaus as needed. The user interface illustrated in FIG. 4 may also be provided, as required, in the context of reporting systems implemented on a biller's website (as discussed in reference to FIGS. 2A-2E).

In the user interface illustrated in FIG. 5, the consumer is presented with options to identify and setup new accounts to report. In the sample user interface of FIG. 5, the consumer is presented with two options to identify billers. In the first option 510, the consumer can search for billers already associated with the payment reporting system 100. For example, the payment reporting system 100 may store information for billers that provide the features discussed in reference to FIGS. 2A-2E. The payment reporting system 100 may store information relevant for setting up automatic reporting for these billers in the payment reporting systems memory 130 or mass storage device 120. In some embodiments, the payment reporting system 100 may require additional information such as specific terms of the credit relationship with the consumer. In some embodiments, this information may be provided automatically by the biller, and the payment reporting system may automatically validate the credit agreement. Biller's already in the system may also include billers with reporting setup by other consumers. For example, if a first consumer sets up reporting for a new biller, the payment reporting system 100 may store the information acquired about that biller during the setup process. If a second consumer identifies themselves as a payor to that biller, the payment reporting system can use the stored information to setup reporting for the second consumer. Such information may include data formats used by the biller, account numbers of the biller, and other information necessary to process payments to the biller, inform the biller of payments reported to one or more credit bureaus, and/or to receive information from the biller indicating successful payments.

If a consumer searches for a biller, but is unable to identify the desired biller, the consumer may be able to add a new biller to the system. For example, the second option 520 illustrated in FIG. 5 enables the consumer to attempt to add a new biller. Adding a new biller to the system may require the consumer to provide enough information to uniquely identify the biller. For example, in the user interface illustrated in FIG. 5, the consumer is required to provide the name of the biller, the type of biller (e.g., utility, rent, etc.), the address of the biller, and the consumer's account number with the biller. In other embodiments, the payment reporting system may require additional information such as the consumer's username and password with the biller's electronic systems. After receiving the required information from the consumer, the payment reporting system 100 may contact the biller to attempt to setup the required relationship to report payments made to the biller by the consumer and/or to make payments to the biller. For example, the payment reporting system 100 may access the biller's website by proxy using the consumer's credentials. The payment reporting system 100 can then access the billing information of the consumer to identify payments made, payments due, and other information relevant to reporting payments. The payment reporting system 100 may confirm payments made through a payment center with a biller in this manner before reporting the payments to one or more credit bureaus. In other embodiments the payment reporting system 100 sends a request to the biller to setup a relationship so that the requesting consumer and future consumers can report payments made to the biller.

In the user interface illustrated in FIG. 6, the consumer is provided with options to setup automatic reporting for one or more billers. In some embodiments billers are split into reporting billers 620 and non-reporting billers 610. As illustrated in FIG. 6, the consumer may select which accounts to report payments for through the payment reporting system 100. In FIG. 6, the consumer selects which payments to automatically report by checking boxes, but any other interactive indicator may also be used. For accounts the consumer selects to report automatically, the payment reporting system 100 may automatically provide payment data to one or more credit bureaus, either directly or through third-party reporters without requiring further input from the consumer. The payment reporting system 100 may report immediately upon initiating payment to a biller, or may wait to report payments until receiving confirmation of a successful payment. In embodiments where the payment reporting system 100 reports at the time payments are initiated, the payment reporting system may check a payment account of the consumer for sufficient funds before attempting to make or report a payment. In addition to selecting accounts for which to report payments, the system may also enable the consumer to determine when to report those payments. For example, the consumer may be presented with a user interface similar to that illustrated in FIG. 2D for each selected account or a similar interface for selecting specific options for multiple accounts.

In the embodiment of FIG. 6, for non-reporting billers 610 the consumer may select to report payments to a credit bureau. Selecting this option may enable the consumer to report payments that would not otherwise be reported and therefore would not otherwise impact the consumer's credit score. As noted above, reporting of payments in such an automated fashion, whether from a reporting biller or non-reporting biller, by the payment reporting system 100 may enable the consumer to report payments to a credit bureau at the time the payments are made. This may reduce the delay before payments are reported to a credit bureau and may therefore improve the consumer's credit score faster than if the consumer waited for the biller to report payments using its normal reporting schedule. In some embodiments the payment reporting system 100 may not separate the accounts according to reporting or non-reporting billers. The system may also display other language for the consumer to select which payments to report. In some embodiments, the payment reporting system 100 may provide other automatic reporting options for a consumer. For example, the consumer may select to report only certain payments to a biller, such as those that are sufficient and are on time, but not those payments with some deficiencies.

The user interfaces illustrated in FIGS. 2A-6 are sample embodiments of user interfaces that may be presented to a consumer as part of interactions with a payment reporting system. The user interfaces may contain fewer or additional features than those illustrated. The interactive elements illustrated may be of other varieties than those shown in the figures. For example instead of a text button in FIG. 2A, a consumer may choose to "Report Now" through check boxes, radio buttons, links or other interactive user interface elements. Some features shown in the context of one user interface may also be present in other contexts as necessary or desired for increased functionality and usability by the consumer.

Figure 7:
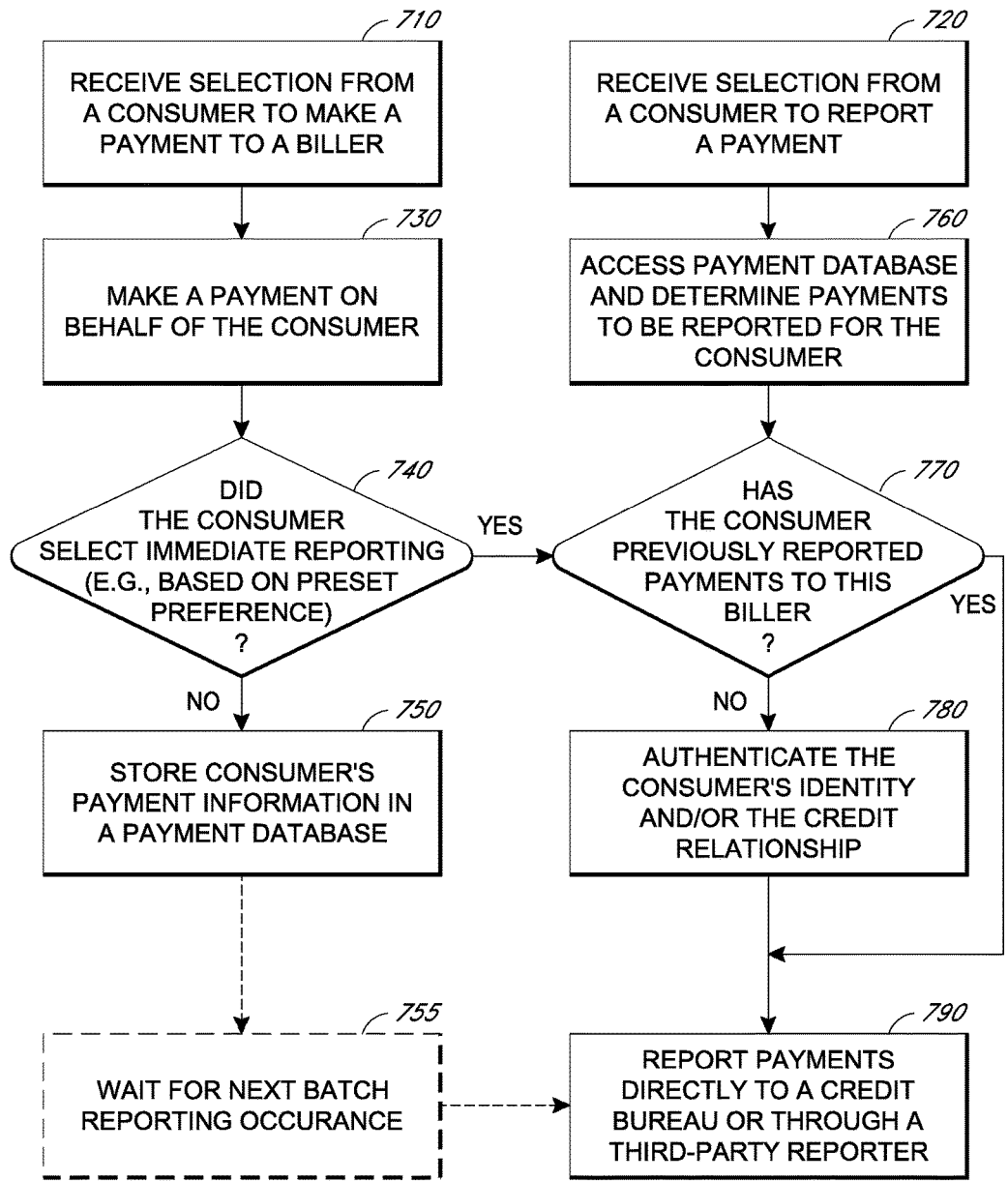
FIG. 7 is a flowchart illustrating one embodiment of a process for reporting payments to one or more credit bureaus.

Example Flowchart:

FIG. 7 is a flowchart illustrating one embodiment of processes performed by a payment reporting system 100. These processes may be carried out as part of a non-reporting biller's billing system, a reporting biller's billing system, or a bill payment center. The flowchart may begin in block 710 or 720. Block 710 is the starting point when a consumer selects to make a payment. Block 720 is the starting point when a consumer selects to report a payment that has already been made, either through the reporting system or through another system.

Beginning in block 710, the system receives a selection from a consumer to make a payment. The selection may be made through any of the user interfaces discussed above, or other payment systems. The selection may be to make a payment immediately, to make a payment at a later time, or to setup automatic recurring payments.

In block 730, the system makes a payment on behalf of the consumer according to the instructions indicated by the selection received in block 710. In some embodiments, payments may be processed by the system through one or more banking institutions. Payments may also be made by passing financial information associated with the consumer to a third party to process the required payments. Also in Block 730, the system may receive confirmation that the payment was successful. For example, when funds are transferred to the biller (e.g., from a payment account of the consumer), the payment reporting system 100 may receive confirmation that the payment was on time and the amount was sufficient.

In block 740, the payment reporting system 100 determines if the consumer selected immediate reporting. The consumer may have selected immediate reporting from one of the user interfaces illustrated in FIG. 2A, 2D, 3, or 6, in a similar user interface, or by other means. If the consumer has selected immediate reporting, the payment reporting system 100 will continue the process of reporting the payment in block 770. If he consumer did not select immediate reporting the payment reporting system may continue to block 750.

If the consumer did not select immediate reporting of the payment, in block 750 the payment reporting system stores the consumer's payment information in a payment database for later reporting to one or more credit bureaus. The payment database may be located in memory 130, mass storage device 120, or stored in a database associated with another entity. The stored information includes information necessary to report the payment to a credit bureau at a later time. For example, stored information may include the payment date, the payment amount, whether or not the payment was on time, successful payment confirmation, and other information important if the payment may be reported at a later time. Should the consumer select to report payments at a later time (see e.g., block 720), the payment reporting system 100 can use the stored information to make the report at that time.

If the system determines that the consumer selected immediate reporting of the payment at block 740, the method continues to block 770, wherein the payment reporting system 100 determines if the consumer has previously reported payments to this biller. The system may determine both if the consumer has previously reported any payments through payment reporting system 100, and whether those payments were to the particular biller that is at issue now. If the consumer has previously reported payments to the particular biller, then the system may not need to authenticate the relationship any further. If the consumer has not previously reported payments to the biller associated with this reporting before, the system needs to authenticate the credit agreement, and in some cases may need to further authenticate the consumer's identity as well.

In block 780, the credit reporting system 100 authenticates the consumer's identity. The consumer's identity may be authenticated by requiring additional information from the consumer as illustrated and discussed in reference to FIG. 2B above. If the consumer has previously reported payments, but not for the biller associated with the current reporting, the system may not need to authenticate the consumer. Depending on the biller, the payment reporting system 100 may also authenticate the credit agreement terms between the biller and the consumer. Authentication of the credit agreement terms may be necessary before the system can report payments made to the biller. Authenticating the credit relationship may be performed as discussed with reference to FIG. 4 above.

In block 790, the consumer has indicated a payment for the system to report, and the relationship on which the payment is based has been authenticated. The system may now report the payment to one or more credit bureaus. Payments may be reported directly to the credit bureau(s) 106 by the payment reporting system 100 in some embodiments. Payments may also be reported through a third-party reporter 168. In one embodiment, payments reported directly to credit bureau(s) must be made in the proper format and from an approved entity. Entities approved to report to credit bureaus are generally reporting creditors or third party data furnishers that are approved by one or more credit bureaus to report payments on behalf of non-reporting creditors. When reporting directly to a credit bureau, a biller or third-party reporter must generally report payments in a specific format, such as the Metro2 credit reporting standard. Payment reporting processes are discussed in more detail below with reference to FIGS. 9A-10.

Returning to Block 720, the processes of FIG. 7 can also be triggered by a selection from a consumer to report a payment made at an earlier time. The selection may be made at a biller's webpage, a bill payment center webpage, or another user interface which may be provided by another entity. In some embodiments the selection is made shortly after confirmation of successful payment is received, such as is shown in FIG. 2E. Selection of payments to report may also be received for payments made previously as shown in FIG. 2D. In some embodiments the consumer can select to report payments to more than one biller at a time and for multiple payments to those billers.

In block 760, if one or more particular payments to be reported are not identified at block 720, the payment reporting system 100 may access payment records for the consumer. The payments may be stored in a database associated with the payment reporting system as described in reference to block 750. In some embodiments, the payments data is stored on a biller's website, or in a database associated with the biller, and the payment reporting system 100 accesses the payment data from the biller's resources. In some embodiments, determining which payments to report involves determining which payments have already been reported. For example, if a consumer selects to report all available payments, the system may determine that only payments made during the last 12 months are eligible to be reported. In addition, the system may take steps to avoid reporting a payment that has already been reported by another entity. For example, a payment may be reported by a biller before the consumer requests to report the same payment through the payment reporting system 100. The payment reporting system may determine which payments have already been reported by requesting the reporting data from the biller, receiving data from the biller at the time of reporting and recording it, or by accessing the consumer's credit report and determining if the payment to be reported already appears on the consumer's report.

After the payment reporting system 100 has accessed the payment data for the consumer and determined which payments are to be reported, the system continues to block 770. Blocks 770, 780, and 790 operate in the same manner whether the processes are initiated by receiving instructions to make a payment or receiving instructions to report payments.

In some embodiments of FIG. 7 the flowchart may include block 755, particularly when the payments are made to a reporting biller. If the biller reports payments from consumers in the normal course of business, then the payments will eventually be reported from the stored consumer payment information. In block 755, the biller waits for the next batch reporting before reporting data to the credit bureau(s). When it is time for the next batch reporting, the system moves onto block 790. In some embodiments, the biller may be notified if a payment is already reported through another process (e.g., the processes occurring after a consumer selects to report payments as in block 720), then the system may not move on to block 790 from block 755. For example, in some embodiments, the biller may store information indicating that the consumer selected immediate reporting (e.g., in block 740) when the payment was made. The reporting system may then determine in block 755 that the payment has already been reported and should not be reported a second time to the credit bureau. In such cases, the individual payments that have been reported may be excluded from batch reporting. In other embodiments, the biller may still report a payment as part of batch reporting after reporting the payment at the time of the payment, but may include an indication that the reported payment has been previously reported.

The flowchart illustrated in FIG. 7 and described above are example processes which may be performed by the bill payment system 100 and/or other suitable computing systems, such as consumer computing devices. In some embodiments, fewer or additional blocks may be present, or the processes may be performed in a different order than shown in the figures. For example, in FIG. 7, some embodiments may not require authentication of the consumer's identity or the credit agreement, therefore, blocks 770 and 780 may not be required.

Example Block Diagrams

Figure 8B:
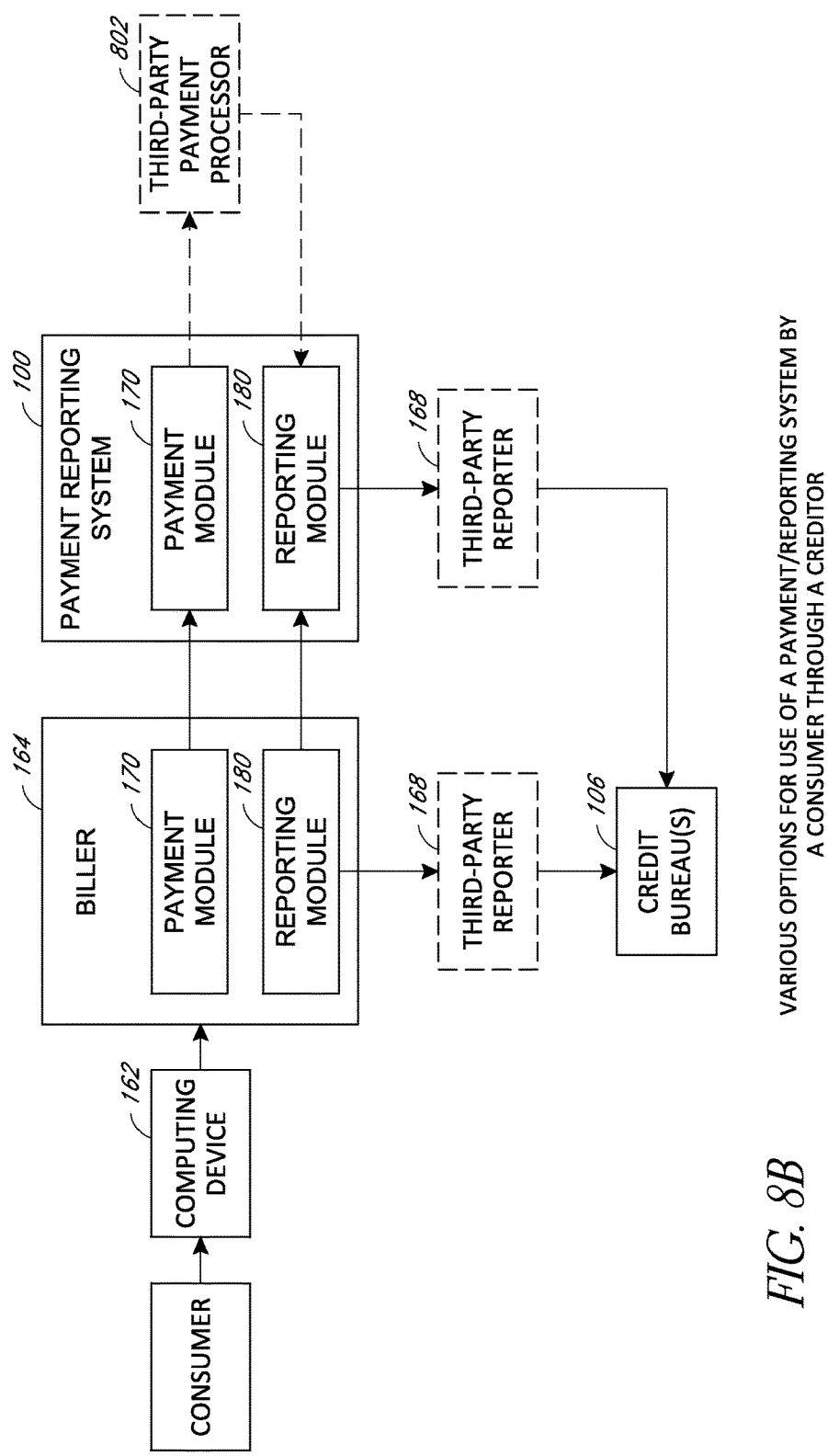
FIG. 8B is a block diagram illustrating multiple embodiments of a biller reporting payments to one or more credit bureaus through a reporting system.

The block diagrams in FIGS. 8A-8C illustrate various embodiments of computing system that may be in communication with the payment reporting system 100 in facilitating payment reporting to the credit bureau 106 (or multiple credit bureaus 106 in some embodiments). The block diagrams illustrate example interactions between various modules of the payment reporting system as they are implemented on hardware associated with one or more entities and as used to report payments through the system. For clarity, some of the hardware and software modules described with reference to the system block diagram of FIG. 1 may be omitted from these figures. However, in some embodiments the payment reporting system 100 and/or other systems illustrated in FIGS. 8A-8C may include some or all of the omitted modules, or other additional modules not illustrated in the figures.

The block diagram in FIG. 8A illustrates the relationship between a biller 164 and the payment reporting system 100 in some embodiments. The payment reporting system 100 in FIG. 8A includes a payment module 170, a credit agreement validation module 190, and a reporting module 180. In some embodiments, the payment reporting system 100 in FIG. 8A may include additional modules, such as an identity verification module 195, for instance. The biller in the embodiment of FIG. 8A includes a payment module 170 and a reporting module 180. As indicated in FIG. 8A, the biller may be either a reporting or a non-reporting creditor. The consumer may communicate with the biller through a computing device 162. For example, computing device 162 may include one or more I/O interfaces and devices 111 and Multimedia devices 140 to allow the exchange of information between the computing device 162 and the consumer. The computing device 162 may display, over multimedia devices 140, one or more of the user interfaces discussed with reference to FIGS. 2A-6 or other user interfaces associated with the biller 164 or the payment reporting system 100. Inputs received on computing devices 162 may be communicated over a network such as network 160 to a biller 164.

In FIG. 8A, the payment module 170 and the reporting module 180 included in biller 164 communicate with payment reporting system 100 through a payment and reporting API 801. In some embodiments, other communication means can be used to enable communication between the biller 164 and the payment reporting system 100. In some embodiments, the payment module 170 and reporting module 180 are provided by the payment reporting system 100 to the biller 164 to enable the payment reporting features discussed above. For example, the payment reporting system 100 may provide computer program instructions for execution by the biller 164 in response to a selection on a user interface associated with the biller that causes the payment module 170 and reporting module 180 to send payment information to the payment reporting system 100 using the payment and reporting API 801. In some embodiments, the biller 164 generates the payment module 170 and reporting module 180 to interact with the payment and reporting system 100.

When the consumer selects to make a payment or report a payment as described with reference to the user interfaces and flowcharts above through computing device 162, the biller 164 may perform some or all of the required actions. However, in the embodiment of FIG. 8A, the biller 164 may pass the necessary information to make or report a payment to the payment and reporting system 100. The payment and reporting system 100 may then process a payment with payment module 170, validate a credit agreement with validation module 190, and/or report a payment with reporting module 180. Payments may be reported by the payment reporting system through a third-party reporter 168, or directly to a credit bureau 106.

The block diagram of FIG. 8B illustrates additional embodiments of a consumer interacting with the biller 164 to coordinate payments to the biller 164 and report those payments to one or more credit bureaus 106. In FIG. 8B, both the biller 164 and the payment reporting system 100 include a payment module 170 and a reporting module 180. In some embodiments of the system illustrated in FIG. 8B, only one of the payment reporting system 100 and biller 164 include a payment module 170 and/or reporting module 180. For example, in some embodiments the payment module 170 in FIG. 8B may be operated exclusively by the biller. In such embodiments, the payments from the consumer to the biller may be processed without the payment reporting system 100.

The biller 164 in the embodiment of FIG. 8B has a reporting module 180. The reporting module 180 operated by the biller 164 may be capable of reporting payments to the credit bureau(s) 106. However, in some embodiments, the biller 164 is a non-reporting entity that is not authorized to report payments directly to the credit bureau 106. Therefore, in some embodiments the reporting module 180 located at biller 164 transmits payment data to a reporting module 180 located at payment reporting system 100. The payment data may include all information necessary to report payments to a credit bureau 106. The reporting module 180 operated by the payment reporting system 100 may then report payments to the credit bureau(s) 106 directly or through third-party reporter 168.

In some embodiments, the biller 164 receives payment information from the consumer computing device 162, but does not process the payments directly. Information can be transmitted from a payment module 170 at the biller to a payment module 170 at the payment reporting system 100. The payment reporting system 100 can then initiate payments according to the instructions. In some embodiments, the payment reporting system 100 performs the actions necessary to process the payment according to the instructions with the payment module 170. In some embodiments, the payment module 170 on the payment reporting system 170 may also send the necessary payment information to a third-party payment processor 802 (such as Yodlee or Fiserv) to process the payment. Confirmation of completed payments may be processed by the reporting module 180 to report the payments to the credit bureau(s) 106. In some embodiments, the biller 164 may use the third party payment system directly (e.g., through payment module 170) without the assistance of a separate payment reporting system 100.

In some embodiments, the payment reporting system 100 gives a notification to the biller when a payment has been reported to the credit bureau(s) 106. The biller may then avoid sending a duplicate report. The payment reporting system 100 may also inform the credit bureau(s) 106 as part of the payment reporting that the biller is likely to send duplicate payment data, but that it should only be recorded only once. Although not pictured, the communications from the biller 164 to the payment reporting system 100 may be performed over an API associated with the biller or payment reporting system 100 as discussed with reference to FIG. 8A.

The block diagram in FIG. 8C illustrates additional embodiments of interactions between various entities. The consumer computing device 162 may still communicate with billers 164A or 164B in the manners described in FIGS. 8A and 8B. For example, the consumer may make payments to a biller 164 at the biller's website through a payment module 170 included in the biller's system. In addition, the consumer can interact directly with the payment reporting system 100 to make payment to billers 164 and report payment made to billers 164. For example, the payment reporting system 100 may provide a user interface to the consumer through computing device 162, for example using the user interface module 110 (not pictured), which enables the consumer to select options for instructing the system to make payments to one or more billers 164. The payment module 170 located at the payment reporting system 100 may then initiate a payment to one or more billers 164 either directly, or through third-party payment processor 802 (not pictured). Reporting billers, such as biller 164B may then report the payment to the credit bureau(s) 106 directly. Payment reporting system 100 may also report the payment to the credit bureau(s) on behalf of a biller 164B, such as immediately after payment has been made to the biller 164B, rather than as part of the normal reporting cycle used by the biller 164B. In some embodiments, the payment reporting system 100 enables the consumer to select options to instruct the system to report payments to the credit bureau(s) 106 through a reporting module 180 as discussed with reference to the user interfaces illustrated in FIGS. 2A-6.

Many processes of making and reporting payments may be performed as illustrated in FIG. 8C. For example a consumer may interact with a payment reporting system 100 or directly with a biller 164A or 164B. Depending on the biller, the subsequent necessary interactions may vary. Some non-limiting examples of reporting payments through a payment reporting system 100 are described below.

In some embodiments, the consumer may communicate with a non-reporting biller 164A, which does not regularly report payments to a credit bureau 106. Such billers may include utility companies and landlords, for example. Therefore, the traditional interaction would be for the consumer to make a payment to the biller, and no payment to be reported to the credit bureaus 106. However, the payment reporting system 100 may enable the biller 164A to also offer the ability to report payments to the credit bureau 106. In this example, the biller 164A includes a reporting module 180 configured to communicate with the payment reporting system 100 to provide payment data and instructions to report the payments to credit bureau 106. The payment reporting system 100 may then report the payment(s) directly to the credit bureau(s) 106 or through a third-party reporter 168. The reporting module 180 located at biller 164A may be provided by payment reporting system 100 to enable the biller to offer reporting features to the consumer, and enable the biller 164A to communicate with the payment reporting system 100 to execute those features. In some embodiments, the reporting module 180 located at biller 164A enables the biller to report payments to the credit bureau(s) 106 without passing information through the payment reporting system 100, such as by communicating directly with the third-party reporter 168. The biller 164A and consumer may perform additional communication with the payment reporting system 100 to authenticate the credit agreement.

In some embodiments, the consumer communicates with a reporting biller 164B to complete payments. Biller 164B is a reporting biller that will report payment information to the credit bureau(s) regardless of additional input from the consumer. For example, biller 164B may be a credit card company or mortgage lender. In some embodiments, biller 164B enables the consumer to report payments faster than the biller would report through a typical batch reporting process. For example, the biller 164B may provide the features described in reference to the sample user-interfaces above. The biller 164B may process these additional features by communicating with the payment reporting system 100. The reporting module 180 and/or payment reporting module 170 may provide payment information to the payment reporting system 100 to enable the system to report payments to the credit bureau(s) immediately instead of waiting for batch reporting 30 or more days later.

In some embodiments, the consumer communicates with the payment reporting system 100 through computing device 162. At the payment reporting system 100, the consumer may be able to make payments through the payment module 170, and report payments through reporting module 180. For example, the payment reporting system 100 may be operating as a bill payment center or in cooperation with a bill payment center. To make payments, the payment module 170 included in payment reporting system 100 may communicate with one or more billers (e.g., biller 164A and biller 164B) to receive information on payments due, payment processing information, and/or to execute payments to the billers. Payments may be processed directly by the payment reporting system 100, or through a third party payment processor as discussed in reference to FIG. 8B.

In some embodiments, the consumer may also report payments through communication with the payment reporting system 100. For example, the consumer may interact with one or more of the user-interfaces described above to provide instructions to the payment reporting system 100 to report payments made. The payments may have been made at the payment reporting system 100, or may have been made through communication with the billers. Reporting module 180 may communicate with the billers to receive information required to report the payments to the credit bureau(s), or the payment information may already be stored in the payment reporting system 100 when payments are made through the system. After the necessary information is acquired, the payment reporting system 100 may report payments to the credit bureau(s) 106 directly or through third-party reporter 168 according to instructions received from the consumer.

Figure 9:
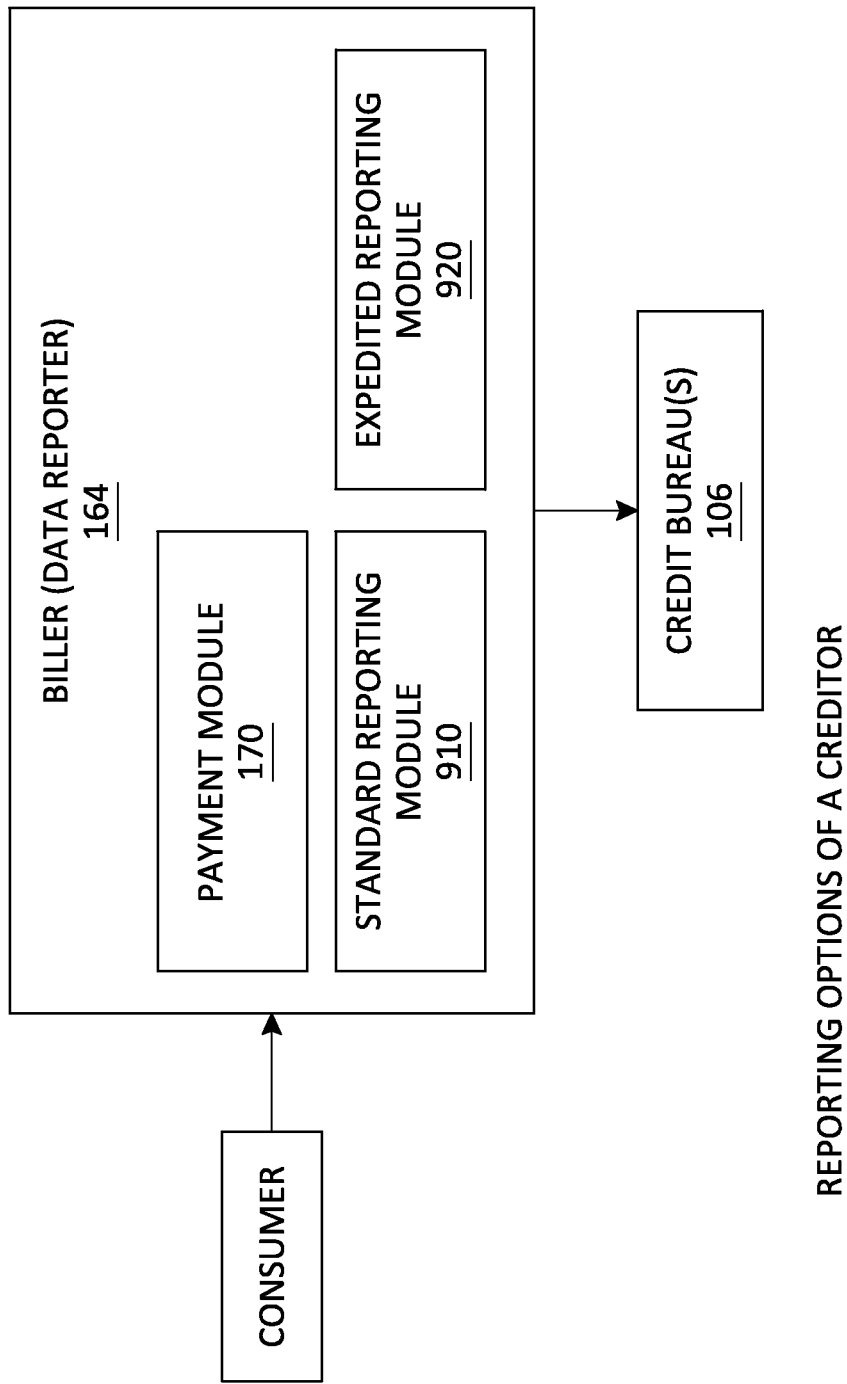
FIG. 9 is a block diagram illustrating one embodiment of a biller providing multiple reporting options.

The block diagram in FIG. 9 illustrates an example of a payment reporting system 100 operated by a biller 164. For example, in FIG. 9, the biller 164 is a reporting biller. Payment module 170 in FIG. 9 processes payments as directed by the consumer. As a data reporter, biller 164 has a standard reporting module 910. This reporting module may report payments in batches (e.g., every 30 days) as they are received from one or more consumers. In some embodiments, the biller 164 may also have an expedited reporting module 920 that reports payments immediately (or at least faster than module 910) to the credit bureau(s) 106. The biller 164 may enable the consumer to direct the reporting of payments through one or more user interfaces or by other means. For example, the biller 164 may provide the consumer with one or more of the user interfaces described above to enable the consumer to set reporting instructions for payments made. The biller 164 may report directly to the credit bureau(s) 106 or may report through a third-party reporter 168. In some embodiments, the biller 164B as referenced in FIG. 8C is structured as the biller in FIG. 9. In such embodiments, the standard reporting module 910 may report payments to the credit bureau(s) from the biller, while the expedited reporting module 920 may provide payment information to a payment reporting system 100 to report payments immediately.

Other Embodiments

Although the foregoing systems and methods have been described in terms of certain embodiments, other embodiments will be apparent to those of ordinary skill in the art from the disclosure herein. Additionally, other combinations, omissions, substitutions and modifications will be apparent to the skilled artisan in view of the disclosure herein. While some embodiments of the inventions have been described, these embodiments have been presented by way of example only, and are not intended to limit the scope of the inventions. Indeed, the novel methods and systems described herein may be embodied in a variety of other forms without departing from the spirit thereof. Further, the disclosure herein of any particular feature, aspect, method, property, characteristic, quality, attribute, element, or the like in connection with an embodiment can be used in all other embodiments set forth herein.

All of the processes described herein may be embodied in, and fully automated via, software code modules executed by one or more general purpose computers or processors. The code modules may be stored in any type of computer-readable medium or other computer storage device. Some or all the methods may alternatively be embodied in specialized computer hardware. In addition, the components referred to herein may be implemented in hardware, software, firmware or a combination thereof.

Conditional language such as, among others, "can," "could," "might" or "may," unless specifically stated otherwise, are otherwise understood within the context as used in general to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Any process descriptions, elements or blocks in the flow diagrams described herein and/or depicted in the attached figures should be understood as potentially representing modules, segments, or portions of code which include one or more executable instructions for implementing specific logical functions or elements in the process. Alternate implementations are included within the scope of the embodiments described herein in which elements or functions may be deleted, executed out of order from that shown, or discussed, including substantially concurrently or in reverse order, depending on the functionality involved as would be understood by those skilled in the art.

What is claimed is:

1. A computing system for displaying a graphical user interface for payment reporting, the computing system comprising:
  one or more hardware computer processors; and
  one or more storage devices configured to store software instructions configured for execution by the one or more hardware computer processors in order to cause the computing system to:
    generate first user interface data configured to be transmitted to a computing device of a particular user, wherein the first user interface data causes the computing device of the particular user to display a first personalized interactive user interface comprising:
      an indication of a first payment made to a first third-party entity; and
      a first interactive user interface element for reporting one or more payments to a credit bureau, wherein the first interactive user interface element is configured to execute a payment reporting module that communicates with an external billing database;
    receive from the computing device of the particular user, an indication of selection of the first interactive user interface element;
    in response to receiving the indication of selection of the first interactive user interface element,
      accessing one or more payment records for the particular user from the external billing database including a second payment made to a second third-party entity associated with the external billing database;
      generate second user interface data;
      transmit the second user interface data to the computing device of the particular user, wherein the second user interface data causes the computing device of the particular user to display a second personalized interactive user interface comprising a limited list of data of the one or more payment records, including:
        an indication of the first payment;
        an indication of the second payment;
        a second interactive user interface element for selecting the first and/or second payment; and
        a third interactive user interface element for initiating reporting of the selected payments to the credit bureau;
    receive an indication that the first or second payment has been reported to one or more credit bureaus; and
    transmit, to the first or second third-party entity, an indication that the first or second payment has been reported, respectively.

2. The computing system of claim 1, wherein the computing system is further configured to determine whether or not there is a valid credit agreement between the particular user and the first third-party entity.

3. The computing system of claim 1, wherein the computing system is further configured to:
  receive, from the particular user, recurring reporting instructions to report payments automatically in response to receiving indications that respective payments to third-party entities are successfully completed;
  receive an indication that a third payment was successfully completed; and
  automatically initiate reporting of the third payment to one or more credit bureaus in accordance with the recurring reporting instructions.

4. The computing system of claim 1, wherein the first and second user interface data are provided as part of a website associated with the first third-party entity.

5. The computing system of claim 1, wherein the computing system is further configured to:
  receive terms of a credit agreement between the first third-party entity and the particular user; and
  determine whether or not there is a valid credit agreement between the particular user and the first third-party entity.

6. The computing system of claim 1, wherein the computing system is further configured to:
  receive identification information for the particular user; and
  authenticate identity of the particular user.

7. The computing system of claim 1, wherein the particular user includes a business.

8. The computing system of claim 1, wherein the first third-party entity is a reporting entity that reports payment information to a credit bureau.

9. The computing system of claim 1, wherein the second third-party entity is a non-reporting entity that does not report payment information to the credit bureau.

10. A method for displaying a graphical user interface for payment reporting, the method comprising:
  generating first user interface data configured to be transmitted to a computing device of a particular user, wherein the first user interface data causes the computing device of the particular user to display a first personalized interactive user interface comprising:
    an indication of a first payment made to a first third-party entity; and
    a first interactive user interface element for reporting one or more payments to a credit bureau, wherein the first interactive user interface element is configured to execute a payment reporting module that communicates with an external billing database;
  receiving from the computing device of the particular user, an indication of selection of the first interactive user interface element;
  in response to receiving the indication of selection of the first interactive user interface element,
    accessing one or more payment records for the particular user from the external billing database including a second payment made to a second third-party entity associated with the external billing database;
    generating second user interface data;

transmitting the second user interface data to the computing device of the particular user, wherein the second user interface data causes the computing device of the particular user to display a second personalized interactive user interface comprising a limited list of data of the one or more payment records, including:
an indication of the first payment;
an indication of the second payment;
a second interactive user interface element for selecting the first and/or second payment; and
a third interactive user interface element for initiating reporting of the selected payments to the credit bureau;
receiving an indication that the first or second payment has been reported to one or more credit bureaus; and
transmitting, to the first or second third-party entity, an indication that the first or second payment has been reported, respectively.

11. A non-transitory computer storage medium storing computer-executable instructions that, when executed by a processor, cause the processor to:
generate first user interface data configured to be transmitted to a computing device of a particular user, wherein the first user interface data causes the computing device of the particular user to display a first personalized interactive user interface comprising:
an indication of a first payment made to a first third-party entity; and
a first interactive user interface element for reporting one or more payments to a credit bureau, wherein the first interactive user interface element is configured to execute a payment reporting module that communicates with an external billing database;
receive from the computing device of the particular user, an indication of selection of the first interactive user interface element;
in response to receiving the indication of selection of the first interactive user interface element,
access one or more payment records for the particular user from the external billing database including a second payment made to a second third-party entity associated with the external billing database;
generate second user interface data;
transmit the second user interface data to the computing device of the particular user, wherein the second user interface data causes the computing device of the particular user to display a second personalized interactive user interface comprising a limited list of data of the one or more payment records, including:
an indication of the first payment;
an indication of the second payment;
a second interactive user interface element for selecting the first and/or second payment; and
a third interactive user interface element for initiating reporting of the selected payments to the credit bureau;
receive an indication that the first or second payment has been reported to one or more credit bureaus; and
transmit, to the first or second third-party entity, an indication that the first or second payment has been reported, respectively.

12. The non-transitory computer storage medium of claim 11, wherein the computer-executable instructions are further configured to cause the processor to determine whether or not there is a valid credit agreement between the particular user and the first third-party entity.

13. The non-transitory computer storage medium of claim 11, wherein the computer-executable instructions are further configured to cause the processor to:
receive, from the particular user, recurring reporting instructions to report payments automatically in response to receiving indications that respective payments to third-party entities are successfully completed;
receive an indication that a third payment was successfully completed; and
automatically initiate reporting of the third payment to one or more credit bureaus in accordance with the recurring reporting instructions.

14. The non-transitory computer storage medium of claim 11, wherein the first and second user interface data are provided as part of a website associated with the first third-party entity.

15. The non-transitory computer storage medium of claim 11, wherein the computer-executable instructions are further configured to cause the processor to:
receive terms of a credit agreement between the first third-party entity and the particular user; and
determine whether or not there is a valid credit agreement between the particular user and the first third-party entity.

* * * * *